US011917739B2

(12) United States Patent
Bocock et al.

(10) Patent No.: US 11,917,739 B2
(45) **Date of Patent: *Feb. 27, 2024**

(54) LINEAR LIGHTING DEVICE

(71) Applicant: Lutron Technology Company LLC, Coopersburg, PA (US)

(72) Inventors: Ryan M. Bocock, Austin, TX (US); Fangxu Dong, Austin, TX (US); Ari L. Fox, Somerville, MA (US); Christopher M. Green, Austin, TX (US); Peter W. Ogden, Jr., Austin, TX (US); Stephen Phillips, Melrose, MA (US); Jonathan R. Redus, Malden, MA (US); Jaykrishna A. Shukla, Mays Landing, NJ (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,618

(22) Filed: Dec. 6, 2022

(65) Prior Publication Data

US 2023/0097102 A1 Mar. 30, 2023

Related U.S. Application Data

(63) Continuation of application No. 17/390,731, filed on Jul. 30, 2021, now Pat. No. 11,570,874.

(Continued)

(51) Int. Cl.

*H05B 47/18* (2020.01)
*F21S 4/28* (2016.01)

(Continued)

(52) U.S. Cl.

CPC ................ *H05B 47/18* (2020.01); *F21S 4/28* (2016.01); *F21V 5/007* (2013.01); *F21V 7/0091* (2013.01); *F21V 7/04* (2013.01); *F21V 23/06* (2013.01)

(58) Field of Classification Search

CPC ........ H05B 47/10; H05B 47/18; H05B 47/19; H05B 45/10; H05B 45/30; F21V 7/0091;

(Continued)

(56) References Cited

U.S. PATENT DOCUMENTS 9,146,028 B2 9/2015 Logan et al.
9,332,598 B1 5/2016 Ho et al.

(Continued)

*Primary Examiner* — Jimmy T Vu
(74) *Attorney, Agent, or Firm* — Flaster Greenberg P.C.

(57) ABSTRACT

A linear lighting device may include an elongated housing that defines a cavity. The linear lighting device may include plurality of emitter printed circuit boards configured to be received within the cavity. Each of the plurality of emitter printed circuit boards may include a plurality of emitter modules mounted thereto. Each of the plurality of emitter printed circuit boards may include a control circuit configured to control the plurality of emitter modules mounted to the respective emitter printed circuit board based on receipt of one or more messages. The linear lighting device may include a total internal reflection lens for each of the plurality of emitter printed circuit boards. The total internal reflection lens may be configured to diffuse light emitted by the emitter modules of the plurality of emitter printed circuit boards.

36 Claims, 20 Drawing Sheets

Related U.S. Application Data

(60) Provisional application No. 63/123,827, filed on Dec. 10, 2020, provisional application No. 63/059,745, filed on Jul. 31, 2020.

(51) Int. Cl.

| | |
|---|---|
| ***F21V 5/00*** | (2018.01) |
| ***F21V 7/00*** | (2006.01) |
| ***F21V 7/04*** | (2006.01) |
| ***F21V 23/06*** | (2006.01) |

(58) Field of Classification Search
CPC .. F21V 7/04; F21V 23/06; F21V 5/007; F21S 4/28
See application file for complete search history.

(56) References Cited

U.S. PATENT DOCUMENTS

| | | | | |
|---|---|---|---|---|
| 9,360,174 | B2 | 6/2016 | Dong et al. | |
| 9,392,660 | B2 | 7/2016 | Dias et al. | |
| 9,392,663 | B2 | 7/2016 | Knapp et al. | |
| 9,485,813 | B1 | 11/2016 | Lewis et al. | |
| 9,668,314 | B2 | 5/2017 | Dong et al. | |
| 9,671,071 | B1 * | 6/2017 | May | F21V 15/015 |
| 9,769,899 | B2 | 9/2017 | Ho et al. | |
| 10,161,786 | B2 | 12/2018 | Chang et al. | |
| 11,570,874 | B2 * | 1/2023 | Bocock | H05B 47/19 |
| 2013/0003363 | A1 | 1/2013 | Lu et al. | |
| 2013/0249404 | A1 | 9/2013 | Eckel et al. | |
| 2017/0251537 | A1 | 8/2017 | Clark et al. | |

* cited by examiner

LINEAR LIGHTING DEVICE

CROSS-REFERENCE TO RELATED APPLICATIONS

This application is a continuation of U.S. Non-Provisional patent application Ser. No. 17/390,731, filed Jul. 30, 2021, which claims the benefit of U.S. Provisional Patent Application No. 63/059,745, filed Jul. 31, 2020, and U.S. Provisional Patent Application No. 63/123,827, filed Dec. 10, 2020, the contents of which are incorporated herein by reference in their entirety.

BACKGROUND

Lamps and displays using efficient light sources, such as light-emitting diode (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

A multi-colored LED illumination device may have two or more different colors of LED emission devices (e.g., LED emitters) that are combined within the same package to produce light (e.g., white or near-white light). There are many different types of white light LED light sources on the market, some of which combine red, green, and blue (RGB) LED emitters; red, green, blue, and yellow (RGBY) LED emitters; phosphor-converted white and red (WR) LED emitters; red, green, blue, and white (RGBW) LED emitters, etc. By combining different colors of LED emitters within the same package, and driving the differently-colored emitters with different drive currents, these multi-colored LED illumination devices may generate white or near-white light within a wide gamut of color points or correlated color temperatures (CCTs) ranging from warm white (e.g., approximately 2600K-3700K), to neutral white (e.g., approximately 3700K-5000K) to cool white (e.g., approximately 5000K-8300K). Some multi-colored LED illumination devices also may enable the brightness (e.g., intensity or dimming level) and/or color of the illumination to be changed to a particular set point.

SUMMARY

As described herein a linear lighting device may include a plurality of controllable light-emitting diode (LED) light sources. A linear lighting device may include an elongated housing, a plurality of lighting modules, and a plurality of emitter modules. The elongated housing may define a cavity. The cavity may extend along a longitudinal axis of the housing. The plurality of lighting modules may be configured to be received within the cavity of the housing. Each of the plurality of lighting modules may include a plurality of emitter modules mounted thereto. Each of the plurality of lighting modules may include a drive circuit configured to receive a DC bus voltage on a DC power bus for powering the plurality of emitter printed circuit boards. Each of the plurality of lighting modules may include a control circuit configured to control the plurality of emitter modules mounted to the respective lighting module based on receipt of one or more messages. The one or more messages may include control instructions. For example, the control circuit may control an intensity of the emitter modules mounted to a printed circuit board of the respective lighting module. The drive circuit and/or control circuit may be mounted to the printed circuit board of the lighting modules.

The linear lighting device may include a total internal reflection lens for each of the plurality of lighting modules. The total internal reflection lens may be configured to diffuse light emitted by the emitter modules of the plurality of lighting modules. An upper surface of the total internal reflection lens may include a plurality of parallel ridges. The plurality of parallel ridges may be perpendicular to a length of the housing. Each of the plurality of lighting modules may have a length of 3 inches or 4 inches such that the overall length of the linear lighting device is configurable. For example, a first lighting module of the plurality of lighting modules may have a length of 3 inches and a second lighting module of the plurality of lighting modules may have a length of 4 inches. A plurality of lighting modules having different combinations of lengths may be combined in the linear lighting device such that different sized linear lighting devices may be produced. When the lighting modules have lengths of 3 or 4 inches, a plurality of lighting modules of 3 or 4 inch lengths may be assembled in the linear lighting device, for example, to achieve an overall length that can be configured in one inch increments (e.g., any length of 6" or greater in one inch increments).

A first lighting module of the plurality of lighting modules may receive the messages from a fixture controller. The first lighting module may relay the messages to a second lighting module of the plurality of lighting modules. The first lighting module may relay the messages to the second lighting module via an $I^2C$ communication bus. The first lighting module may receive the messages via an RS-485 communication protocol. The first lighting module may include a communications processor configured to receive the messages and relay the messages via the $I^2C$ communication bus.

Each of the plurality of emitter modules may include a plurality of emitters and a plurality of detectors mounted to a substrate and encapsulated by a dome. Each of the plurality of lighting modules may include a receptacle configured to connect adjacent lighting modules of the plurality of lighting modules. The linear lighting device may include a printed circuit board connector that is configured to connect a first lighting module of the plurality of lighting modules to a second lighting module of the plurality of lighting modules via the receptacle. The printed circuit board connector may include a flat flexible cable jumper. The plurality of lighting modules may be attached within the cavity defined by the housing using an adhesive. The adhesive may include thermal tape. The linear lighting device may include a plurality of mounting brackets configured to attach the linear lighting device to a horizontal structure. The linear lighting device may include a cover lens. The linear lighting device may include an input end cap and an output end cap. The input end cap may be configured to cover a first end of the cavity of the housing. The output end cap may be configured to cover a second end of the cavity of the housing. The linear lighting device may include a fixture controller configured to receive an alternating-current (AC) mains line voltage and generate the DC bus voltage on the DC power bus. The fixture controller may be configured to send the one or more messages to one or more of the plurality of lighting modules.

The fixture controller may be configured to generate a timing signal to send to each of the plurality of lighting modules.

A master lighting module may be configured to determine an order of a plurality of drone lighting modules communicatively coupled to the master lighting module. The master lighting module may be configured to iteratively send a plurality of control messages to the unique addresses of each of the plurality of drone lighting modules. The master lighting module may be configured to measure, after each control message of the plurality of control messages is sent, a voltage on a communication line between the master lighting module and the plurality of drone lighting modules. The master lighting module may be configured to associate each of a plurality of measured voltages with each of the drone lighting modules based on respective unique addresses of the plurality of drone lighting modules. The master lighting module may be configured to determine the order of the plurality of drone lighting modules communicatively coupled to the master lighting module based on the plurality of measured voltages.

A linear lighting assembly may include a fixture controller, a plurality of master lighting modules, and a plurality of drone lighting modules. The fixture controller may be configured to control the plurality of master lighting modules and/or the plurality of drone lighting modules. The fixture controller may be configured to determine an order of the plurality of master lighting modules communicatively coupled to the fixture assembly. For example, the fixture controller may use measured voltages and/or communications to determine the order of the plurality of master lighting modules.

A master lighting module may be configured to generate a timing signal. For example, the master lighting module may be configured to receive, from a fixture controller, a synchronization pulse that indicates a length of a synchronization frame. The master lighting module may be configured to generate, based on the synchronization pulse, a timing signal. The timing signal may indicate a synchronization period during which a plurality of emitters of each of the plurality of drone lighting modules are able to synchronize. The master lighting module may be configured to send, to the plurality of drone lighting modules via a synchronization line, the generated timing signal. The plurality of emitters may be configured to synchronize according to the generated timing signal.

DETAILED DESCRIPTION

Figure 1:
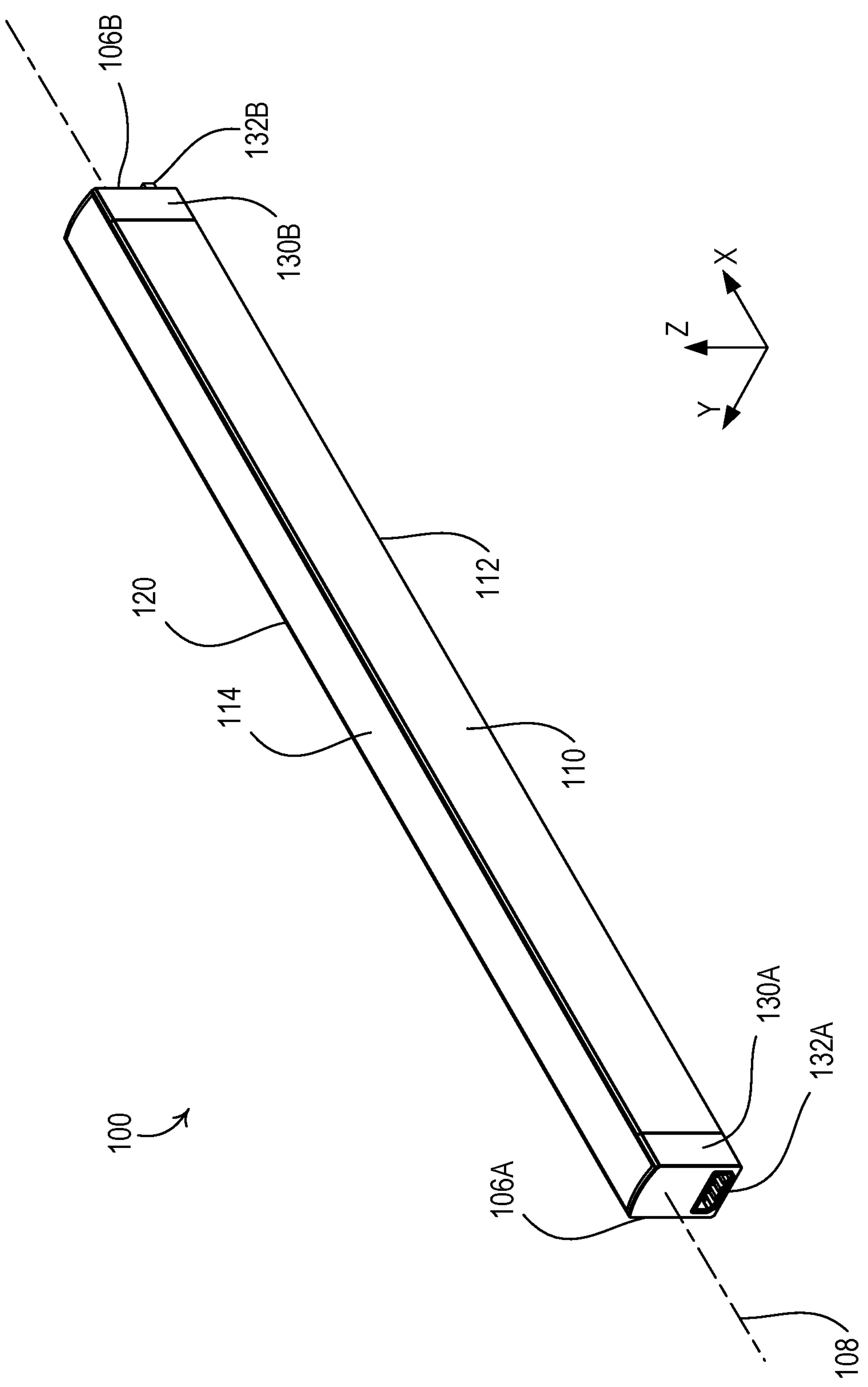
FIG. 1 is a simplified perspective view of an example linear lighting device.

FIG. 1 is a simplified perspective view of an example linear lighting device 100, (e.g., a linear lighting fixture). The linear lighting device 100 may include a housing 110, a cover lens 120, and end caps 130A, 130B. The housing 110 may be elongate (e.g., in the x-direction). The housing 110 may be configured to be mounted to a structure (e.g., a horizontal structure) such that the linear lighting device is attached to the structure. For example, the linear lighting device 100 may be configured to be mounted underneath a cabinet, a shelf, a door, a step, and/or some other structure. The housing 110 may define an upper surface 112 and a lower surface 114. The upper surface 112 may be configured to be proximate to the structure and the lower surface 114 may be distal to the structure when the housing 110 is mounted to the structure.

The linear lighting device 100 may define a first end 106A (e.g., an input end) and an opposed second end 106B (e.g., an output end). The end cap 130A may be an input end cap located at the first end 106A and the end cap 130B may be an output end cap located at the second end 106B. The linear lighting device 100 may define connectors 132A, 132B that are accessible via the respective end caps 130A, 130B. The connectors 132A, 132B may be configured to connect the linear lighting device 100 to a fixture controller (e.g., a controller, a lighting controller and/or a fixture controller such as the fixture controller 520 shown in FIG. 6) and/or other linear lighting devices. For example, the connector 132A may be configured to connect the linear lighting device 100 to the controller or another linear lighting device and the connector 132B may be configured to connect the linear lighting device 100 to another linear lighting device.

Figure 2:
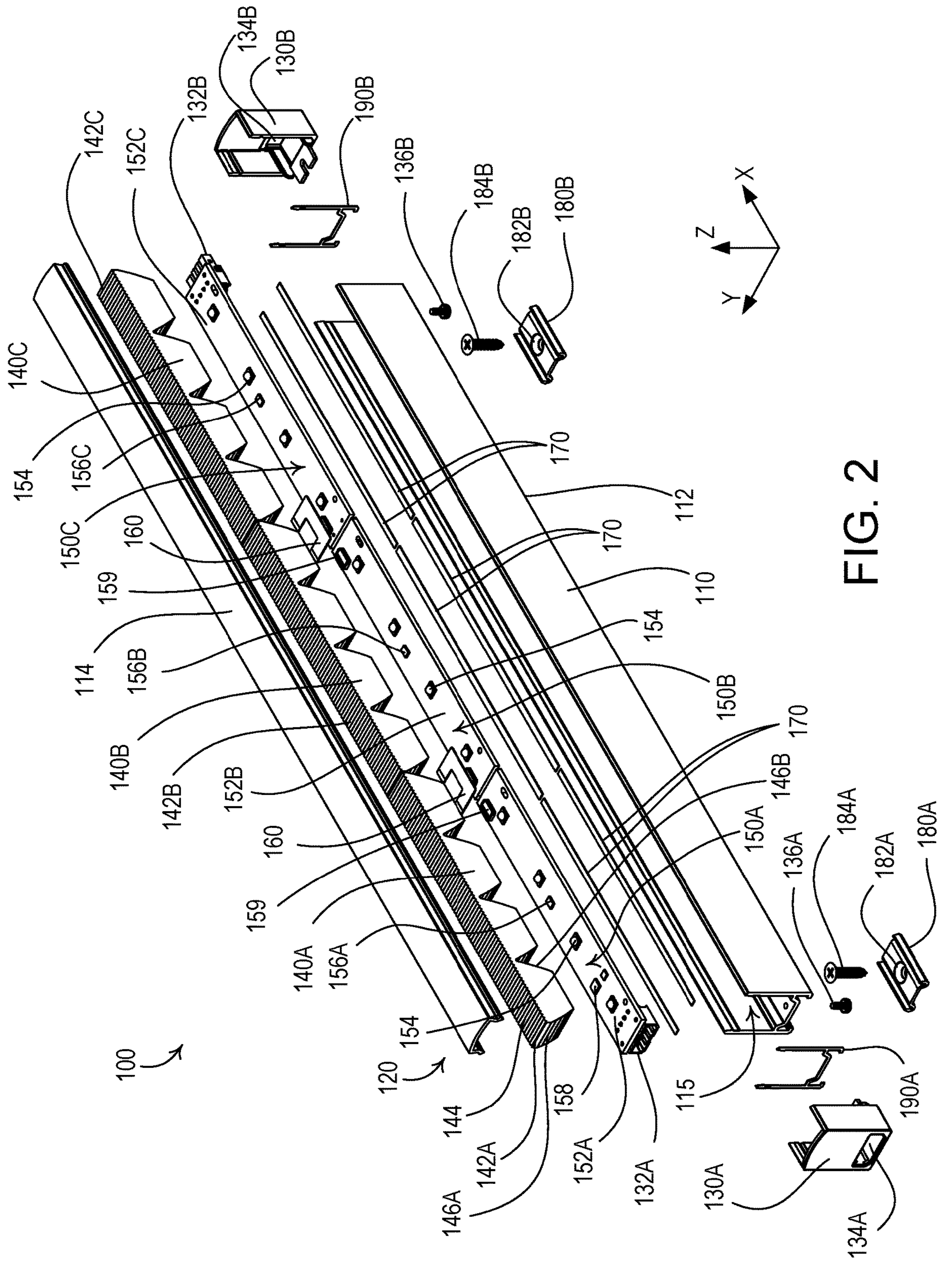
FIG. 2 is a partially exploded view of the linear lighting device of FIG. 1.

FIG. 2 is an exploded view of the example linear lighting device 100. The housing 110 may define a cavity 115 extending along a longitudinal axis 108 (e.g., in the x-direction) of the linear lighting device 100 (e.g., the housing 110). The linear lighting device 100 may comprise one or more lighting modules (e.g., light-generation modules) 150A, 150B, 150C that may be received within the cavity 115. The lighting modules may each comprise a respective printed circuit board (PCB) 152A, 152B, 152C. The lighting modules may each comprise one or more emitter modules 154 (in this example, each lighting module 150A, 150B, 150C includes four respective emitter modules 154), which may each include one or more emitters, such as light-emitting diodes (LEDs). The emitter modules 154 may be mounted to the respective PCBs 152A, 152B, 152C. Each of the PCBs 152A, 152B, 152C may include an emitter processor 156A, 156B, 156C configured to control the emitter modules 154 of the respective lighting module 150A, 150B, 150C. When the lighting modules 150A, 150B, 150C include a plurality of emitter modules 154, each of the plurality of emitter modules 154 of a respective lighting module (e.g., lighting module 150A) may be controlled by one emitter processor (e.g., emitter processor 156A). Controlling multiple emitter modules 154 with one emitter processor may reduce the power consumption of the lighting module, reduce a size of the PCB, and/or reduce a number of messages sent.

The lighting modules 150A, 150B, 150C (e.g., the PCBs 152A, 152B, 152C) may be secured within the cavity 115, for example, using thermal tape 170. The thermal tape 170 may be an adhesive that enables heat dissipation from the emitters 154 of the PCBs 152A, 152B, 152C to the housing 110, for example, while also affixing the PCBs 152A, 152B, 152C to the housing 110. The thermal tape 170 may be separated into segments (e.g., two or more) for each of the PCBs 152A, 152B, 152C. Alternatively, it should be appreciated that the thermal tape 170 may be continuous along the length (e.g., in the x-direction) of the linear lighting device 100.

The PCBs 152A, 152B, 152C of the lighting modules 150A, 150B, 150C may be connected together using cables 160 (e.g., ribbon cables). The cables 160 may mechanically, electrically, and/or communicatively connect adjacent PCBs of the PCBs 152A, 152B, 152C. For example, the PCB 152A may be connected to the PCB 152B via one of the cables 160 and the PCB 152B may be connected to the PCB 152C via another one of the cables 160. For example, the ends of the cables 160 may be inserted into sockets 159, such as zero-insertion force (ZIF) connectors, on PCBs of the adjacent lighting modules. The cables 160 may be flat flexible cable jumpers, as shown. Alternatively, the cables 160 may be round flexible jumpers, rigid jumpers, and/or the like.

The lighting modules 150A may be a master module (e.g., a starter module). For example, the master module may be a first module of the linear lighting device 100 that is located proximate to the first end 106A. For example, each linear lighting device 100 may start with a master module (e.g., such as the lighting module 150A). A master module may receive messages (e.g., including control data and/or commands) and may be configured to control one or more other lighting modules, for example, drone lighting modules, based on receipt of the messages. For example, each master module may include an additional processor (e.g., a master processor 158). The lighting modules 150B, 150C may be drone lighting modules. Each drone lighting module may be controlled by a master module. For example, the lighting modules 150B, 150C may be controlled by the lighting module 150A. The master processor 158 of the lighting module 150A may control the emitter processors 156A, 156B, 156C to control the emitter modules 154 of each of the lighting modules 150A, 150B, 150C. Drone lighting modules may be either a middle drone lighting module or an end drone module. Middle drone lighting modules (e.g., such as the emitter module 150B) may be connected between a master module and another drone lighting module. Middle drone lighting modules may be connected between other drone lighting modules. End drone lighting modules (e.g., such as the lighting module 150C) may be connected between a master module or another drone lighting module of its respective linear lighting device and another linear lighting device. End drone lighting modules may be connected between another drone lighting module and another master module (e.g., when the linear lighting device 100 includes multiple master modules). Although the linear lighting device 100 is shown having three lighting modules, for example, a master module 150A, a middle drone lighting module 150B, and an end drone lighting module 150C, it should be appreciated that a linear lighting device may include a plurality of master modules. Each master module may control a plurality (e.g., one or more) of drone lighting modules (e.g., up to five drone lighting modules).

Each master module (e.g., the lighting module 150A) of the linear lighting device 100 may include a connector 132A (e.g., an input connector) attached thereto. For example, the connector 132A may be a female connector. The connector 132A may be configured to enable connection of the linear lighting device 100 to a fixture controller (e.g., a controller and/or a fixture controller, such as fixture controller 520 shown in FIG. 6). The connector 132A may be configured to enable connection of the linear lighting device 100 to another linear lighting device. The connector 132A may be configured to enable connection of the master module (e.g., the lighting module 150A) of the linear lighting device 100 to a drone lighting module (e.g., an end drone lighting module) of another linear lighting device. Each end drone lighting module (e.g., the lighting module 150C) of the linear lighting device 100 may include a connector 132B (e.g., an input connector) attached thereto. For example, the connector 132B may be a male connector. The connector 132B may be configured to enable connection of the linear lighting device 100 to another linear lighting device. The connector 132B may be configured to enable connection of the end drone lighting module (e.g., the lighting module 150C) of the linear lighting device 100 to a master module of another linear lighting device.

The linear lighting device 100 may comprise end caps 130A, 130B. The end caps 130A, 130B may define apertures 134A, 134B that are configured to receive the connector 132A and/or the connector 132B. The end caps 130A, 130B may be secured to the housing 110, for example, using fasteners 136A, 136B. Light gaskets 190A, 190B may be configured to prevent light emitted by the emitter PCBs 150A, 150B, 150C from escaping between the end caps 130A, 130B and the housing 110. The light gasket 190A may be configured to be located between the end cap 130A and the housing 110. The light gasket 190B may be configured to be located between the end cap 130B and the housing 110.

The linear lighting device 100 may comprise total internal reflection (TIR) lenses 140A, 140B, 140C. The TIR lenses 140A, 140B 140C may be configured to diffuse the light emitted by the emitters 154 of the lighting modules 150A, 150B, 150C. For example, each of the TIR lenses 140A, 140B, 140C may be configured to be located proximate to a respective one of the lighting modules 150A, 150B, 150C. That is, the TIR lens 140A may be located proximate to (e.g., directly above) the lighting module 150A, the TIR lens 140B may be located proximate to (e.g., directly above) the lighting module 150B, and the TIR lens 140C may be located proximate to (e.g., directly above) the lighting module 150C. Each of the TIR lenses 140A, 140B, 140C may define a plurality of polytopes (e.g., hexahedrons) connected together. Each of the plurality of polytopes may be funnel portions that are configured to funnel the light from the emitter modules 154 toward the cover lens 120. Each of the TIR lenses 140A, 140B, 140C may have a number of funnel portions that is equal to the number of emitter modules 154 of the respective lighting module over which the respective TIR lens is located. Each of the plurality of polytopes may define a plurality of faces. The lower surface 144 and side surfaces 146A, 146B of each of the TIR lenses 140A, 140B, 140C (e.g., upper and side faces of each of the plurality of polytopes) may define a plurality of ridges 142A, 142B, 142C. The plurality of ridges 142A, 142B, 142C may be parallel to one another. Each of the plurality of ridges 142A, 142B, 142C may extend in a direction perpendicular to a length of the housing 110 (e.g., perpendicular to the longitudinal axis 108 of the housing). For example each of the plurality of ridges 142A, 142B, 142C may oriented in a direction parallel to the y-direction.

A length of the TIR lenses 140A, 140B, 140C may correspond to a length of a corresponding one of the lighting modules 150A, 150B, 150C. The TIR lenses 140A, 140B, 140C may be made of a UV resistant material, for example, such as an acrylic, a polycarbonate, and/or the like. The TIR lenses 140A, 140B, 140C may be transparent, semi-transparent, and/or colored.

The linear lighting device 100 may also comprise mounting brackets 180A, 180B. The mounting brackets 180A, 180B may be configured to attach the linear lighting device 100 to the structure. For example, the mounting brackets 180A, 180B may engage the upper surface 112 of the housing 110. The mounting brackets 180A, 180B may define respective holes 182A, 182B that are configured to receive respective fasteners 184A, 184B configured to attach the mounting brackets 180A, 180B to the structure.

Although the figures depict the linear lighting device 100 with the TIR lenses 140A, 140B, 140C, it should be appreciated that the linear lighting device 100 may not include the TIR lenses 140A, 140B, 140C. In this case, a height of the housing 110 may be reduced in the z-direction which would enable a lower profile for the linear lighting device 100.

FIGS. 3A-3E are perspective views of example lighting modules 200A, 200B, 200C, 200D, 200E (e.g., such as the lighting modules 150A, 150B, 150C shown in FIG. 2). The lighting modules 200A, 200B, 200C, 200D, 200E may be configured to be used in a linear lighting device (e.g., such as the linear lighting device 100). Each of the lighting modules 200A, 200B, 200C, 200D, 200E may comprise respective printed circuits board (PCB) 202 (e.g., such as the PCBs 152A, 152B, 152C of the linear lighting device 100). Each of the PCBs 202 may have a length of 3 or 4 units (e.g., 3 or 4 inches, centimeters, etc.). When the PCBs 202 of the lighting modules 200A, 200B, 200C, 200D, 200E have a length of 3 or 4 units, the linear lighting device may be configured to have any length of 10 units or greater in one unit increments. Also, when the PCBs 202 have a length of 3 or 4 units, the linear lighting device may be configured to have a length of 3 units (e.g., one 3 unit PCB), 4 units (e.g., one 4 unit PCB), 6 units (e.g., two 3 unit PCBs), 7 units (e.g., one 3 unit PCB and one 4 unit PCB), 8 units (e.g., two 4 unit PCBs), or 9 units (e.g., three 3 unit PCBs). Each of the lighting modules 200A, 200B, 200C, 200D, 200E may include a plurality of emitter modules 210 (e.g., the emitter modules 154) mounted to the respective PCBs 202. The number of emitter modules 210 may be based on a length of the PCB of the respective emitter lighting module. For example, a 3-inch lighting module may include three emitter modules 210 and a 4-inch lighting module may include four emitter modules 210. The emitter modules 210 may be aligned linearly on each printed circuit board 202 as shown in FIGS. 3A-3E. For example, the emitter modules 210 may be equally spaced apart, e.g., approximately one inch apart. Although the lighting modules 200A, 200B, 200C, 200D, 200E are depicted in FIGS. 3A-3E with three or four emitter modules 210 linearly aligned and equally spaced apart, the lighting modules 200A, 200B, 200C, 200D, 200E could have any number of emitter modules in any alignment and spaced apart by any distance.

The emitter modules 210 on the lighting modules 200A, 200B, 200C, 200D, 200E may be rotated (e.g., in a plane defined by the x-axis and the y-axis) with respect to one another. For example, a first emitter module may be arranged in a first orientation and an adjacent emitter module may be arranged in a second orientation that is rotated by a predetermined angle with respect to the first orientation. Successive emitter modules may be arranged in orientations that are rotated by the predetermined angle with respect to an adjacent emitter module.

When lighting modules have a length of 4 units (e.g., inches), each of the emitter modules 210 may be rotated by 90 degrees with respect to adjacent emitter modules 210. For example, the second emitter module (e.g., in the x-direction) may be rotated 90 degrees (e.g., clockwise or counter-clockwise) from the first emitter module, the third emitter module (e.g., in the x-direction) may be rotated 90 degrees in the same direction (e.g., clockwise or counter-clockwise), and the fourth emitter module may be rotated 90 degrees in the same direction (e.g., clockwise or counter-clockwise) with respect to the third emitter module. Stated differently, the second emitter module may be oriented 90 degrees offset from the first emitter module, the third emitter module may be oriented 180 degrees offset from the first emitter module, and the fourth emitter module may be oriented 270 degrees offset from the first emitter module.

When lighting modules have a length of 3 units (e.g., inches), each of the emitter modules 210 may be rotated by 120 degrees with respect to adjacent emitter modules 210. For example, the second emitter module (e.g., in the x-direction) may be rotated 120 degrees (e.g., clockwise or counter-clockwise) from the first emitter module, and the third emitter module (e.g., in the x-direction) may be rotated 120 degrees in the same direction (e.g., clockwise or counter-clockwise) with respect to the second emitter module. Stated differently, the second emitter module may be oriented 120 degrees offset from the first emitter module, the third emitter module may be oriented 240 degrees offset from the second emitter module.

Figure 3A:
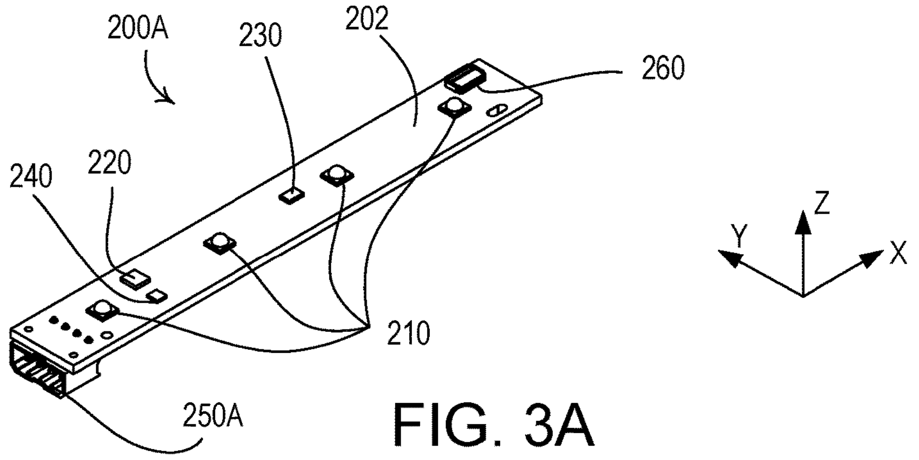
FIGS. 3A-3E are example light emitting diode (LED) printed circuit boards for the linear lighting device of FIG. 1.

FIG. 3A depicts an example master lighting module 200A (e.g., such as the lighting module 150A shown in FIG. 2). The master lighting module 200A may include a plurality of emitter modules 210 (e.g., four) mounted to a PCB 202. The PCB 202 of the master lighting module 200A may have a length that is defined in four units (e.g., four inches, four centimeters, etc.). It should be appreciated that the master lighting module 200A may also have a length that is defined in three units. The master lighting module 200A may include a master control circuit 220 (e.g., the master processor 158 shown in FIG. 2) and an emitter control circuit 230 (e.g., the emitter processor 156A shown in FIG. 2). The master lighting module 200A may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the master lighting module 200A. The master control circuit 220 may be configured to receive messages (e.g., from a fixture controller such as the fixture controller 520 shown in FIG. 6), for example, via the communication circuit 240. The messages may include control data and/or commands for controlling the emitter modules 210. The master control circuit 220 may be configured to control one or more other lighting modules, for example, drone lighting modules, based on receipt of the messages. For example, the messages may be received by the communication circuit 240. The communication circuit 240 may relay the messages to the master control circuit 220. The master control circuit 220 may send the messages to the emitter control circuit 230 of the master lighting module 200A and to the emitter control circuit 230 of any other drone lighting module (e.g., such as the drone lighting modules 200B, 200C, 200D, 200E) of the linear lighting device.

The master lighting module 200A may include a connector 250A (e.g., the connector 132A shown in FIG. 2) that is configured to connect the master lighting module 200A to a fixture controller (e.g., such as the fixture controller 520 shown in FIG. 6) or another lighting module (e.g., a drone lighting module). The connector 250A may be a female connector. The master lighting module 200A may include a socket 260 (e.g., one of the sockets 159 shown in FIG. 2) that is configured to connect the master lighting module 200A to an adjacent drone lighting module. The socket 260 may be configured to receive a cable (e.g., such as the cable 160 shown in FIG. 2). For example, the socket 260 may comprise a zero-insertion force (ZIF) connector. Although FIG. 3A depicts the master module 200A having one socket 260, it should be appreciated that the master module 200A may have two sockets 260 (e.g., one at each end of the board 202). For example, a linear lighting device may have more than one master module 200A. When there are two or more master modules in a linear lighting device, the first master module may be a starter master module (e.g., such as master module 200A) with one socket 260 and the second master module may be a master middle module with two sockets 260. The master middle module may be configured to connect to two drone lighting modules (e.g., one on each side of the master middle module).

Figure 3B:
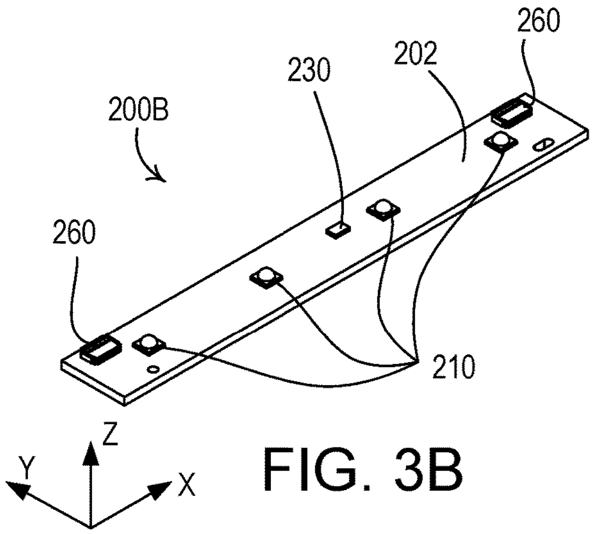

FIG. 3B depicts an example drone lighting module 200B (e.g., a middle drone lighting module, such as the lighting module 150B shown in FIG. 2). The drone lighting module 200B may include a plurality of emitter modules 210 (e.g., four) mounted to a PCB 202. The PCB 202 of the drone lighting module 200B may have a length that is defined in four units (e.g., four inches, four centimeters, etc.). The drone lighting 200B may include an emitter control circuit 230 (e.g., the emitter processor 156B shown in FIG. 2). The drone lighting module 200B may also comprise a drive circuit (not shown) configured to conduct current through one or more emitters of each of the emitter modules 210 to cause the emitter modules to emit light. The emitter control circuit 230 of the drone lighting module 200B may receive messages from the master lighting module 200A. The emitter control circuit 230 may be configured to control the drive circuit to control the intensity level and/or color of the light emitted by the plurality of emitter modules 210 mounted to the PCB 202 of the drone lighting module 200B. The drone lighting module 200B may include a pair of sockets 260 (e.g., two of the sockets 159 shown in FIG. 2) that are configured to connect the drone lighting module 200B to one or more adjacent drone lighting modules and/or a master lighting module. The sockets 260 may be configured to receive cables (e.g., such as the cables 160 shown in FIG. 2). For example, the sockets 260 may comprise a zero-insertion force (ZIF) connectors.

Figure 3C:
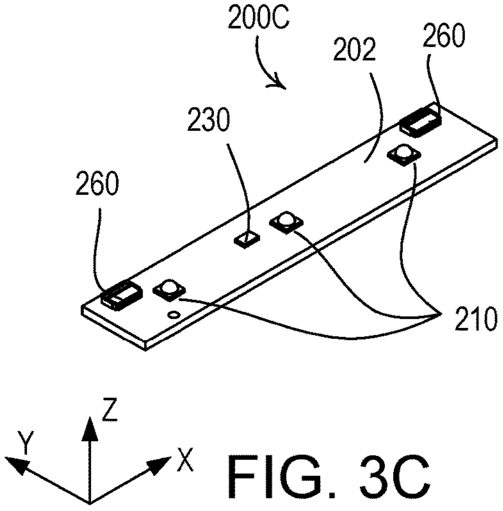

FIG. 3C depicts another example drone lighting module 200C (e.g., a middle drone lighting module). The drone lighting module 200C may include a plurality of emitter modules 210 (e.g., three) mounted to a PCB 202. The PCB 202 of the drone lighting module 200C may have a length that is defined in three units (e.g., three inches, three centimeters, etc.). The drone lighting module 200C may include an emitter control circuit 230 (e.g., an emitter processor). The emitter control circuit 230 of the drone lighting module 200C may receive messages from the master lighting module 200A. The drone lighting module 200C may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the drone lighting module 200C. The drone emitter PCB 200C may include a pair of sockets 260 (e.g., two of the sockets 159 shown in FIG. 2) that are configured to connect the drone lighting module 200B to one or more adjacent drone lighting module and/or a master lighting module. The sockets 260 may be configured to receive cables (e.g., such as the cables 160 shown in FIG. 2). For example, the sockets 260 may comprise a zero-insertion force (ZIF) connectors.

Figure 3D:
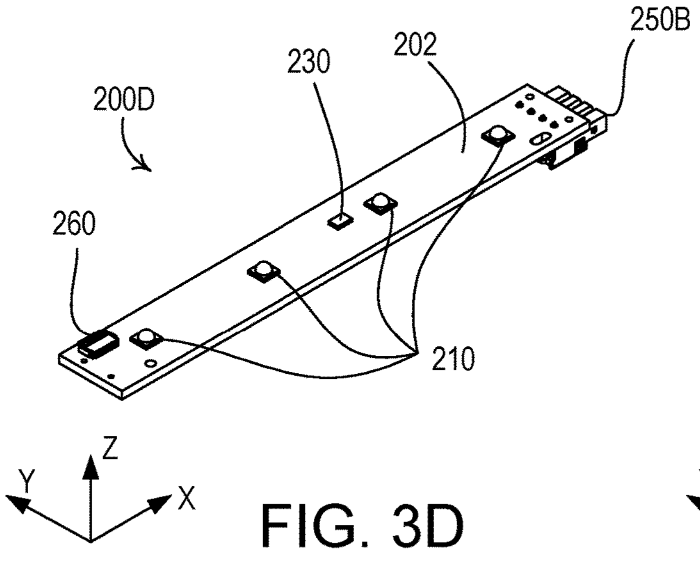

FIG. 3D depicts an example drone lighting module 200D (e.g., an end drone lighting module, such as the lighting module 150C shown in FIG. 2). The drone lighting module 200D may include a plurality of lighting modules 210 (e.g., four) mounted to a PCB 202. The PCB 202 of the drone lighting module 200D may have a length that is defined in four units (e.g., four inches, four centimeters, etc.). The drone lighting module 200D may include an emitter control circuit 230 (e.g., the emitter processor 156C shown in FIG. 2). The emitter control circuit 230 of the drone lighting module 200D may receive messages from the master lighting module 200A. The drone lighting module 200D may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the drone lighting module 200D. The drone lighting module 200D may include a connector 250B (e.g., the connector 132B shown in FIG. 2) that is configured to connect the drone lighting module 200D to another linear lighting device (e.g., a master lighting module of the other linear lighting device). The connector 250B may be a male connector. The drone lighting module 200D may include a socket 260 (e.g., one of the sockets 159 shown in FIG. 2) that is configured to connect the drone lighting module 200D to an adjacent drone lighting module or a master lighting module. The receptacle 260 may be configured to receive a cable (e.g., such as the cable 160 shown in FIG. 2). For example, the socket 260 may comprise a zero-insertion force (ZIF) connector.

Figure 3E:
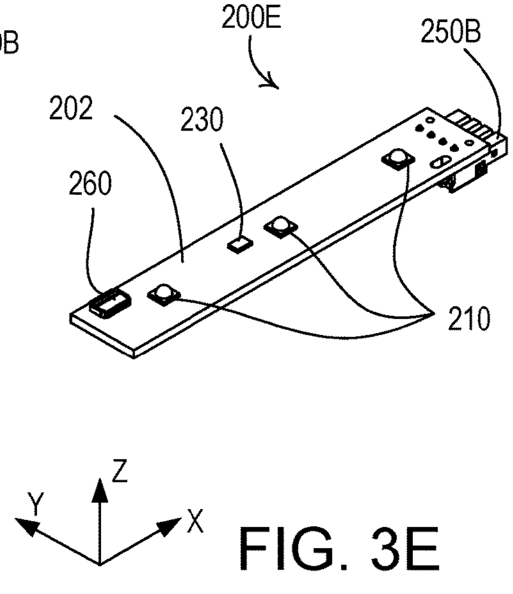

FIG. 3E depicts an example drone lighting module 200E (e.g., an end drone lighting module). The drone lighting module 200E may include a plurality of emitter modules 210 (e.g., three) mounted to a PCB 202. The PCB 202 of the drone lighting module 200E may have a length that is defined in three units (e.g., three inches, three centimeters, etc.). The drone lighting module 200E may include an emitter control circuit 230 (e.g., an emitter processor). The emitter control circuit 230 of the drone lighting module 200E may receive messages from the master lighting module 200A. The drone lighting module 200E may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the drone lighting module 200E. The drone lighting module 200E may include a connector 250B (e.g., the connector 132B shown in FIG. 2) that is configured to connect the drone lighting module 200E to another linear lighting device (e.g., a master lighting module of the other linear lighting device). The connector 250B may be a male connector. The drone lighting device 200E may include a socket 260 (e.g., one of the sockets 159 shown in FIG. 2) that is configured to connect the drone lighting device 200E to an adjacent drone lighting module or a master lighting module. The socket 260 may be configured to receive a cable (e.g., such as the cable 160 shown in FIG. 2). For example, the socket 260 may comprise a zero-insertion force (ZIF) connector.

Figure 4A:
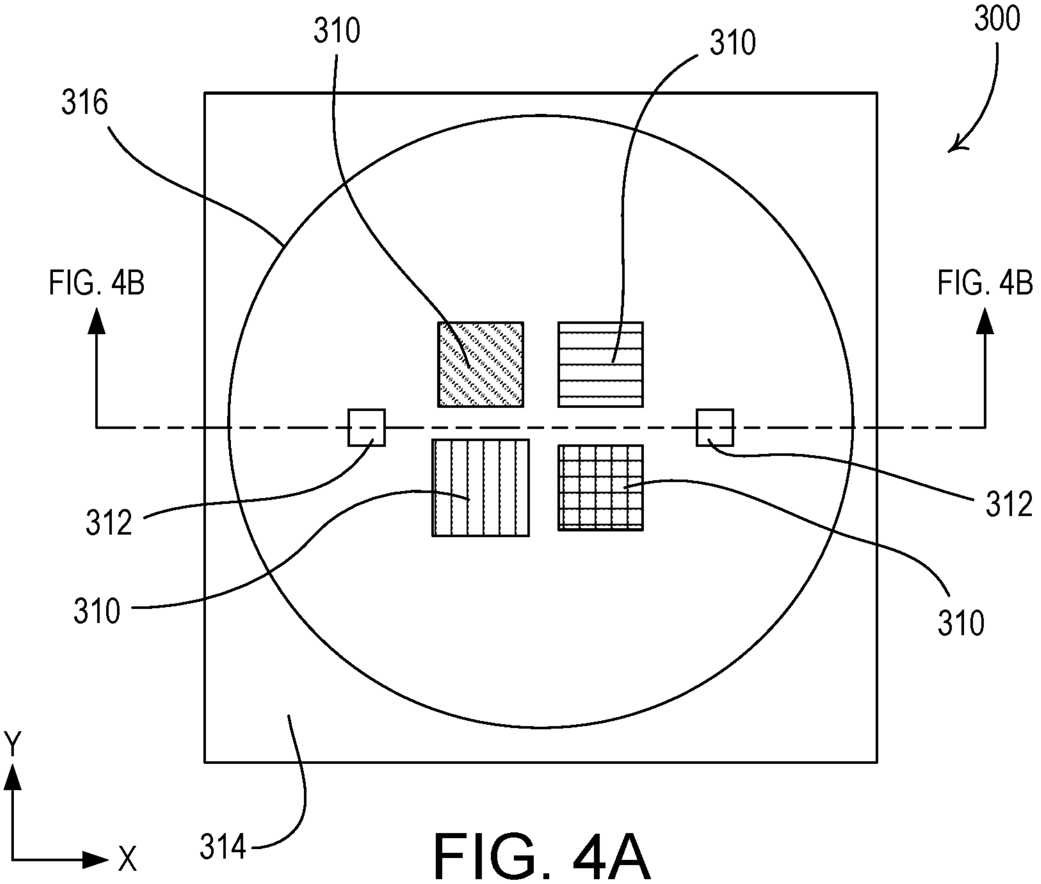
FIG. 4A is a top view of an example emitter module.
Figure 4B:
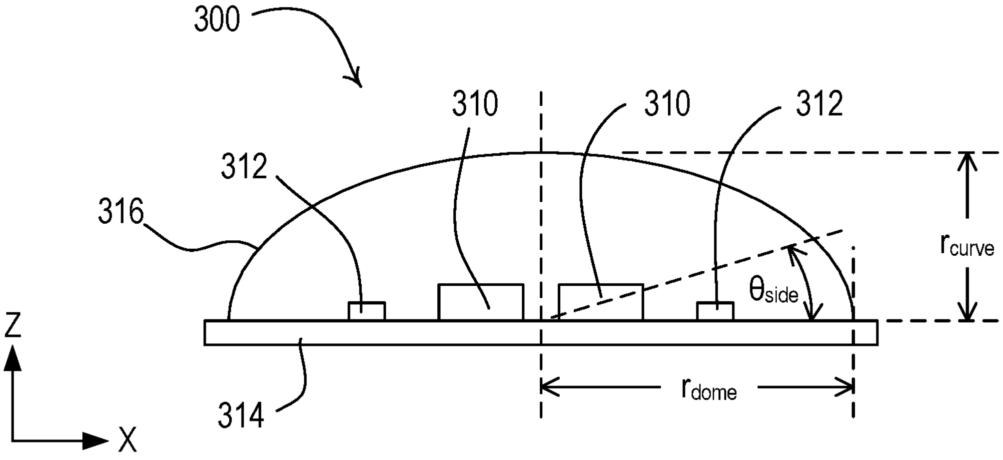
FIG. 4B is a side cross-sectional view of the emitter module of FIG. 5A.

FIG. 4A is a top view of an example emitter module 300 (e.g., such as the emitter modules 154 shown in FIG. 2 and/or the emitter modules 210 shown in FIGS. 3A-3E). FIG. 4B is a side cross-section view of the emitter module 300 taken through the center of the emitter module (e.g., through the line shown in FIG. 4A). The emitter module 300 may comprise an array of four emitters 310 (e.g., emission LEDs) and two detectors 312 (e.g., detection LEDs) mounted on a substrate 314 and encapsulated by a dome 316. The emitters 310, the detectors 312, the substrate 314, and the dome 316 may form an optical system. The emitters 310 may each emit light of a different color (e.g., red, green, blue, and white or amber), and may be arranged in a square array as close as possible together in the center of the dome 316, so as to approximate a centrally located point source. The detectors 312 may be any device that produces current indicative of incident light, such as a silicon photodiode or an LED. For example, the detectors 312 may each be an LED having a peak emission wavelength in the range of approximately 550 nm to 700 nm, such that the detectors 312 may not produce photocurrent in response to infrared light (e.g., to reduce interference from ambient light). For example, a first one of the detectors 312 may comprise a small red, orange or yellow LED, which may be used to measure a luminous flux of the light emitted by the red LED of the emitters 310. A second one of the detectors 312 may comprise a green LED, which may be used to measure a respective luminous flux of the light emitted by each of the green and blue LEDs of the emitters 310. Both of the detectors 312 may be used to measure the luminous flux of the white LED of the emitters 310 at different wavelengths (e.g., to characterize the spectrum of the light emitted by the white LED).

The substrate 314 of the emitter module 300 may be a ceramic substrate formed from an aluminum nitride or an aluminum oxide material or some other reflective material, and may function to improve output efficiency of the emitter module 300 by reflecting light out of the emitter module through the dome 316. The dome 316 may comprise an optically transmissive material, such as silicon or the like, and may be formed through an over-molding process, for example. A surface of the dome 316 may be lightly textured to increase light scattering and promote color mixing, as well as to reflect a small amount of the emitted light back toward the detectors 312 mounted on the substrate 314 (e.g., about 5%). The size of the dome 316 (e.g., a diameter of the dome in a plane of the LEDs 310) may be generally dependent on the size of the LED array. The diameter of the dome may be substantially larger (e.g., about 1.5 to 4 times larger) than the diameter of the array of LEDs 310 to prevent occurrences of total internal reflection.

The size and shape (e.g., curvature) of the dome 316 may also enhance color mixing when the emitter module 300 is mounted near other emitter modules (e.g., in a similar manner as the emitter modules 210 mounted to the emitter PCBs 200A, 200B, 200C, 200D, 200E of the linear lighting device 100). For example, the dome 316 may be a flat shallow dome as shown in FIG. 4B. A radius $r_{dome}$ of the dome 316 in the plane of the emitters 310 array may be, for example, approximately 20-30% larger than a radius $r_{curve}$ of the curvature of the dome 316. For example, the radius $r_{dome}$ of the dome 316 in the plane of the LEDs 310 may be approximately 4.8 mm and the radius $r_{curve}$ of the dome curvature (e.g., the maximum height of the dome 316 above the plane of the LEDs 310) may be approximately 3.75 mm. Alternatively, the dome 316 may have a hemispherical shape. In addition, one skilled in the art would understand that alternative radii and ratios may be used to achieve the same or similar color mixing results.

By configuring the dome 316 with a substantially flatter shape, the dome 316 allows a larger portion of the emitted light to emanate sideways from the emitter module 300 (e.g., in an X-Y plane as shown in FIGS. 5A and 5B). Stated another way, the shallow shape of the dome 316 allows a significant portion of the light emitted by the emitters 310 to exit the dome at small angles ° side relative to the horizontal plane of the array of emitters 310. For example, the dome 316 may allow approximately 40% of the light emitted by the array of emitters 310 to exit the dome 316 at approximately 0 to 30 degrees relative to the horizontal plane of the array of emitters 310. When the emitter module 300 is mounted near other emitter modules (e.g., as in a linear light source such as the linear lighting device 100), the shallow shape of the dome 316 may improve color mixing in the linear lighting device by allowing a significant portion (e.g., 40%) of the light emitted from the sides of adjacent emitter modules to intermix before that light is reflected back out of the linear lighting device. Examples of emitter modules, such as the emitter module 200, are described in greater detail in U.S. Pat. No. 10,161,786, issued Dec. 25, 2018, entitled EMITTER MODULE FOR AN LED ILLUMINATION DEVICE, the entire disclosure of which is hereby incorporated by reference.

Figure 5:
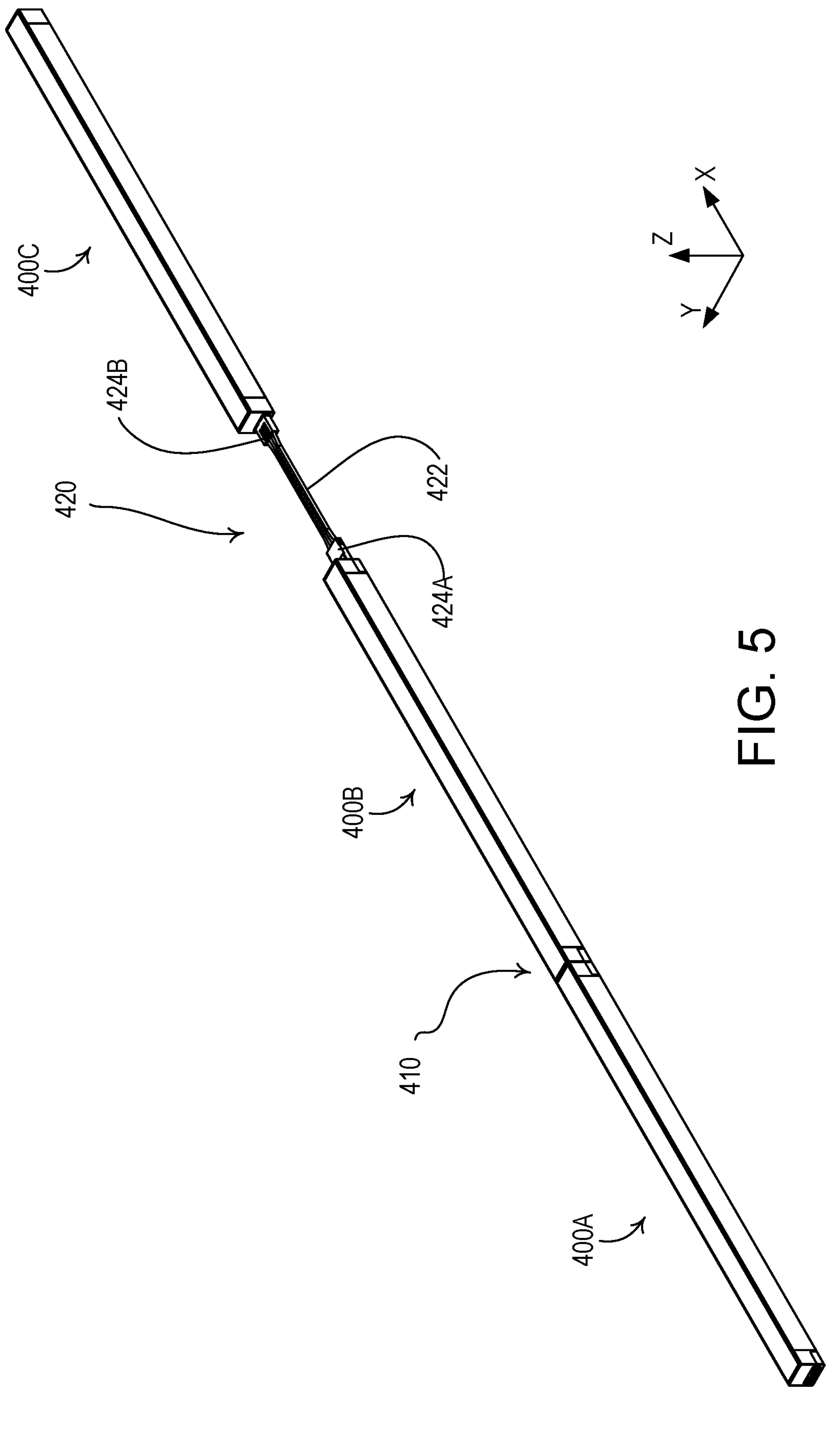
FIG. 5 is a perspective view showing example end-to end and wired connections of the linear lighting devices of FIG. 1.

FIG. 5 is a perspective view of a plurality of example linear lighting devices 400A, 400B, 400C connected together. The linear lighting devices 400A, 400B, 400C may be directly connected (e.g., via an end-to-end connection 410) or via a wired connection 420. For example, the linear lighting device 400A may be directly connected to the linear lighting device 400B using an end-to-end connection 410. The end-to-end connection 410 may include a male connector (e.g., such as the connector 132B shown in FIG. 1 and/or the connector 250B shown in FIGS. 3D, 3E) of the linear lighting device 400A engaging with (e.g., received within) a female connector (e.g., such as the connector 132A shown in FIGS. 1, 2 and/or the connector 250A shown in FIG. 3A). Although the end-to-end connection 410 is shown as a straight connection, it should be appreciated that the end-to-end connection 410 may also include an angled connection (e.g., such as a 90-degree connection). The linear lighting device 400B may be connected to the linear lighting device 400C using the wired connection 420. The wired connection 420 may include a cable 422 that is configured to engage (e.g., received by or within) with a connector (e.g., such as the connector 132B shown in FIG. 1 and/or the connector 250B shown in FIGS. 3D, 3E) of the linear lighting device 400B. The cable 422 may be configured to engage (e.g., received by or within) with a connector (e.g., such as the connector 132A shown in FIGS. 1, 2 and/or the connector 250A shown in FIG. 3A) of the linear lighting device 400C. For example, the cable 422 may define connectors 424A, 424B configured to mate with the connectors of the linear lighting device 400A, 400B. The length of the cable 422 may be configured based on the installation location of the linear lighting devices 400B, 400C.

Although FIG. 5 depicts three linear lighting devices 400A, 400B, 400C connected together using the end-to-end connection 410 and the wired connection 420, it should be appreciated that more or fewer than three linear lighting devices may be connected together using any combination of end-to-end connections 410 and/or wired connections 420.

Figure 6:
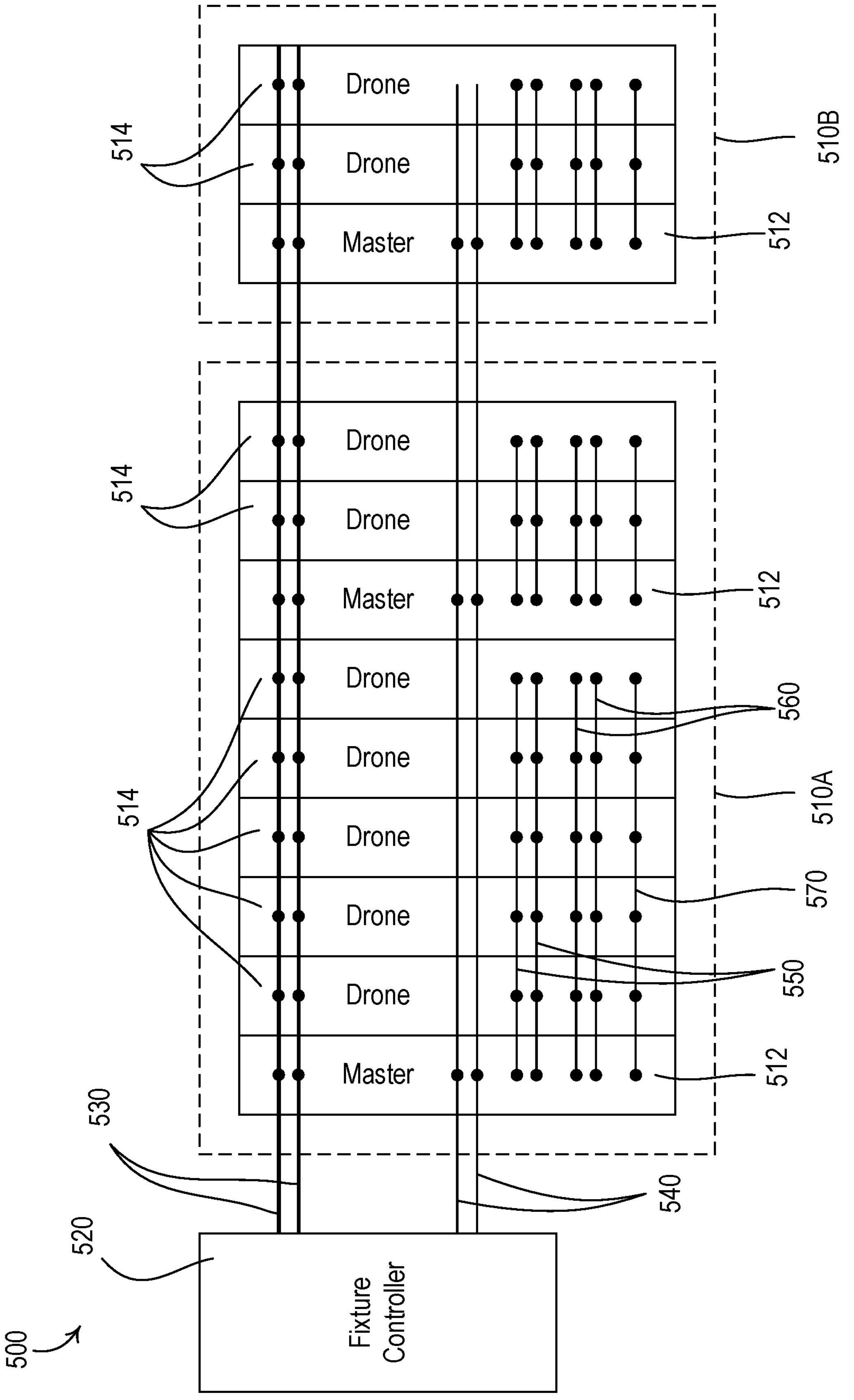
FIG. 6 is a simplified block diagram of a linear lighting assembly using the linear lighting device of FIG. 1.

FIG. 6 is a simplified block diagram of a lighting system 500 (e.g., a linear lighting system). The lighting system 500 may include a plurality of linear lighting devices 510A, 510B (e.g., such as the linear lighting device 100 shown in FIGS. 1, 2 and/or the linear lighting devices 400A, 400B, 400C shown in FIG. 5) and a fixture controller 520 (e.g., a controller and/or a lighting controller). The fixture controller 520 may receive a line voltage input (e.g., an alternating-current (AC) mains line voltage from an AC power source) and may generate a direct-current (DC) bus voltage on a power bus 530 (e.g., power wiring) for powering the plurality of linear lighting devices 510A, 510B. Each of the linear lighting devices 510A, 510B may include one or more master lighting modules 512 (e.g., such as the master lighting module 200A shown in FIG. 3A) and one or more drone lighting modules 514 (e.g., such as the drone lighting modules 200B, 200C, 200D, 200E shown in FIGS. 3B-3E). Each of the master lighting modules 512 and the drone lighting modules 514 of the linear lighting devices 510A, 510B may be coupled to the power bus 530 for receiving the DC bus voltage. Although the master lighting module 512 is illustrated in closest proximity to the fixture controller 520, in some examples the linear lighting devices 510A may be connected to the fixture controller 520 (e.g., rotated) such that the drone lighting module 514 is located between the fixture controller 520 and the master lighting module 512.

The fixture controller 520 may comprise a communication circuit that is configured to communicate (e.g., transmit and/or receive) messages that may include control data and/or commands for controlling the plurality of linear lighting devices 510A, 510B and/or external devices, for example, other control devices of a load control system, such as a remote control device and/or a system controller. The fixture controller 520 may be configured to communicate the messages via wireless signals on a wireless communication link, such as a radio-frequency (RF) communication link and/or via a wired communication link (e.g., a digital or analog communication link). The fixture controller 520 may be configured to receive messages including control data and/or commands for controlling the linear lighting devices 510A, 510B (e.g., for controlling the intensity and/or color of the linear lighting devices 510A, 510B) from an external device, and may be configured to transmit messages including control data and/or commands for controlling the linear lighting devices 510A, 510B (e.g., for controlling the intensity and/or color of the linear lighting devices 510A, 510B) to the linear lighting devices 510A, 510B (e.g., the master lighting modules 512).

One fixture controller (e.g., such as the fixture controller 520) may be used to control and/or power a plurality of linear lighting devices (e.g., such as the linear lighting devices 510A, 510B) of the lighting system 500 that are connected together. The fixture controller 520 may be configured to communicate messages with the plurality of linear lighting devices 510A, 510B. For example, the fixture controller 520 may transmit one or more messages to the master lighting modules 512 in each of the plurality of linear lighting devices 510A, 510B via a master communication bus 540 (e.g., a first wired digital communication link, such as an RS-485 communication link). In some examples, the master communication bus 540 may be connected to the master lighting modules 512 (e.g., all of the master lighting modules 512), but not the drone lighting modules 514. Each of the master lighting modules 512 may comprise a master communication circuit (e.g., the communication circuit 240 shown in FIG. 3A) for transmitting and/or receiving messages on the master communication bus 540. In some examples, such as when the master communication bus 540 is an RS-485 communication link, the master communication circuit may be an RS-485 transceiver. The messages may include control data and/or commands for controlling the linear lighting devices 510A, 510B (e.g., intensity, color control information, and/or the like, requests for information (e.g., such as addressing information) from the linear lighting devices 510A, 510B, etc).

The master lighting module 512 may be coupled to a plurality of the drone lighting modules 514 via one or more electrical connections, such as a drone communication bus 550 (e.g., an Inter-Integrated Circuit ($I^2C$) communication link), timing signal lines 560 (e.g., timing signal electrical conductors), and/or an interrupt request (IRQ) signal line 570 (e.g., an IRQ electrical conductor). The master lighting modules 512 may receive the messages from the fixture controller 520, and may relay the messages to the drone lighting modules 514 via the drone communication bus 550. For example, the master lighting modules 512 may convert the messages from the RS-485 communication protocol to the $I^2C$ communication protocol for transmission over the drone communication bus 550. In some examples, the master lighting module 512 may communication control messages including control data and/or command (e.g., intensity and/or color control commands) over the drone communication bus 550.

The fixture controller 520 may be configured to control the intensity level and/or color (e.g., color temperature) of the light emitted by each of the master lighting modules 512 and the drone lighting modules 514. The fixture controller 520 may be configured to individually or collectively control the intensity levels and/or colors of each of the master lighting modules 512 and the drone lighting modules 514. For example, the fixture controller 520 may be configured to control the master lighting modules 512 and the drone lighting modules 514 of one of the linear lighting devices 510A, 510B to the same intensity level and/or the same color, or to different intensity levels and/or different colors. Further, in some examples, the fixture controller 520 may be configured to control the master lighting modules 512 and the drone lighting modules 514 of one of the linear lighting devices 510A, 510B to different intensity levels and/or colors in an organized manner to provide a visual effect, for example, to provide a gradient of intensity levels and/or colors along the length of one or more of the linear lighting devices 510A, 510B.

Each of the drone lighting modules 514 may be configured to use the IRQ signal line 570 to signal to the respective master lighting module 512 that service is needed and/or that the drone lighting module 512 has a message to transmit to the master lighting module 512. In some examples, the IRQ signal line 570 is used to configure the drone lighting modules 514, for example, to determine the order and/or location of each drone lighting module 514 that is part of the linear lighting device.

As described in more detail herein, the master lighting modules 512 may receive a messages from the fixture controller 520 via the master communication bus 540. In some examples, the fixture controller 520 may be configure to interrupt the transmission of the messages on the master communication bus 540 to generate a synchronization pulse (e.g., a synchronization frame). The fixture controller 520 may generate the synchronization pulse periodically on the master communication bus 540 during periods where other communication across the master communication bus 540 is not occurring. The master lighting modules 512 may be configured to generate a timing signal that is received by the drone lighting modules 514 on the timing signal lines 560. In some examples, the master lighting module 512 may receive the synchronization pulse from the fixture controller 520, and in response, generate the timing signal on the timing signal lines 560, where for example, the timing signal may be a sinusoidal waveform that is generated at a frequency that is determined based on a frequency of synchronization pulse received from the fixture controller 120. The master lighting module 512 and the drone lighting modules 514 may use the timing signal to coordinate a timing at which the master lighting module 512 and the drone lighting modules 514 can perform a measurement procedure (e.g., to reduce the likelihood that any module causes interference with the measurement procedure of another module). For example, the master lighting module 512 and the drone lighting modules 514 may use the timing signal to determine a time to measure optical feedback information of the lighting loads of its module to, for example, perform color and/or intensity control refinement, when other master and drone lighting modules are not emitting light.

Figure 7:
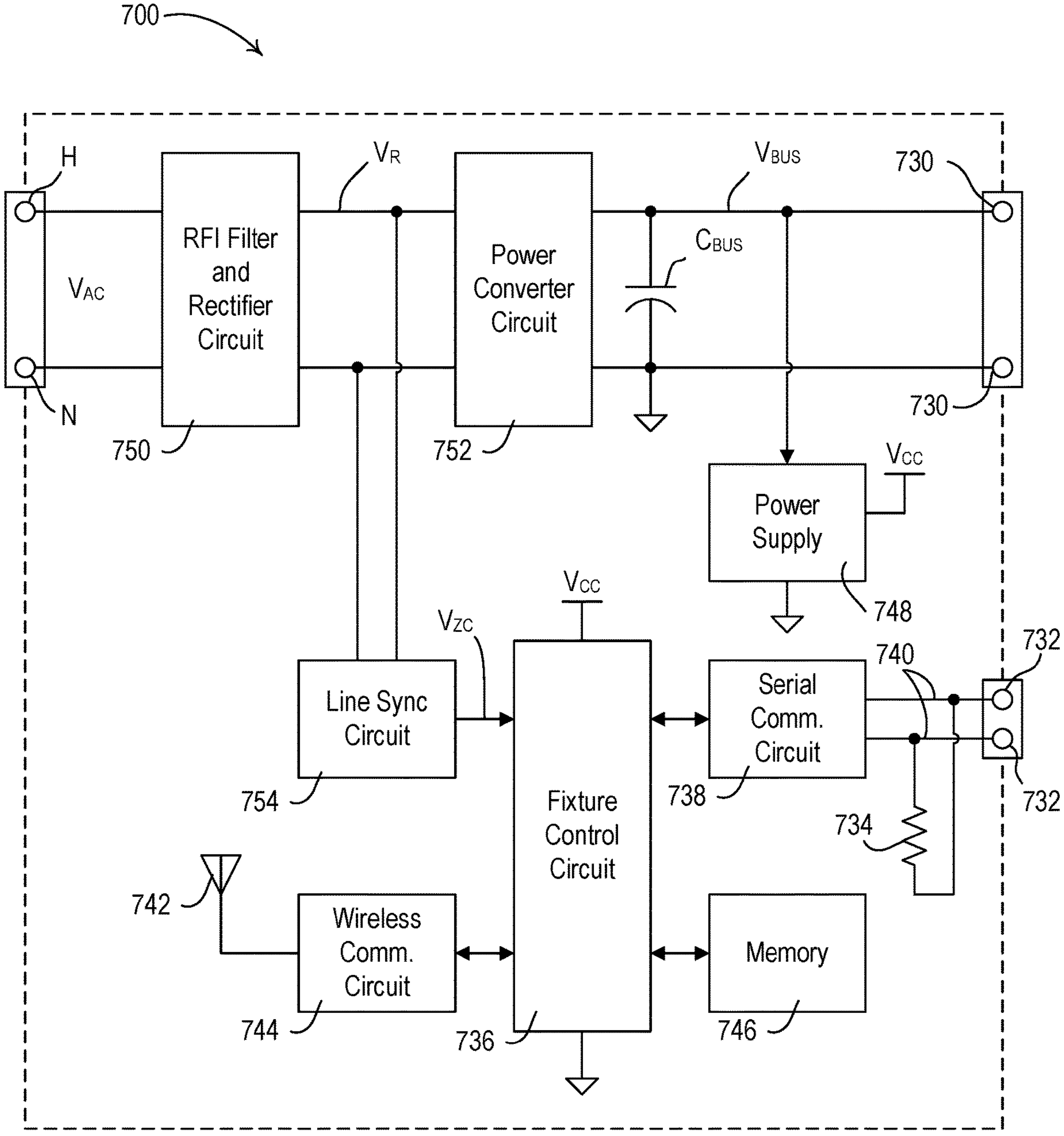
FIG. 7 is a simplified block diagram of an example fixture controller.

FIG. 7 is a simplified block diagram of an example fixture controller 700 (e.g., a lighting controller such as the fixture controller 520 shown in FIG. 6). The fixture controller 700 may comprise a radio frequency interference (RFI) filter and rectifier circuit 750, which may receive a source voltage, such as an AC mains line voltage $V_{AC}$, via a hot connection H and a neutral connection N. The radio frequency interference (RFI) filter and rectifier circuit 750 may be configured to generate a rectified voltage $V_R$ from the AC mains line voltage $V_{AC}$. The radio frequency interference (RFI) filter and rectifier circuit 750 may also be configured to minimize the noise provided on the AC mains (e.g., at the hot connection H and the neutral connection N).

The fixture controller 700 may also comprise a power converter circuit 752 that may receive the rectified voltage $V_R$ and generate a DC bus voltage $V_{BUS}$ (e.g., approximately 15-20V) across a bus capacitor $C_{BUS}$. The fixture controller 700 may output the DC bus voltage $V_{BUS}$ via connectors 730 to a power bus (e.g., the power bus 530) between the fixture controller 700 and one or more lighting modules. The power converter circuit 752 may comprise, for example, a boost converter, a buck converter, a buck-boost converter, a flyback converter, a single-ended primary-inductance converter (SEPIC), a Ćuk converter, and/or any other suitable power converter circuit for generating an appropriate bus voltage. The fixture controller 700 may comprise a power supply 748 that may receive the DC bus voltage $V_{BUS}$ and generate a supply voltage $V_{CC}$ which may be used to power one or more circuits (e.g., low voltage circuits) of the fixture controller 700.

The fixture controller 700 may comprise a fixture control circuit 736. The fixture control circuit 736 may comprise, for example, a microprocessor, a microcontroller, a programmable logic device (PLD), an application specific integrated circuit (ASIC), a field-programmable gate array (FPGA), or any other suitable processing device or controller. The fixture control circuit 736 may be powered by the power supply 748 (e.g., the supply voltage $V_{CC}$). The fixture controller 700 may comprise a memory 746 configured to store information (e.g., one or more operational characteristics of the fixture controller 700) associated with the fixture controller 700. For example, the memory 746 may be implemented as an external integrated circuit (IC) or as an internal circuit of the fixture control circuit 736.

The fixture controller 700 may include a serial communication circuit 738, which may be configured to communicate on a serial communication bus 740 via connectors 732. For example, the serial communication bus 740 may be an example of the master communication bus 540 (e.g., a wired digital communication link, such as an RS-485 communication link). The serial communication bus 740 may comprise a termination resistor 734, which may be coupled across the lines of the serial communication bus 740. For example, the resistance of the termination resistor 734 may match the differential-mode characteristic impedance of the master communication bus 740 to minimize reflections on the master communication bus 740.

The fixture control circuit 736 may control the serial communication circuit 738 to transmit messages to one or more master lighting modules (e.g., the master lighting modules 200A, the master lighting modules 512, and/or the master lighting module 800) via the serial communication bus 740, for example, to control one or more characteristics of the master lighting modules. For example, the fixture control circuit 736 may transmit control signals to the master lighting modules for controlling the intensity (e.g., brightness) and/or the color (e.g., color temperature) of light emitted by the master lighting module(s) (e.g., light sources of the master lighting module). Further, the fixture control circuit 736 may be configured to control the operation of drone modules (e.g., middle and/or end drone modules, such as the drone lighting modules 200B, 200C, 200D, 200E, and/or 514) indirectly by communicating messages to the master lighting modules via the serial communication circuit 738 and the serial communication bus 740. For example, the fixture control circuit 736 may control the intensity and/or the color of light emitted by the drone lighting modules.

The fixture control circuit 736 may receive an input from a line sync circuit 754. The line sync circuit 754 may receive the rectified voltage $V_R$. Alternatively or additionally, the line sync circuit 754 may receive the AC mains line voltage $V_{AC}$ directly from the hot connection H and the neutral connection N. For example, the line sync circuit 754 may comprise a zero-cross detect circuit that may be configured to generate a zero-cross signal $V_{ZC}$ that may indicate the zero-crossings of the AC mains line voltage $V_{AC}$. The fixture control circuit 736 may use the zero-cross signal $V_{ZC}$ from the line sync circuit 754, for example, to generate a synchronization pulse on the master communication bus 740 (e.g., the master communication bus 540), for instance, to synchronize the fixture controller 700 and/or devices controlled by the fixture controller 700 in accordance with the frequency of the AC mains line voltage $V_{AC}$ (e.g., utilizing the timing of the zero crossings of the AC mains line voltage $V_{AC}$).

The fixture control circuit 736 may be configured to generate a synchronization pulse (e.g., a synchronization frame) on the serial communication bus 740. The fixture control circuit 736 may use the zero-cross signal $V_{ZC}$ from the line sync circuit 754, for example, to generate the synchronization pulse on the serial communication bus 740 in accordance with the frequency of the AC mains line voltage $V_{AC}$ (e.g., utilizing the timing of a zero crossing of the AC mains line voltage $V_{AC}$). The synchronization pulse may include either a digital or analog signal. In some examples, the synchronization pulse is a synchronization frame that is generated on the serial communication bus 740. In such examples, the fixture control circuit 736 may be configured to halt transmitting messages on the serial communication bus 740 when generating the synchronization pulse on the serial communication bus 740. As such, the synchronization pulse may be used by the master lighting modules to generate a timing signal that may be used by the master lighting module and the drone lighting modules to coordinate the timing at which the master lighting module and the drone lighting modules can perform a measurement procedure. For example, the synchronization pulse may be generated during a frame sync period that may occur on a periodic basis and during which the synchronization pulse may be generated. Further, as described in more detail herein, the synchronization pulse may be received by the master lighting module(s) connected to the serial communication bus 740, and the master lighting modules may be configured to generate a timing signal that may be received by the drone lighting modules 514 via a separate electrical connection (e.g., the timing signal lines 560).

The fixture control circuit 736 may be configured to receive messages from the master lighting modules via the serial communication bus 740. For example, the master lighting modules may transmit feedback information regarding the state of the master lighting modules and/or the drone lighting modules via the serial communication bus 740. The serial communication circuit 738 may receive messages from the master lighting modules, for example, in response to a query transmitted by the fixture control circuit 736.

The fixture controller 700 may comprise a wireless communication circuit 744. The fixture control circuit 736 may be configured to transmit and/or receive messages via the wireless communication circuit 744. The wireless communication circuit 744 may comprise a radio-frequency (RF) transceiver coupled to an antenna 742 for transmitting and/or receiving RF signals. The wireless communication circuit 744 may be an RF transmitter for transmitting RF signals, an RF receiver for receiving RF signals, or an infrared (IR) transmitter and/or receiver for transmitting and/or receiving IR signals. The wireless communication circuit 744 may be configured to transmit and/or receive messages (e.g., via the antenna 742). For example, the wireless communication circuit 744 may transmit messages in response to a signal received from the fixture control circuit 736. The fixture control circuit 736 may be configured to transmit and/or receive, for example, feedback information regarding the status of one or more linear lighting devices such as the linear lighting devices 100, 400A, 400B, 400C, 510A, 510B and/or messages including control data and/or commands for controlling one or more linear lighting devices.

Figure 8:
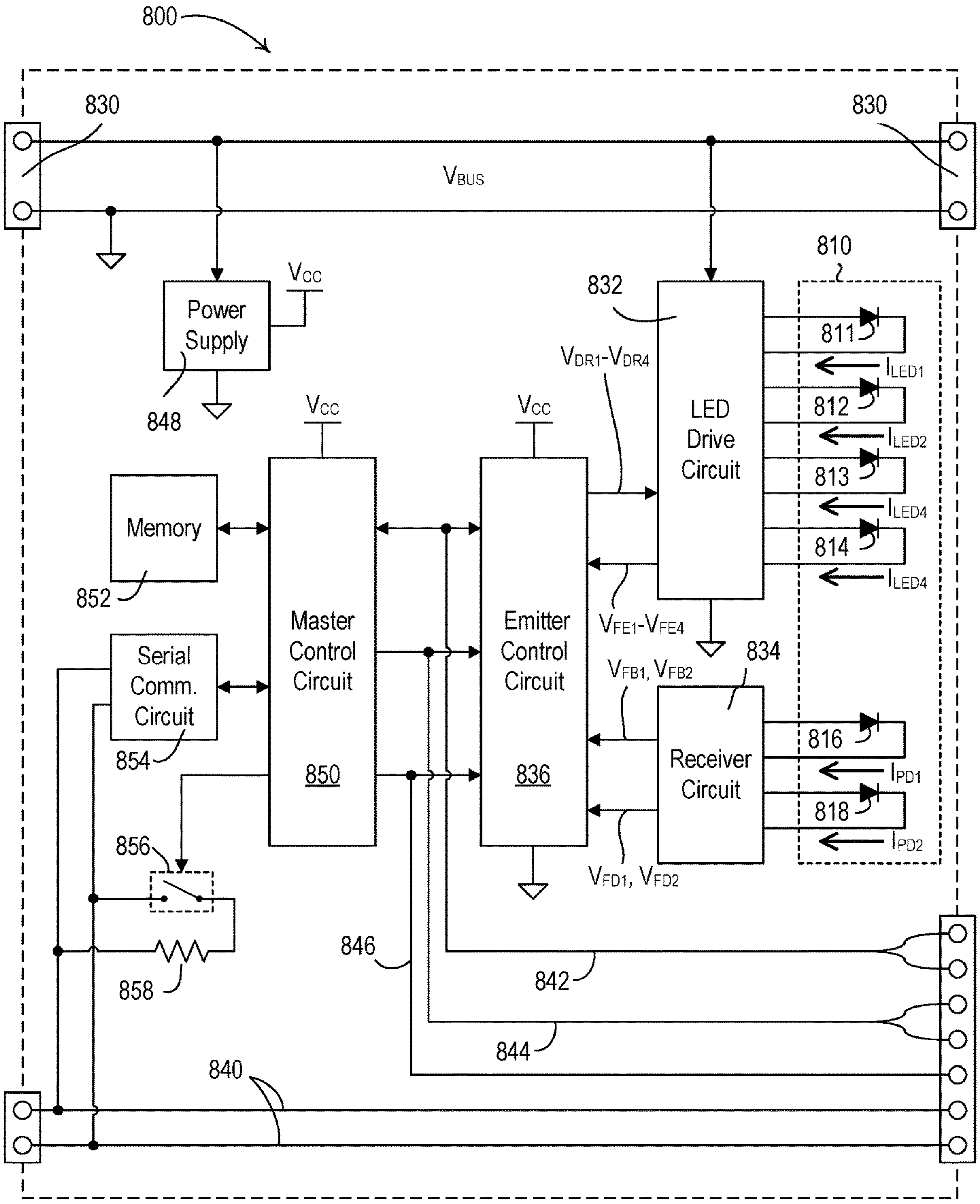
FIG. 8 is a simplified block diagram of an example master emitter module.

FIG. 8 is a simplified block diagram of an example master lighting module 800 (e.g., a starter module such as the master modules 150A, 200A, and/or 512). Each linear lighting device may include a master lighting module 800 and one or more drone lighting modules (e.g., the drone modules 150B, 150C, 200B-200E, 514). The master lighting module 800 may be the first module of a linear lighting device (e.g., linear lighting device 100, 400A, 400B, 400C, 510A and/or 510B). That is, when reviewing the physical order of the master and drone lighting modules of a linear lighting device, the master lighting module 800 may be the first lighting module to receive the DC bus voltage. Alternatively, in other examples, one or more drone lighting modules may be the first module of the linear lighting device (e.g., the drone lighting modules may receive the DC bus voltage prior to the master lighting module 800).

The master lighting module 800 may comprise one or more emitter modules 810 (e.g., the emitter modules 154, 210, and/or 300), where each emitter module 810 may include one or more strings of emitters 811, 812, 813, 814. Although each of the emitters 811, 812, 813, 814 is shown in FIG. 8 as a single LED, each of the emitters 811, 812, 813, 814 may comprise a plurality of LEDs connected in series (e.g., a chain of LEDs), a plurality of LEDs connected in parallel, or a suitable combination thereof, depending on the particular lighting system. In addition, each of the emitters 811, 812, 813, 814 may comprise one or more organic light-emitting diodes (OLEDs). For example, the first emitter 811 may represent a chain of red LEDs, the second emitter 812 may represent a chain of blue LEDs, the third emitter 813 may represent a chain of green LEDs, and the fourth emitter 814 may represent a chain of white or amber LEDs.

The master lighting module 800 may control the emitters 811, 812, 813, 814 to adjust an intensity level (e.g., a luminous flux or a brightness) and/or a color (e.g., a color temperature) of a cumulative light output of the master lighting module 800. The emitter module 810 may also comprise one or more detectors 816, 818 (e.g., the detectors 312) that may generate respective detector signals (e.g., photodiode currents $I_{PD1}$, $I_{PD2}$) in response to incident light. In examples, the detectors 816, 818 may be photodiodes. For example, the first detector 816 may represent a single red, orange or yellow LED, or multiple red, orange or yellow LEDs in parallel, and the second detector 818 may represent a single green LED or multiple green LEDs in parallel.

The master lighting module 800 may comprise a power supply 848 that may receive a source voltage, such as a DC bus voltage (e.g., the DC bus voltage $V_{BUS}$ on the power bus 530), via a first connector 830. The power supply 848 may generate an internal DC supply voltage $V_{CC}$ which may be used to power one or more circuits (e.g., low voltage circuits) of the master lighting module 800.

The master lighting module 800 may comprise an LED drive circuit 832. The LED drive circuit 832 may be configured to control (e.g., individually control) the power delivered to and/or the luminous flux of the light emitted by each of the emitters 811, 812, 813, 814 of the emitter module 810. The LED drive circuit 832 may receive the bus voltage $V_{BUS}$ and may adjust magnitudes of respective LED drive currents $I_{LED1}$, $I_{LED2}$, $I_{LED3}$, $I_{LED4}$ conducted through the emitters 811, 812, 813, 814. The LED drive circuit 832 may comprise one or more regulation circuits (e.g., four regulation circuits), such as switching regulators (e.g., buck converters) for controlling the magnitudes of the respective LED drive currents $I_{LED1}$-$I_{LED4}$. An example of the LED drive circuit 832 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The master lighting module 800 may comprise a receiver circuit 834 that may be electrically coupled to the detectors 816, 818 of the emitter module 810 for generating respective optical feedback signals $V_{FB1}$, $V_{FB2}$ in response to the photodiode currents $I_{PD1}$, $I_{PD2}$. The receiver circuit 834 may comprise one or more trans-impedance amplifiers (e.g., two trans impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The master lighting module 800 may comprise an emitter control circuit 836 for controlling the LED drive circuit 832 to control the intensities and/or colors of the emitters 811, 812, 813, 814 of the emitter module 810. The emitter control circuit 836 may comprise, for example, a microprocessor, a microcontroller, a programmable logic device (PLD), an application specific integrated circuit (ASIC), a field-programmable gate array (FPGA), or any other suitable processing device or controller. The emitter control circuit 836 may be powered by the power supply 848 (e.g., receiving the voltage $V_{CC}$). The emitter control circuit 836 may generate one or more drive signals $V_{DR1}$, $V_{DR2}$, $V_{DR3}$, $V_{DR4}$ for controlling the respective regulation circuits in the LED drive circuit 832. The emitter control circuit 836 may receive the optical feedback signals $V_{FB1}$, $V_{FB2}$ from the receiver circuit 834 for determining the luminous flux $L_E$ of the light emitted by the emitters 811, 812, 813, 814.

The emitter control circuit 836 may receive a plurality of emitter forward voltage feedback signals $V_{FE1}$, $V_{FE2}$, $V_{FE3}$, $V_{FE4}$ from the LED drive circuit 832 and a plurality of detector forward voltage feedback signals $V_{FD1}$, $V_{FD2}$ from the receiver circuit 834. The emitter forward voltage feedback signals $V_{FE1}$-$V_{FE4}$ may be representative of the magnitudes of the forward voltages of the respective emitters 811, 812, 813, 814, which may indicate temperatures $T_{E1}$, $T_{E2}$, $T_{E3}$, $T_{E4}$ of the respective emitters. If each emitter 811, 812, 813, 814 comprises multiple LEDs electrically coupled in series, the emitter forward voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward voltage feedback signals $V_{FD1}$, $V_{FD2}$ may be representative of the magnitudes of the forward voltages of the respective detectors 816, 818, which may indicate temperatures $T_{D1}$, $T_{D2}$ of the respective detectors. For example, the detector forward voltage feedback signals $V_{FD1}$, $V_{FD2}$ may be equal to the forward voltages $V_{FD}$ of the respective detectors 816, 818.

The master lighting module 800 may comprise a master control circuit 850. The master control circuit 850 may comprise, for example, a microprocessor, a microcontroller, a programmable logic device (PLD), an application specific integrated circuit (ASIC), a field-programmable gate array (FPGA), or any other suitable processing device or controller. The master control circuit 850 may be electrically coupled to a fixture controller (e.g., the fixture controllers 520, 700) via a communication bus 840 (e.g., a master communication bus, such as an RS-485 communication link). The master control circuit 850 may be electrically coupled to the drone lighting modules via one or more electrical connections, such as a communication bus 842 (e.g., a drone communication bus, such as an $I^2C$ communication link), a timing signal lines 844, and/or an IRQ signal line 846. The master control circuit 850 may be powered by the power supply 848 (e.g., receiving the voltage $V_{CC}$).

The master lighting module 800 may comprise a serial communication circuit 854 that couples the master control circuit 850 to the communication bus 840. The serial communication circuit 854 may be configured to communicate with the fixture controller on the communication bus 840. For example, the communication bus 840 may be an example of the communication bus 540 and/or the communication bus 740. The master lighting module 800 may comprise a termination resistor 858 coupled in series with a controllable switching circuit 856 between the lines of the communication bus 840. For example, the resistance of the termination resistor 858 may match the differential-mode characteristic impedance of the master communication bus 840 to minimize reflections on the communication bus 840. The master control circuit 850 may be configured to control the controllable switching circuit 856 to control when the termination resistor 858 is coupled between the liens of the communication but 840. The master control circuit 850 be configured to determine the target intensity $L_{TRGT}$ for the master lighting module 800 and/or one or more drone lighting modules in response to messages received via the serial communication circuit 854 (e.g., via the communication bus 840 from the fixture controller). For example, the master control circuit 850 may be configured to control the emitter control circuit 836 to control the intensity level (e.g., brightness or luminous flux) and/or the color (e.g., color temperature) of the cumulative light emitted by the emitter module 810 of the master lighting module 800, for example, in response to messages received via the communication bus 840. That is, the master control circuit 850 may be configured to control the emitter control circuit 836, for example, to control the LED drive circuit 832 and the emitter module 810.

The master control circuit 850 may be configured to communicate with the one or more drone lighting modules via the communication bus 842 (e.g., using the $I^2C$ communication protocol). The communication bus 842 may be, for example, the drone communication bus 550. For example, the master control circuit 850 may be configured to transmit messages including control data and/or commands to the drone lighting modules via the communication bus 842 to control the emitter modules of one or more drone lighting modules to control the intensity level (e.g., brightness or luminous flux) and/or the color (e.g., color temperature) of the cumulative light emitted by the emitter modules of the drone lighting modules, for example, in response to messages received via the communication bus 840.

The master control circuit 850 may be configured to adjust a present intensity $L_{PRES}$ (e.g., a present brightness) of the cumulative light emitted by the master lighting module 800 and/or drone lighting modules towards a target intensity $L_{TRGT}$ (e.g., a target brightness). The target intensity $L_{TRGT}$ may be in a range across a dimming range, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The master lighting module 800 (e.g., and/or the drone lighting modules) may be configured to adjust a present color temperature $T_{PRES}$ of the cumulative light emitted by the master lighting module 800 (e.g., and/or the drone lighting modules) towards a target color temperature $T_{TRGT}$. In some examples, the target color temperature $T_{TRGT}$ may be in a range between a cool-white color temperature (e.g., approximately 3100-4500 K) and a warm-white color temperature (e.g., approximately 2000-3000 K).

In examples, the master control circuit 850 may receive a synchronization pulse on the communication bus 840 (e.g., from the fixture controller 700). The synchronization pulse may include either a digital or analog signal. In some examples, the synchronization pulse is a sync frame that is generated on the communication bus 840. In such examples, the master control circuit 850 may be configured to not transmit messages with the fixture controller on the communication bus 840 during a frame sync period when the synchronization pulse may be received. As such, the synchronization pulse may be used by the master control circuit 850 to generate a timing signal that may be used by the master lighting module and the drone lighting modules to coordinate the timing at which the master lighting module 800 and the drone lighting modules can perform a measurement procedure. For example, the synchronization pulse may be generated during a frame sync period that may occur on a periodic basis and during which the synchronization pulse may be generated.

The master control circuit 850 may be configured to generate a timing signal, for example, on the timing signal lines 844 (e.g., the timing signal lines 560). The master control circuit 850 may be configured to generate the timing signal in response to the synchronization pulse. In some examples, the timing signal may be a sinusoidal waveform that is generated at a frequency that is determined based on the frequency of synchronization pulse received from the fixture controller. The emitter control circuit 836 of the master lighting module 800 and emitter module control circuits of the drone lighting modules (e.g., the drone lighting modules connected to the communication bus 844) may receive the timing signal generated by the master control circuit 850. As noted herein, the master lighting module 800 and the drone lighting modules may use the timing signal to coordinate a timing at which the master lighting module 800 and the drone lighting modules 514 can perform the measurement procedure (e.g., to reduce the likelihood that any module causes interference with the measurement procedure of another module). For example, the master lighting module 800 and the drone lighting modules may use the timing signal to determine a time to measure optical feedback information of the lighting loads of its module to, for example, perform color and/or intensity control refinement, when other master and drone lighting modules are not emitting light.

The master control circuit 850 may also be configured to receive an indication from the emitter control circuit 836 and/or an emitter control circuit of one of the drone lighting modules requires service and/or has a message to transmit to the master lighting module 800 via the IRQ signal line 846 (e.g., such as the IRQ signal line 570 shown in FIG. 6). In examples, an emitter control circuit may signal to the master control circuit 850 via the IRQ signal line 846 that the emitter control circuit needs to be serviced. In addition, an emitter control circuit may signal to the master control circuit 850 via the IRQ signal line 846 that the emitter control circuit has a message to transmit to the master control circuit 850. Further, the master control circuit 850 may be configured to determine the order and/or location of each drone lighting module using the IRQ signal line 846.

The master lighting module 800 may comprise a memory 852 configured to store information (e.g., one or more operational characteristics of the master lighting module 800 such as the target intensity $L_{TRGT}$, the target color temperature $T_{TRGT}$, the low-end intensity $L_{LE}$, the high-end intensity Lam, and/or the like). The memory 852 may be implemented as an external integrated circuit (IC) or as an internal circuit of the master control circuit 850.

When the master lighting module 800 is powered on, the master control circuit 850 may be configured to control the master lighting module 800 (e.g., the emitters of the master lighting module 800) to emit light substantially all of the time. The emitter control circuit 836 may be configured to disrupt the normal emission of light to execute the measurement procedure during periodic measurement intervals. During the periodic measurement intervals, the emitter control circuit 836 may measure one or more operational characteristics of the master lighting module 800. The measurement intervals may occur based on the timing signal on the synchronization lines 844 (e.g., which may be based on zero-crossing events of the AC mains line voltage $V_{AC}$). The emitter control circuit 836 may be configured to receive the timing signal and determine the specific timing of the periodic measurement intervals (e.g., a frequency of a periodic measurement intervals) based on (e.g., in response to) the timing signal. For example, during the measurement intervals, the emitter control circuit 836 may be configured to individually turn on each of the different-colored emitters 811, 812, 813, 814 of the master lighting module 800 (e.g., while turning off the other emitters) and measure the luminous flux of the light emitted by that emitter using one of the two detectors 816, 818. For example, the emitter control circuit 836 may turn on the first emitter 811 of the emitter module 810 (e.g., at the same time as turning off the other emitters 812, 813, 814) and determine the luminous flux $L_E$ of the light emitted by the first emitter 811 in response to the first optical feedback signal $V_{FB1}$ generated from the first detector 816. In addition, the emitter control circuit 836 may be configured to drive the emitters 811, 812, 813, 814 and the detectors 816, 818 to generate the emitter forward voltage feedback signals $V_{FE1}$-$V_{FE4}$ and the detector forward voltage feedback signals $V_{FD1}$, $V_{FD2}$ during the measurement intervals.

Methods of measuring the operational characteristics of emitter modules in a lighting device are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES; U.S. Pat. No. 9,392,660, issued Jul. 12, 2016, entitled LED ILLUMINATION DEVICE AND CALIBRATION METHOD FOR ACCURATELY CHARACTERIZING THE EMISSION LEDS AND PHOTODETECTOR(S) INCLUDED WITHIN THE LED ILLUMINATION DEVICE; and U.S. Pat. No. 9,392, 663, issued Jul. 12, 2016, entitled ILLUMINATION DEVICE AND METHOD FOR CONTROLLING AN ILLUMINATION DEVICE OVER CHANGES IN DRIVE CURRENT AND TEMPERATURE, the entire disclosures of which are hereby incorporated by reference.

Calibration values for the various operational characteristics of the master lighting module 800 may be stored in the memory 852 as part of a calibration procedure performed during manufacturing of the master lighting module 800. Calibration values may be stored for each of the emitters 811, 812, 813, 814 and/or the detectors 816, 818 of the emitter module 800. For example, calibration values may be stored for measured values of luminous flux (e.g., in lumens), x-chromaticity, y-chromaticity, emitter forward voltage, photodiode current, and/or detector forward voltage. For example, the luminous flux, x-chromaticity, and/or y-chromaticity measurements may be obtained from the emitters 811, 812, 813, 814 using an external calibration tool, such as a spectrophotometer. In examples, the master lighting module 800 may measure the values for the emitter forward voltages, photodiode currents, and/or detector forward voltages internally. An external calibration tool and/or the master lighting module 800 may measure the calibration values for each of the emitters 811, 812, 813, 814 and/or the detectors 816, 818 at a plurality of different drive currents, and/or at a plurality of different operating temperatures.

After installation, the master lighting module 800 of the linear lighting device may use the calibration values stored in the memory 852 to maintain a constant light output from the master lighting module 800. The master control circuit 850 may determine target values for the luminous flux to be emitted from the emitters 811, 812, 813, 814 to achieve the target intensity $L_{TRGT}$ and/or the target color temperature $T_{TRGT}$ for the master lighting module 800. The emitter control circuit 836 may determine the magnitudes for the respective drive currents $I_{LED1}$-$I_{LED4}$ for the emitters 811, 812, 813, 814 based on the determined target values for the luminous flux to be emitted from the emitters 811, 812, 813, 814. When the age of the master lighting module 800 is zero, the magnitudes of the respective drive currents $I_{LED1}$-$I_{LED4}$ for the emitters 811, 812, 813, 814 may be controlled to initial magnitudes $I_{LED\text{-}INITIAL}$.

The light output (e.g., a maximum light output and/or the light output at a specific current or frequency) of the master lighting module 800 may decrease as the emitters 811, 812, 813, 814 age. The emitter control circuit 836 may be configured to increase the magnitudes of the drive current $I_{DR}$ for the emitters 811, 812, 813, 814 to adjusted magnitudes $I_{LED\text{-}ADJUSTED}$ to achieve the determined target values for the luminous flux of the target intensity $L_{TRGT}$ and/or the target color temperature $T_{TRGT}$. Methods of adjusting the drive currents of emitters to achieve a constant light output as the emitters age are described in greater detail in U.S. Pat. No. 9,769,899, issued Sep. 19, 2017, entitled ILLUMINATION DEVICE AND AGE COMPENSATION METHOD, the entire disclosure of which is hereby incorporated by reference.

Figure 9:
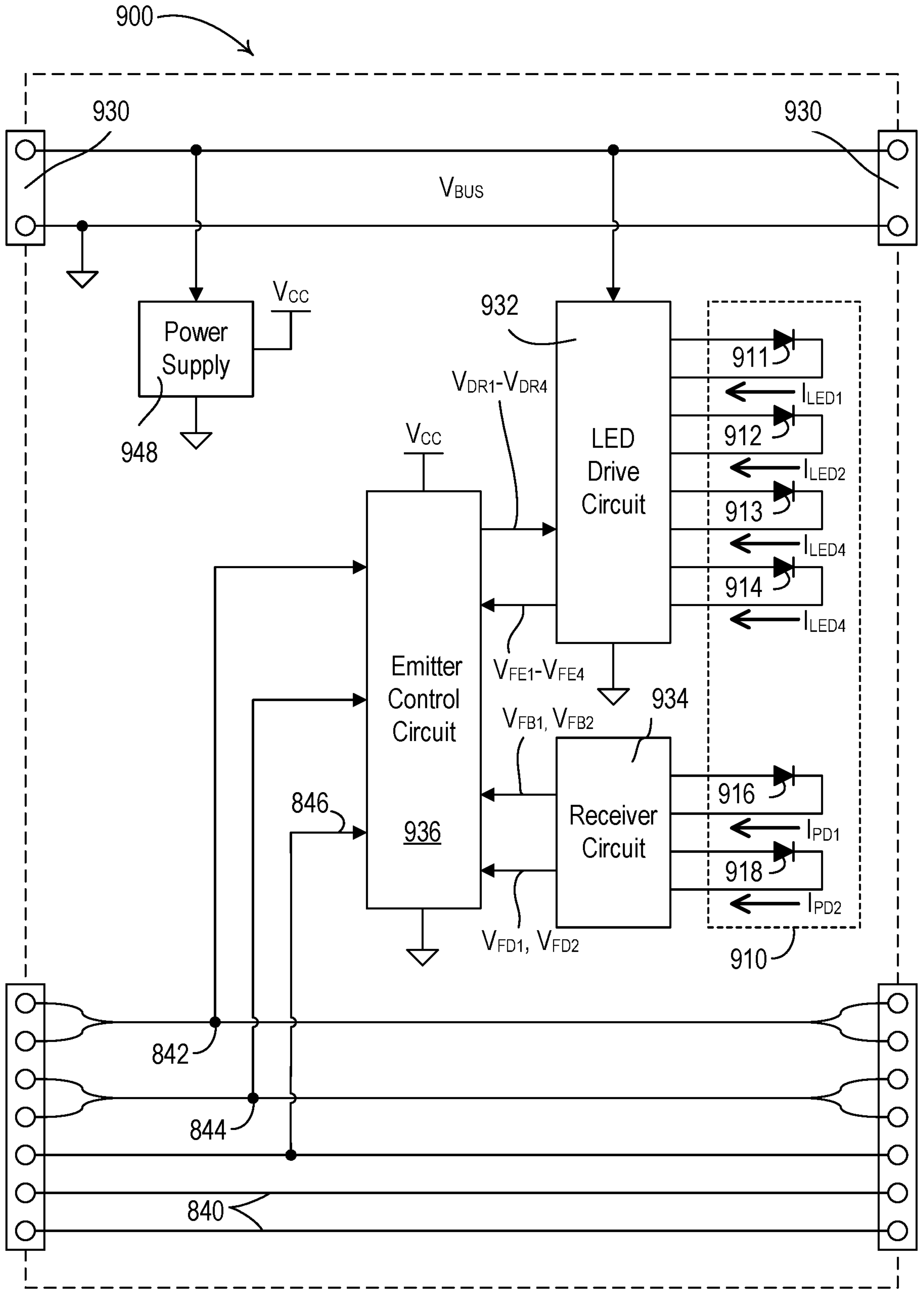
FIG. 9 is a simplified block diagram of an example middle emitter module.

FIG. 9 is a simplified block diagram of an example drone lighting module 900 (e.g., a middle drone lighting module such as middle drone lighting modules 150B, 200B, and/or 200C shown in FIGS. 2, 3B, and 3C). The middle drone lighting module 900 may be a middle module of a linear lighting device (e.g., such as linear lighting device 100, 400A, 400B, 400C, 510A and/or 510B). The middle drone lighting module 900 may include any drone lighting module that resides between the master lighting module (e.g., the master module 150A, 200A, 512, and/or the master lighting module 800) and another drone lighting module of the linear lighting device.

The middle drone lighting module 900 may comprise one or more emitter modules 910 (e.g., such as the emitter modules 154, 210, and/or 300). For example, the middle drone lighting module 900 may comprise an emitter module 910 that may include one or more strings of emitters 911, 912, 913, 914. Each of the emitters 911, 912, 913, 914 is shown in FIG. 9 as a single LED, but may each comprise a plurality of LEDs connected in series (e.g., a chain of LEDs), a plurality of LEDs connected in parallel, or a suitable combination thereof, depending on the particular lighting system. In addition, each of the emitters 911, 912, 913, 914 may comprise one or more organic light-emitting diodes (OLEDs). For example, the first emitter 911 may represent a chain of red LEDs, the second emitter 912 may represent a chain of blue LEDs, the third emitter 913 may represent a chain of green LEDs, and the fourth emitter 914 may represent a chain of white or amber LEDs.

The middle drone lighting module 900 may control the emitters 911, 912, 913, 914 to adjust an intensity level (e.g., a luminous flux or a brightness) and/or a color (e.g., a color temperature) of a cumulative light output of the middle drone lighting module 900. The emitter module 910 may also comprise one or more detectors 916, 918 (e.g., the detectors 312) that may generate respective photodiode currents $I_{PD1}$, $I_{PD2}$ (e.g., detector signals) in response to incident light. In examples, the detectors 916, 918 may be photodiodes. For example, the first detector 916 may represent a single red, orange or yellow LED or multiple red, orange or yellow LEDs in parallel, and the second detector 918 may represent a single green LED or multiple green LEDs in parallel.

The middle drone lighting module 900 may comprise a power supply 948 that may receive a source voltage, such as a DC bus voltage (e.g., the DC bus voltage $V_{BUS}$ on the power bus 530), via a first connector 930. The power supply 948 may generate an internal DC supply voltage $V_{CC}$ which may be used to power one or more circuits (e.g., low voltage circuits) of the middle drone lighting module 900, such as the emitter control circuit 936.

The middle drone lighting module 900 may comprise an LED drive circuit 932. The LED drive circuit 932 may be configured to control (e.g., individually controlling) the power delivered to and/or the luminous flux of the light emitted by each of the emitters 911, 912, 913, 914 of the emitter module 910. The LED drive circuit 932 may receive the bus voltage $V_{BUS}$ and may adjust magnitudes of respective LED drive currents $I_{LED1}$, $I_{LED2}$, $I_{LED3}$, $I_{LED4}$ conducted through the emitters 911, 912, 913, 914. The LED drive circuit 932 may comprise one or more regulation circuits (e.g., four regulation circuits), such as switching regulators (e.g., buck converters) for controlling the magnitudes of the respective LED drive currents $I_{LED1}$-$I_{LED4}$.

The middle drone lighting module 900 may comprise a receiver circuit 934 that may be electrically coupled to the detectors 916, 918 of the emitter module 910 for generating respective optical feedback signals $V_{FB1}$, $V_{FB2}$ in response to the photodiode currents $I_{PD1}$, $I_{PD2}$. The receiver circuit 934 may comprise one or more trans-impedance amplifiers (e.g., two trans impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The middle drone lighting module 900 may comprise an emitter control circuit 936 for controlling the LED drive circuit 932 to control the intensities and/or colors of the emitters 911, 912, 913, 914 of the emitter module 910. The emitter control circuit 936 may comprise, for example, a microprocessor, a microcontroller, a programmable logic device (PLD), an application specific integrated circuit (ASIC), a field-programmable gate array (FPGA), or any other suitable processing device or controller. The emitter control circuit 936 may be electrically coupled to a master lighting module via one or more electrical connections, such as the communication bus 842 (e.g., a drone communication bus, such as an I2C communication link), the timing signal line 844, and/or the IRQ signal line 846.

The emitter control circuit 936 may be configured to communicate with a master lighting module via the communication bus 842 (e.g., using the $I^2C$ communication protocol). The communication bus 842 may be, for example, the drone communication bus 550. For example, the emitter control circuit 936 may be configured to receive messages including control data and/or commands from the master lighting module via the communication bus 842 to control the emitter modules 910 to control the intensity level (e.g., brightness or luminous flux) and/or the color (e.g., color temperature) of the cumulative light emitted by the emitter modules 910 of the middle drone lighting module 900.

The emitter control circuit 936 may be powered by the power supply 948 (e.g., receiving the voltage $V_{CC}$). The emitter control circuit 936 may generate one or more drive signals $V_{DR1}$, $V_{DR2}$, $V_{DR3}$, $V_{DR4}$ for controlling the respective regulation circuits in the LED drive circuit 932. The emitter control circuit 936 may receive the optical feedback signals $V_{FB1}$, $V_{FB2}$ from the receiver circuit 934 for determining the luminous flux $L_E$ of the light emitted by the emitters 911, 912, 913, 914.

The emitter control circuit 936 may be configured to transmit an indication to the master control circuit 850 when the emitter control circuit 936 requires service and/or has a message to transmit to the master lighting module 800 via the IRQ signal line 846 (e.g., such as the IRQ signal line 570 shown in FIG. 6). For example, the emitter control circuit 936 may signal the master control circuit (e.g., the master control circuit 850) via the IRQ signal line 846 that the emitter control circuit 936 needs to be serviced. In addition, the emitter control circuit 936 may signal to the master control circuit via the IRQ signal line 846 that the emitter control circuit 936 has a message to transmit to the master control circuit.

The emitter control circuit 936 may receive a plurality of emitter forward voltage feedback signals $V_{FE1}$, $V_{FE2}$, $V_{FE3}$, $V_{FE4}$ from the LED drive circuit 932 and a plurality of detector forward voltage feedback signals $V_{FD1}$, $V_{FD2}$ from the receiver circuit 934. The emitter forward voltage feedback signals $V_{FE1}$-$V_{FE4}$ may be representative of the magnitudes of the forward voltages of the respective emitters 911, 912, 913, 914, which may indicate temperatures $T_{E1}$, $T_{E2}$, $T_{E3}$, $T_{E4}$ of the respective emitters. If each emitter 911, 912, 913, 914 comprises multiple LEDs electrically coupled in series, the emitter forward voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward voltage feedback signals $V_{FD1}$, $V_{FD2}$ may be representative of the magnitudes of the forward voltages of the respective detectors 916, 918, which may indicate temperatures $T_{D1}$, $T_{D2}$ of the respective detectors. For example, the detector forward voltage feedback signals $V_{FD1}$, $V_{FD2}$ may be equal to the forward voltages $V_{FD}$ of the respective detectors 916, 918.

Notably, the middle drone lighting module 900 is not connected to the communication bus 840 (e.g., an RS-485 communication link). Accordingly, the emitter control circuit 936 of the middle drone lighting module 900 may receive messages (e.g., control messages) via a communication bus 842 (e.g., using the $I^2C$ communication protocol). For example, the middle drone lighting module 900 may receive messages from a master lighting module (e.g., the master module 150A, 200A, 512, and/or the master lighting module 800). A master control circuit of the master lighting module (e.g., master control circuit 850) may be configured to control the middle drone lighting module 900 to control the intensity (e.g., brightness or luminous flux) and/or the color (e.g., color temperature) of the cumulative light emitted by the middle drone lighting module 900.

The master control circuit may be configured to adjust a present intensity $L_{PRES}$ (e.g., a present brightness) of the cumulative light emitted by the middle drone lighting module 900 towards a target intensity $L_{TRGT}$ (e.g., a target brightness). The target intensity $L_{TRGT}$ may be in a range across a dimming range of the middle drone lighting module 900, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The master control circuit may be configured to adjust a present color temperature $T_{PRES}$ of the cumulative light emitted by the middle drone lighting module 900 towards a target color temperature $T_{TRGT}$. In some examples, the target color temperature $T_{TRGT}$ may range be in a range between a cool-white color temperature (e.g., approximately 3100-4500 K) and a warm-white color temperature (e.g., approximately 2000-3000 K).

When the middle drone lighting module 900 is powered on, the master control circuit may be configured to control the middle drone lighting module 900 (e.g., the emitters of the middle drone lighting module 900) to emit light substantially all of the time. The emitter control circuit 936 may be configured to receive a timing signal (e.g., via the timing signal lines 844 and/or an IRQ signal line 846). The emitter control circuit 936 may use the timing signal to coordinate the timing at which the emitter control circuit 936 can perform a measurement procedure (e.g., to reduce the likelihood that any module causes interference with the measurement procedure of another module). For example, the emitter control circuit 936 may use the timing signal to determine a time to measure optical feedback information of the lighting loads of its module to, for example, perform color and/or intensity control refinement, when other master and drone lighting modules are not emitting light.

The emitter control circuit 936 may be configured to disrupt the normal emission of light to execute the measurement procedure during periodic measurement intervals. During the periodic measurement intervals, the emitter control circuit 936 may measure one or more operational characteristics of the middle drone lighting module 900. The measurement intervals may occur based on the timing signal on the synchronization lines 844 (e.g., which may be based on zero-crossing events of the AC mains line voltage $V_{AC}$). The emitter control circuit 936 may be configured to receive the timing signal and determine the specific timing of the periodic measurement intervals (e.g., a frequency of periodic measurement intervals) based on (e.g., in response to the timing signal. For example, during the measurement intervals, the emitter control circuit 936 may be configured to individually turn on each of the different-colored emitters 911, 912, 913, 914 of the middle drone lighting module 900 (e.g., while turning off the other emitters) and measure the luminous flux $L_E$ of the light emitted by that emitter using one of the two detectors 916, 918. For example, the emitter control circuit 936 may turn on the first emitter 911 of the emitter module 910 (e.g., at the same time as turning off the other emitters 912, 913, 914 and determine the luminous flux $L_E$ of the light emitted by the first emitter 911 in response to the first optical feedback signal $V_{FB1}$ generated from the first detector 916. In addition, the emitter control circuit 936 may be configured to drive the emitters 911, 912, 913, 914 and the detectors 916, 918 to generate the emitter forward voltage feedback signals $V_{FE1}$-$V_{FE4}$ and the detector forward voltage feedback signals $V_{FD1}$, $V_{FD2}$ during the measurement intervals.

Calibration values for the various operational characteristics of the middle drone lighting module 900 may be stored in a memory as part of a calibration procedure performed during manufacturing. For example, the memory 852 of the master lighting module 800. Calibration values may be stored for each of the emitters 911, 912, 913, 914 and/or the detectors 916, 918 of the middle drone lighting module 900. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and/or y-chromaticity measurements may be obtained from the emitters 911, 912, 913, 914 using an external calibration tool, such as a spectrophotometer. In examples, the middle drone lighting module 900 may measure the values for the emitter forward voltages, photodiode currents, and/or detector forward voltages internally. An external calibration tool and/or the middle drone lighting module 900 may measure the calibration values for each of the emitters 911, 912, 913, 914 and/or the detectors 916, 918 at a plurality of different drive currents, and/or at a plurality of different operating temperatures.

After installation, the master lighting module 800 of the linear lighting device may use the calibration values stored in the memory 852 to maintain a constant light output from the middle drone lighting module 900. The emitter control circuit 936 may determine target values for the luminous flux to be emitted from the emitters 911, 912, 913, 914 to achieve the target intensity $L_{TRGT}$ and/or the target color temperature $T_{TRGT}$ for the middle drone lighting module 900. The emitter control circuit 936 may determine the magnitudes for the respective drive currents $I_{LED1}$-$I_{LED4}$ for the emitters 911, 912, 913, 914 based on the determined target values for the luminous flux to be emitted from the emitters 911, 912, 913, 914. When the age of the middle drone lighting module 900 is zero, the magnitudes of the respective drive currents $I_{LED1}$-$I_{LED4}$ for the emitters 911, 912, 913, 914 may be controlled to initial magnitudes $I_{LED\text{-}INITIAL}$.

The light output (e.g., a maximum light output and/or the light output at a specific current or frequency) of middle drone lighting module 900 may decrease as the emitters 911, 912, 913, 914 age. The emitter control circuit 936 may be configured to increase the magnitudes of the drive current $I_{DR}$ for the emitters 911, 912, 913, 914 to adjusted magnitudes $I_{LED\text{-}ADJUSTED}$ to achieve the determined target values for the luminous flux of the target intensity $L_{TRGT}$ and/or the target color temperature $T_{TRGT}$.

Figure 10:
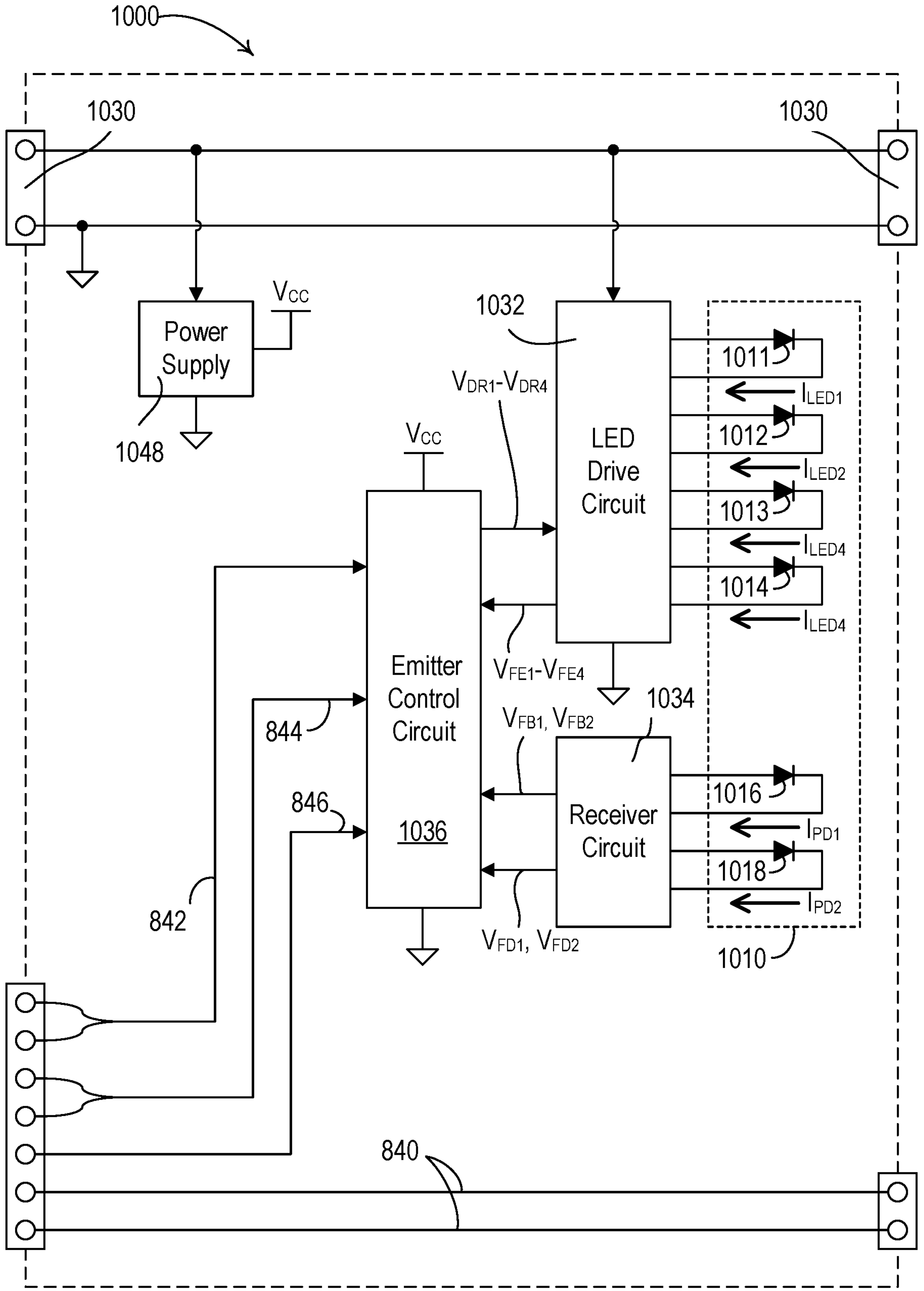
FIG. 10 is a simplified block diagram of an example end emitter module.

FIG. 10 is a simplified block diagram of an example drone lighting module 1000 (e.g., an end drone module such as end drone lighting modules 150C, 200D, and/or 200E shown in FIGS. 2, 3D, and 3E). The end drone lighting module 1000 may be an end lighting module of a linear lighting device (e.g., such as the linear lighting device 100, 400A, 400B, 400C, 510A and/or 510B). The end drone lighting module 1000 may comprise one or more emitter modules 1010 (e.g., the emitter modules 154, 210, and/or 300 shown in FIGS. 2, 3A-3E, 4A, and 4B). The emitter module 1010 may include one or more strings of emitters 1011, 1012, 1013, 1014. Although each of the emitters 1011, 1012, 1013, 1014 is shown in FIG. 10 as a single LED, each of the emitters 811, 812, 813, 814 may comprise a plurality of LEDs connected in series (e.g., a chain of LEDs), a plurality of LEDs connected in parallel, or a suitable combination thereof, depending on the particular lighting system. In addition, each of the emitters 1011, 1012, 1013, 1014 may comprise one or more organic light-emitting diodes (OLEDs). For example, the first emitter 1011 may represent a chain of red LEDs, the second emitter 1012 may represent a chain of blue LEDs, the third emitter 1013 may represent a chain of green LEDs, and the fourth emitter 1014 may represent a chain of white or amber LEDs.

The end drone lighting module 1000 may control the emitters 1011, 1012, 1013, 1014 to adjust an intensity level (e.g., brightness or luminous flux) and/or a color (e.g., a color temperature) of a cumulative light output of the end drone lighting module 1000. The emitter module 1010 may also comprise one or more detectors 1016, 1018 (e.g. the detectors 312) that may generate respective photodiode currents $I_{PD1}$, $I_{PD2}$ (e.g., detector signals) in response to incident light. In examples, the detectors 1016, 1018 may be photodiodes. For example, the first detector 1016 may represent a single red, orange or yellow LED or multiple red, orange or yellow LEDs in parallel, and the second detector 1018 may represent a single green LED or multiple green LEDs in parallel.

The end drone lighting module 1000 may comprise a power supply 1048 that may receive a source voltage, such as a DC bus voltage (e.g., the DC bus voltage $V_{BUS}$ on the power bus 530), via a first connector 1030. The power supply 1048 may generate an internal DC supply voltage $V_{CC}$ which may be used to power one or more circuits (e.g., low voltage circuits) of the end drone lighting module 1000, such as the emitter control circuit 1036.

The end drone lighting module 1000 may comprise an LED drive circuit 1032. The LED drive circuit 1032 may be configured to control (e.g., individually controlling) the power delivered to and/or the luminous flux of the light emitted by each of the emitters 1011, 1012, 1013, 1014 of the emitter module 1010. The LED drive circuit 1032 may receive the bus voltage $V_{BUS}$ and may adjust magnitudes of respective LED drive currents $I_{LED1}$, $I_{LED2}$, $I_{LED3}$, $I_{LED4}$ conducted through the emitters 1011, 1012, 1013, 1014. The LED drive circuit 1032 may comprise one or more regulation circuits (e.g., four regulation circuits), such as switching regulators (e.g., buck converters) for controlling the magnitudes of the respective LED drive currents $I_{LED1}$-$I_{LED4}$.

The end drone lighting module 1000 may comprise a receiver circuit 1034 that may be electrically coupled to the detectors 1016, 1018 of the emitter module 1010 for generating respective optical feedback signals $V_{FB1}$, $V_{FB2}$ in response to the photodiode currents $I_{PD1}$, $I_{PD2}$. The receiver circuit 1034 may comprise one or more trans-impedance amplifiers (e.g., two trans impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The middle drone lighting module 1000 may comprise an emitter control circuit 1036 for controlling the LED drive circuit 1032 to control the intensities and/or colors of the emitters 1011, 1012, 1013, 1014 of the emitter module 1010. The emitter control circuit 1036 may comprise, for example, a microprocessor, a microcontroller, a programmable logic device (PLD), an application specific integrated circuit (ASIC), a field-programmable gate array (FPGA), or any other suitable processing device or controller. The emitted control circuit 1036 may be powered by the power supply 1048 (e.g., receiving the voltage $V_{CC}$). The emitter control circuit 1036 may generate one or more drive signals $V_{DR1}$, $V_{DR2}$, $V_{DR3}$, $V_{DR4}$ for controlling the respective regulation circuits in the LED drive circuit 1032. The emitter control circuit 1036 may receive the optical feedback signals $V_{FB1}$, $V_{FB2}$ from the receiver circuit 934 for determining the luminous flux $L_E$ of the light emitted by the emitters 1011, 1012, 1013, 1014.

The emitter control circuit 1036 may be configured to transmit an indication to the master control circuit 850 when the emitter control circuit 1036 requires service and/or has a message to transmit to the master lighting module 800 via the IRQ signal line 846 (e.g., such as the IRQ signal line 570 shown in FIG. 6). For example, the emitter control circuit 1036 may signal the master control circuit (e.g., the master control circuit 850) via the IRQ signal line 846 that the emitter control circuit 1036 needs to be serviced. In addition, the emitter control circuit 1036 may signal to the master control circuit via the IRQ signal line 846 that the emitter control circuit 1036 has a message to transmit to the master control circuit.

The emitter control circuit 1036 may receive a plurality of emitter forward voltage feedback signals $V_{FE1}$, $V_{FE2}$, $V_{FE3}$, $V_{FE4}$ from the LED drive circuit 1032 and a plurality of detector forward voltage feedback signals $V_{FD1}$, $V_{FD2}$ from the receiver circuit 1034. The emitter forward voltage feedback signals $V_{FE1}$-$V_{FE4}$ may be representative of the magnitudes of the forward voltages of the respective emitters 1011, 1012, 1013, 1014, which may indicate temperatures $T_{E1}$, $T_{E2}$, $T_{E3}$, $T_{E4}$ of the respective emitters. If each emitter 1011, 1012, 1013, 1014 comprises multiple LEDs electrically coupled in series, the emitter forward voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward voltage feedback signals $V_{FD1}$, $V_{FD2}$ may be representative of the magnitudes of the forward voltages of the respective detectors 1016, 1018, which may indicate temperatures $T_{D1}$, $T_{D2}$ of the respective detectors. For example, the detector forward voltage feedback signals $V_{FD1}$, $V_{FD2}$ may be equal to the forward voltages $V_{FD}$ of the respective detectors 1016, 1018.

The emitter control circuit 1036 of the end drone lighting module 1000 may receive messages (e.g., control messages) via a communication bus 842 (e.g., the drone communication bus 550), for example, using the $I^2C$ communication protocol. For example, the end drone lighting module 1000 may receive messages from a master lighting module (e.g., the master module 150A, 200A, 512, and/or the master lighting module 800). A master control circuit of the master lighting module (e.g., master control circuit 850) may be configured to control the end drone lighting module 1000 to control the intensity level (e.g., brightness or luminous flux) and/or the color (e.g., the color temperature) of the cumulative light emitted by the end drone lighting module 1000.

The master control circuit may be configured to adjust a present intensity $L_{PRES}$ (e.g., a present brightness) of the cumulative light emitted by the end drone lighting module 1000 towards a target intensity $L_{TRGT}$ (e.g., a target brightness). The target intensity $L_{TRGT}$ may be in a range across a dimming range of the end drone lighting module 1000, e.g., between a low-end intensity $L_{LE}$ (e.g., a minimum intensity, such as approximately 0.1%-1.0%) and a high end intensity $L_{HE}$ (e.g., a maximum intensity, such as approximately 100%). The master control circuit may be configured to adjust a present color temperature $T_{PRES}$ of the cumulative light emitted by the end drone lighting module 1000 towards a target color temperature $T_{TRGT}$. The target color temperature $T_{TRGT}$ may be in a range between a cool-white color temperature (e.g., approximately 3100-4500 K) and a warm-white color temperature (e.g., approximately 2000-3000 K).

When the end drone lighting module 1000 is powered on, the master control circuit may be configured to control the end drone lighting module 1000 (e.g., the emitters of the end drone lighting module 1000) to emit light substantially all of the time. The emitter control circuit 1036 may be configured to receive a timing signal (e.g., via the timing signal lines 844 and/or an IRQ signal line 846). The emitter control circuit 1036 may use the timing signal to coordinate the timing at which the emitter control circuit 1036 can perform a measurement procedure (e.g., to reduce the likelihood that any module causes interference with the measurement procedure of another module). For example, the emitter control circuit 1036 may use the timing signal to determine a time to measure optical feedback information of the lighting loads of its module to, for example, perform color and/or intensity control refinement, when other master and drone lighting modules are not emitting light.

The emitter control circuit 1036 may be configured to disrupt the normal emission of light to execute the measurement procedure during periodic measurement intervals. During the periodic measurement intervals, the emitter control circuit 1036 may measure one or more operational characteristics of the end drone lighting module 1000. The measurement intervals may occur based on the timing signal on the synchronization lines 844 (e.g., which may be based on zero-crossing events of the AC mains line voltage $V_{AC}$). The emitter control circuit 1036 may be configured to receive the timing signal and determine the specific timing of the periodic measurement intervals (e.g., a frequency of periodic measurement intervals) based on (e.g., in response to the timing signal. For example, during the measurement intervals, the emitter control circuit 1036 may be configured to individually turn on each of the different-colored emitters 1011, 1012, 1013, 1014 of the end drone lighting module 1000 (e.g., while turning off the other emitters) and measure the luminous flux $L_E$ of the light emitted by that emitter using one of the two detectors 1016, 1018. For example, the emitter control circuit 1036 may turn on the first emitter 1011 of the emitter module 1010 (e.g., at the same time as turning off the other emitters 1012, 1013, 1014 and determine the luminous flux $L_E$ of the light emitted by the first emitter 1011 in response to the first optical feedback signal $V_{FB1}$ generated from the first detector 1016. In addition, the emitter control circuit 1036 may be configured to drive the emitters 1011, 1012, 1013, 1014 and the detectors 1016, 1018 to generate the emitter forward voltage feedback signals $V_{FE1}$-$V_{FE4}$ and the detector forward voltage feedback signals $V_{FD1}$, $V_{FD2}$ during the measurement intervals.

Calibration values for the various operational characteristics of the end drone lighting module 1000 may be stored in a memory as part of a calibration procedure performed during manufacturing. For example, the memory 852 of the master lighting module 800. Calibration values may be stored for each of the emitters 1011, 1012, 1013, 1014 and/or the detectors 1016, 1018 of the end drone module 1000. For example, calibration values may be stored for measured values of luminous flux (e.g., in lumens), x-chromaticity, y-chromaticity, emitter forward voltage, photodiode current, and/or detector forward voltage. For example, the luminous flux, x-chromaticity, and/or y-chromaticity measurements may be obtained from the emitters 1011, 1012, 1013, 1014 using an external calibration tool, such as a spectrophotometer. In examples, the end drone lighting module 1000 may measure the values for the emitter forward voltages, photodiode currents, and/or detector forward voltages internally. An external calibration tool and/or the end drone lighting module 1000 may measure the calibration values for each of the emitters 1011, 1012, 1013, 1014 and/or the detectors 1016, 1018 at a plurality of different drive currents, and/or at a plurality of different operating temperatures.

After installation, the master lighting module 800 of the linear lighting device may use the calibration values stored in the memory 852 to maintain a constant light output from the end drone module 1000. The emitter control circuit 1036 may determine target values for the luminous flux to be emitted from the emitters 1011, 1012, 1013, 1014 to achieve the target intensity $L_{TRGT}$ and/or the target color temperature $T_{TRGT}$ for the end drone module 1000. The emitter control circuit 1036 may determine the magnitudes for the respective drive currents $I_{LED1}$-$I_{LED4}$ for the emitters 1011, 1012, 1013, 1014 based on the determined target values for the luminous flux to be emitted from the emitters 1011, 1012, 1013, 1014. When the age of the end drone module 1000 is zero, the magnitudes of the respective drive currents $I_{LED1}$-$I_{LED4}$ for the emitters 1011, 1012, 1013, 1014 may be controlled to initial magnitudes $I_{LED\text{-}INITIAL}$.

The light output (e.g., a maximum light output and/or the light output at a specific current or frequency) of end drone module 1000 may decrease as the emitters 1011, 1012, 1013, 1014 age. The emitter control circuit 1036 may be configured to increase the magnitudes of the drive current $I_{DR}$ for the emitters 1011, 1012, 1013, 1014 to adjusted magnitudes $I_{LED\text{-}ADJUSTED}$ to achieve the determined target values for the luminous flux of the target intensity $L_{TRGT}$ and/or the target color temperature $T_{TRGT}$.

Figure 11:
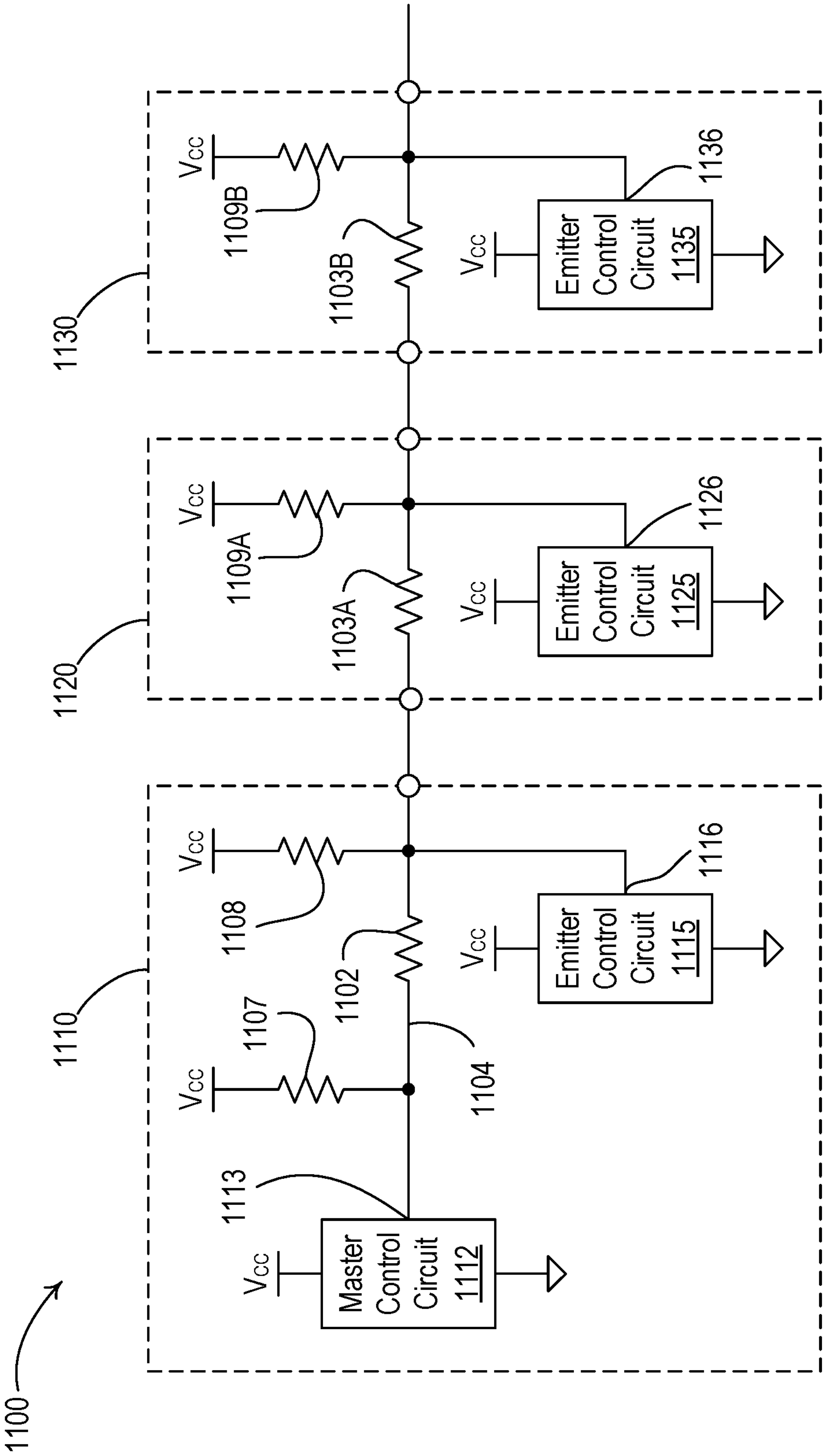
FIG. 11 is a simplified block diagram of an example linear lighting device, for example, such as the example linear lighting device shown in FIG. 1.

FIG. 11 is a simplified schematic diagram of an example linear lighting device 1100 (e.g., such as the linear lighting device 100, 400A, 400B, 400C, 510A and/or 510B). The linear lighting device 1100 may include a master lighting module 1110 (e.g., the master module 150A, 200A, 512, and/or the master lighting module 800) and a plurality of drone lighting modules 1120, 1130 (e.g., the drone lighting modules 150B, 150C, 200B-200E, 514, 900, 1000). The linear lighting device 1100 may include a housing (e.g., such as the housing 110 shown in FIGS. 1 and 2). The master lighting module 1110 and the plurality of drone lighting modules 1120, 1130 may be located (e.g., mounted) within the housing.

The master lighting module 1110 may include a master control circuit 1112 (e.g., such as the master control circuit 850 shown in FIG. 8) and an emitter control circuit 1115 (e.g., such as the emitter control circuit 836 shown in FIG. 8). The master lighting module 1110 may be communicatively coupled to the drone lighting modules 1120, 1130 via an electrical connection, such as a signal line 1104. The signal line 1104 may be an IRQ signal line (e.g., the IRQ signal line 570 shown in FIG. 6 and/or the IRQ line 846 shown in FIGS. 8-10). The master lighting module 1110 may comprise a resistor 1102 in series with the signal line 1104. The resistor 1102 of the master lighting module 1110 may be located between the emitter control circuit 1115 and the master control circuit 1112.

The master control circuit 1112 may comprise an analog-to-digital converter (ADC) coupled to the signal line 1104 at an input port 1113. The input port 1113 of the master control circuit 1112 may be pulled up to a supply voltage $V_{CC}$ through a resistor 1107. The emitter control circuit 1115 may comprise an output port 1116 coupled to the signal line 1104. The output port 1116 of the emitter control circuit 1115 may be pulled up to a supply voltage $V_{CC}$ through a resistor 1108. When the emitter control circuit 1115 is not driving the output port 1116 low (e.g., towards circuit common), the voltage on the signal line 1104 at the output port 1116 is pulled high towards the supply voltage $V_{CC}$ by the resistor 1108.

The drone lighting module 1120 may include an emitter control circuit 1125 (e.g., such as the emitter control circuit 936 shown in FIG. 9). The drone lighting module 1120 may comprise a resistor 1103A in series with the signal line 1104 between the emitter control circuit 1125 and the master control circuit 1112. The emitter control circuit 1125 may comprise an output port 1126 coupled to the signal line 1104. The output port 1126 of the emitter control circuit 1125 may be pulled up to a supply voltage $V_{CC}$ through a resistor 1109A. When the emitter control circuit 1125 is not driving the output port 1126 low (e.g., towards circuit common), the voltage on the signal line 1104 at the output port 1126 is pulled high towards the supply voltage $V_{CC}$ by the resistor 1109A. The drone lighting module 1120 may be a middle drone lighting assembly (e.g., such as the drone lighting assembly 200B shown in FIG. 3B and/or the drone lighting assembly 200C shown in FIG. 3C).

The drone lighting module 1130 may include an emitter control circuit 1135 (e.g., such as the emitter control circuit 1036 shown in FIG. 10). The drone lighting module 1130 may comprise a resistor 1103B in series with the signal line 1104 between the emitter control circuit 1135 and the master control circuit 1112. The emitter control circuit 1135 may comprise an output port 1136 coupled to the signal line 1104. The output port 1136 of the emitter control circuit 1135 may be pulled up to a supply voltage $V_{CC}$ through a resistor 1109B. When the emitter control circuit 1135 is not driving the output port 1136 low (e.g., towards circuit common), the voltage on the signal line 1104 at the output port 1136 is pulled high towards the supply voltage $V_{CC}$ by the resistor 1109B. The drone lighting module 1120 may be a middle drone lighting assembly (e.g., such as the drone lighting assembly 200B shown in FIG. 3B and/or the drone lighting assembly 200C shown in FIG. 3C). While not shown in FIG. 11, the master control circuit 1112 may be coupled to the emitter control circuits 1115, 1125, 1135 via a communication bus (e.g., the communication buses 550, 844).

The master control circuit 1112 may be configured to determine an order of the plurality of master and drone lighting modules 1110, 1120, 1130 during a configuration procedure. During the configuration procedure, the master control circuit 1112 may control each of the emitter control circuits 1115, 1125, 1135 to drive the respective output port 1116, 1126, 1136 low (e.g., towards circuit common) one-by-one (e.g., by transmitting a message to each of the emitter control circuits 1115, 1125, 1135 via the communication bus). The master control circuit 1112 may be configured to use the analog-to-digital converter measure a magnitude of a voltage on the signal line 1104 (e.g., the input port 1113) while each of the emitter control circuits 1115, 1125, 1135 is driving the respective output port 1116, 1126, 1136 low. For example, the master lighting module 1110 may determine and store a measurement voltage for each of the emitter control circuits 1115, 1125, 1135. The magnitude of each measurement voltage may be determined based on the resistances of the resistors 1102, 1103A, 1103B in series with the signal line 1104.

When one of the emitter control circuits 1115, 1125, 1135 is driving its output port 1116, 1126, 1136 low, a resistive divider circuit may be formed by the resistor 1107 and one or more of the resistors 1102, 1103A, 1103B (e.g., depending upon which one of the emitter control circuits 1115, 1125, 1135 is driving its output port 1116, 1126, 1136 low). The magnitude of each measurement voltage may be dependent upon the number of the resistors 1102, 1103A, 1103B in series with the signal line 1104 between the master control circuit 1112 and the one of the emitter control circuits 1115, 1125, 1135 is driving its output port 1116, 1126, 1136 low. For example, when the emitter control circuit 1125 is driving the output port 1126 low, two of the resistors (e.g., the resistors 1102, 1103A) in the signal line 1104 may be coupled between the input port 1113 of the master control circuit 1112 and circuit common (e.g., the output port of the emitter control circuit 1125.

When the master control circuit 1112 has stored a measurement voltage for each of the emitter control circuits 1115, 1125, 1135, the master control circuit 1112 may be configured to determine the order of the master lighting module 1110 and the drone lighting modules 1120, 1130 based on the magnitude of the measurement voltages. The order of the master and drone lighting modules may be determined, for example, in ascending order of the magnitudes of the measurement voltages. For example, the measurement of voltage of the emitter control circuit that is the closest to the master control circuit 1112 (e.g., the emitter control circuit 1115) may be the smallest of the stored measurement voltage, and the measurement of voltage of the emitter control circuit that is the farthest from the master control circuit 1112 (e.g., the emitter control circuit 1135) may be the largest of the stored measurement voltage.

It should be appreciated that although the example linear lighting device 1100 is shown with two drone lighting modules 1120, 1130, the linear lighting device 1100 may include more than two drone lighting modules connected to the master lighting module 1110. In some examples, the emitter control circuit 1115 of the master lighting module 1110 may be omitted from the configuration procedure, for example, when the master lighting module 1110 knows that the emitter control circuit 1115 is located in the master lighting module 1110 prior to executing the configuration procedure.

Figure 12:
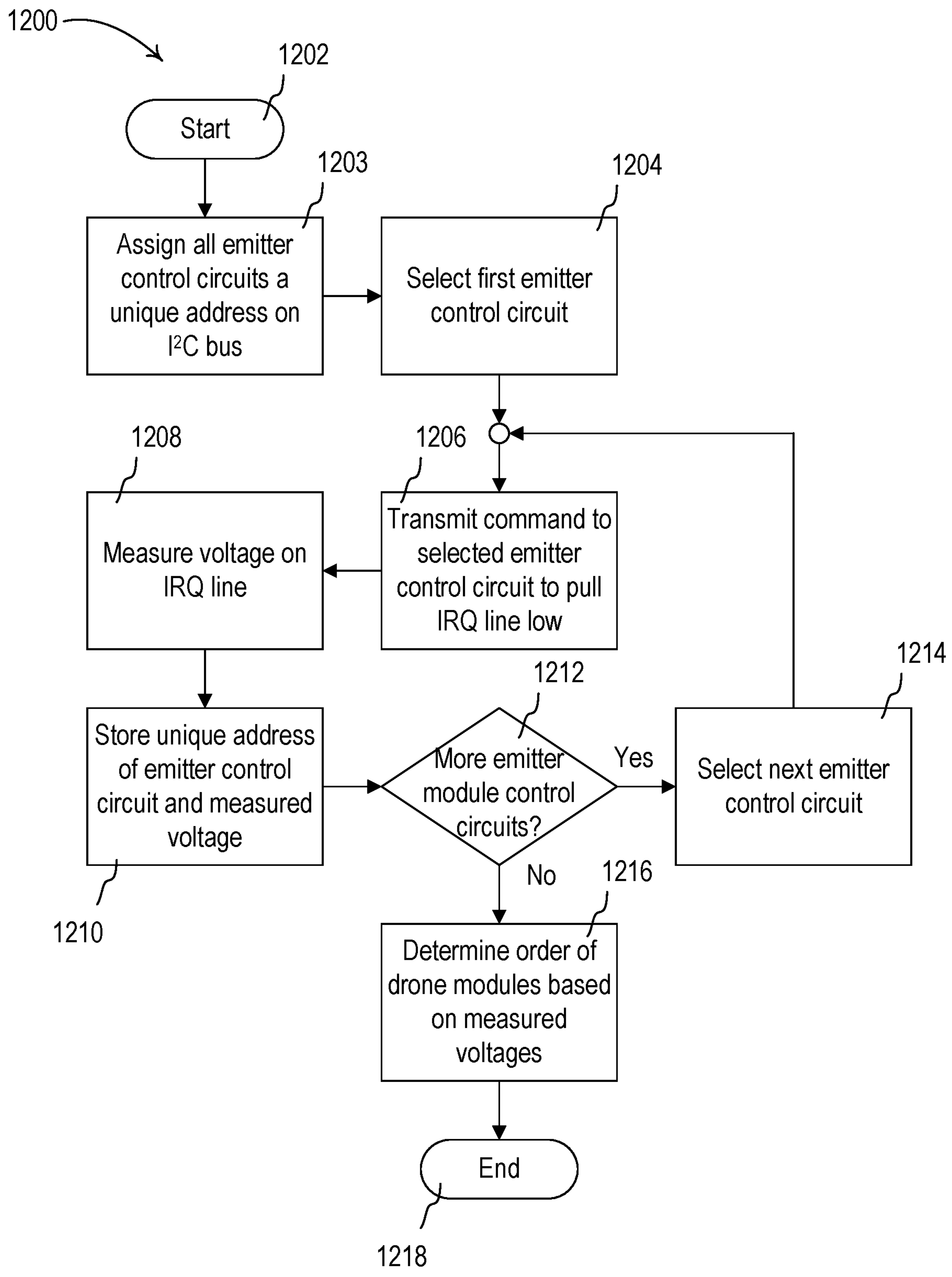
FIG. 12 is a flowchart depicting an example procedure for determining a drone lighting module order of a linear lighting device, for example, such as the example linear lighting device shown in FIG. 1.

FIG. 12 is a flowchart depicting an example procedure 1200 for determining an order of master and drone lighting modules in a linear lighting device (e.g., such as the linear lighting device 1100 shown in FIG. 11). The procedure 1200 may be executed as part of a configuration procedure (e.g., an association procedure or a commissioning procedure). The procedure 1200 may be executed by a master control circuit of a master lighting module (e.g., the master control circuit 1112 of the master lighting module 1110 shown in FIG. 11). For example, the procedure 1200 may be executed by the master control circuit of master lighting module to determine an order of a plurality of master and drone lighting modules of the linear lighting fixture. The order of the master and drone lighting modules may represent a physical arrangement of the master and drone lighting modules within the linear lighting device (e.g., within a housing of the linear lighting device). For example, the order of the master and drone lighting modules may represent a relative location of each of the drone lighting modules with respect to the master lighting module.

The procedure 1200 may be executed at 1202 in response to the linear lighting device being powered up and/or in response to one or more of the master and drone lighting modules receiving a message including a command to execute the configuration procedure. The linear lighting device may be assembled using a plurality of interchangeable parts having respective serial numbers that can be installed in various locations of the linear lighting device and the configuration may be performed during assembly (e.g., at the factory). For example, the arrangement of the interchangeable parts does not need to be pre-determined prior to assembly of the linear lighting device. That is, the procedure 1200 may enable the linear lighting device to determine which drone lighting module was installed closest to the master lighting module, which drone lighting module was installed next closest, and so on.

At 1203, the master control circuit of the master lighting module may assign a unique address to each of the plurality of emitter control circuits of the master and drone lighting modules in the linear lighting device. For example, the master lighting module may send, via a communication bus (e.g., communication buses 550, 844), messages to each of the plurality of drone lighting modules indicating the respective unique addresses of the emitter control circuits. The master lighting module and the plurality of lighting module may also be electrically connected to a signal line (e.g., the IRQ signal line 570 shown in FIG. 6 and/or the IRQ signal line 846 shown in FIGS. 8-10). The signal line may be configured to enable signaling from the plurality of emitter control circuits to the master control circuit of the master lighting module. For example, each of the plurality of emitter control circuits may use the signal line to indicate that service is needed and/or that the emitter control circuit has a message to transmit to the master control circuit.

At 1204, the master control circuit of the master lighting module may select one of the plurality of emitter control circuits. For example, the master lighting module may randomly select one of the plurality of the emitter control circuits. At 1206, the master control circuit of the master lighting module may send a message (e.g., a configuration message) to the selected emitter control circuit. The configuration message may include a command instructing the selected emitter control circuit to pull an output port connected to the signal line low (e.g., below a predetermined threshold and/or to approximately circuit common).

At 1208, the master control circuit of the master lighting module may measure a magnitude of a voltage at an input port connected to the signal line. For example, the magnitude of the voltage at the input port connected to the signal line may be measured after (e.g., shortly after) the configuration message including the command is transmitted to the selected first emitter control circuit (e.g., at 1206). The master control circuit may measure the magnitude of the voltage at the input port using an analog-to-digital converter.

At 1210, the master control circuit of the master lighting module may store the unique address of the selected first emitter control circuit and the first measured voltage magnitude. For example, the master control circuit of the master lighting module may associate the first measured voltage magnitude with the first selected emitter control circuit and store the unique address and the first measured voltage magnitude together in a memory (e.g., such as the memory 852 shown in FIG. 8).

At 1212, the master control circuit of the master lighting module may determine whether unique addresses of any other emitter control circuits have not been stored in memory with a measured voltage magnitude. The master control circuit of the master lighting module may determine, at 1212, whether the master control circuit has been measured a magnitude of the voltage at its output port connected to the signal line for each of the plurality of emitter control circuits. When master control circuit of the master lighting module determines that a unique address for at least one other emitter control circuit has not been stored, the master control circuit may select, at 1214, another emitter control circuit. The master control circuit of the master lighting module may then proceed to 1208.

For example, 1206, 1208, and 1210 may be performed iteratively for each emitter control circuit in the linear lighting device. That is, the master control circuit of the master lighting module may iteratively transmit, at 1206, a plurality of configuration messages to the unique addresses of each of the plurality of emitter control circuits. For example, the configuration messages may be sent with a predetermined delay between each control message. The predetermined delay may be configured to enable a respective emitter control circuit to pull its output port connected to the signal line low and the master control circuit to measure a corresponding magnitude of the voltage at its input port connected to the signal line. The master control circuit of the master lighting module may measure, at 1208, after transmitting each configuration message of the plurality of configuration messages, a magnitude of the voltage at its input port connected to the signal line. The master control circuit of the master lighting module may associate each of a plurality of measured voltage magnitudes with each of the plurality of emitter control circuits. The master control circuit of the master lighting module may store, at 1210, the unique address and measured voltage magnitude (e.g., together) of each of the plurality of emitter control circuits.

At 1216, the master control circuit of the master lighting module may determine the order of the master and drone lighting modules based on the measured voltage magnitudes, for example, when the master control circuit determines that unique addresses have been stored for each emitter control circuit of the plurality of master and drone lighting modules in the linear lighting device. The master control circuit of the master lighting module may determine the order of the master and drone lighting modules when the magnitude of the voltage at the input port connected to the control link has been measured for each of the plurality of emitter control circuits. For example, the order of the master and drone lighting modules may be determined in ascending order of measured voltage magnitude. For example, the unique address associated with the smallest measured voltage magnitude may be determined to be the first emitter control circuit in the order (e.g., the emitter control circuit in the master lighting module). And, the unique address associated with the greatest measured voltage magnitude may be determined to be the last emitter control circuit in the order (e.g., the emitter control circuit in the drone lighting module furthest from the master lighting module).

Figure 13:
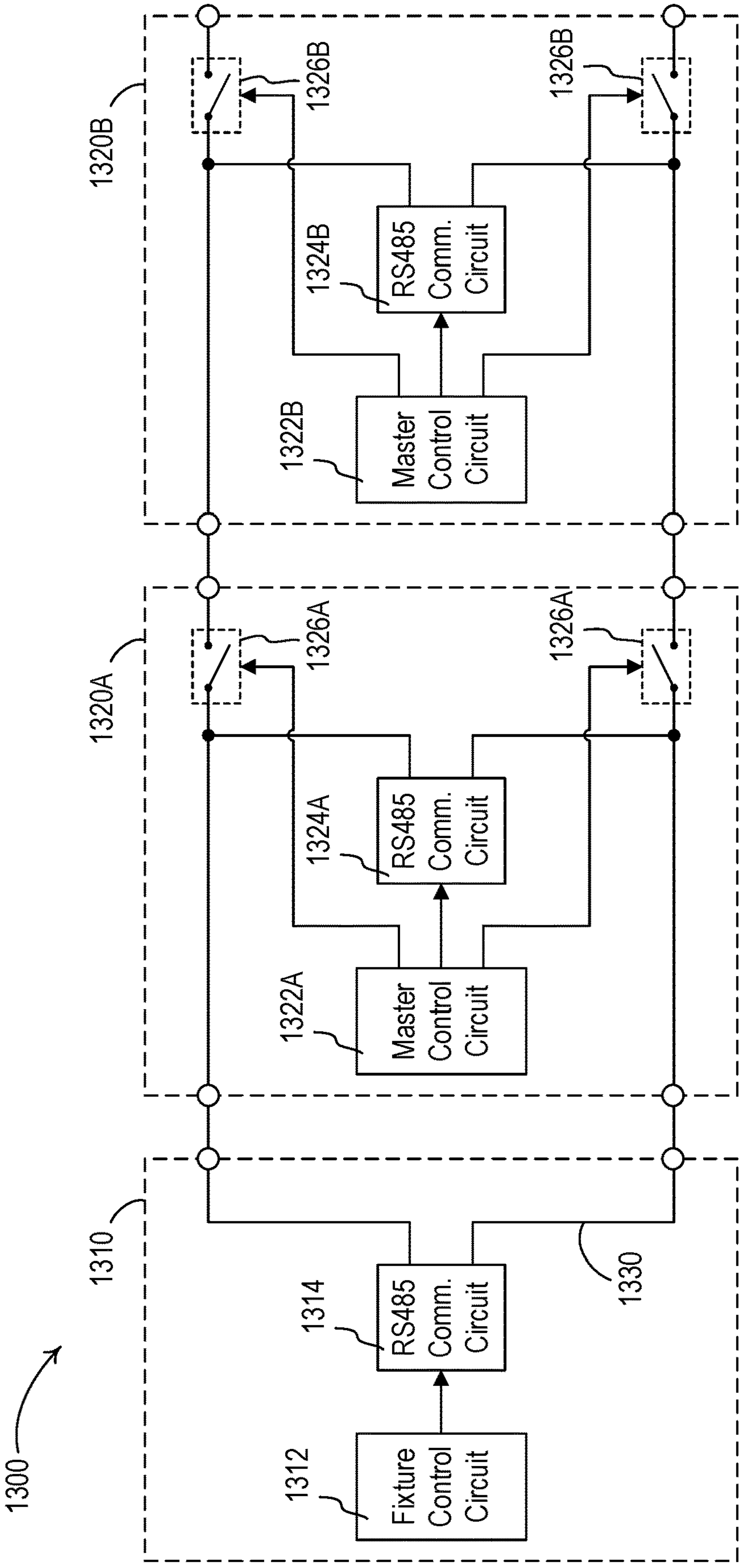
FIG. 13 is a simplified block diagram of an example linear lighting assembly.

FIG. 13 is a simplified block diagram of an example linear lighting assembly 1300. The linear lighting assembly 1300 may include a fixture controller 1310 (e.g., the fixture controller 520 and/or the fixture controller 700) and a plurality of master lighting modules 1320A, 1320B (e.g., the master module 150A, 200A, 512, and/or the master lighting module 800). The fixture controller 1310 may be configured to determine an order of the plurality of master lighting modules 1320A, 1320B. For example, the fixture controller 1310 may be connected to the plurality of master lighting modules 1320A, 1320B at an installation site and the fixture controller 1310; so, the fixture controller 1310 may not know the arrangement or address of the plurality of master lighting modules 1320A, 1320B at the time of installation.

The fixture controller 1310 may include a fixture control circuit 1312 (e.g., such as the fixture control circuit 736 shown in FIG. 7) and an RS-485 communication circuit 1314 (e.g., such as the serial communication circuit 738 shown in FIG. 7). The RS-485 communication circuit 1314 may be coupled to a communication bus 1330 (e.g., an RS-485 communication link) between the fixture controller 1310 and the plurality of master lighting modules 1320A, 1320B.

The master lighting module 1320A may include a master control circuit 1322A (e.g., such as the master control circuit 850 shown in FIG. 8), an RS-485 communication circuit 1324A (e.g., such as the serial communication circuit 854 shown in FIG. 8), and respective controllable switches 1326A coupled in series with positive and negative lines of the communication bus 1330. For example, the controllable switches 1326A may each comprise a field-effect transistor (FET). The RS-485 communication circuit 1324A may be coupled to the communication bus 1330, for example, between the switches 1326A and the fixture controller 1310. In examples, the RS-485 communication circuit 1324A may be configured to close the loop on the communication bus 1330, for example, when the switches 1326A are in an open position.

The master lighting module 1320B may include a master control circuit 1322B (e.g., such as the master control circuit 850 shown in FIG. 8), an RS-485 communication circuit 1324B (e.g., such as the serial communication circuit 854 shown in FIG. 8), and respective controllable switches 1326B coupled in series with the positive and negative lines of the communication bus 1330. For example, the controllable switches 1326A may each comprise a field-effect transistor (FET). The RS-485 communication circuit 1324B may be coupled to the communication bus 1330, for example, between the switches 1326B and the fixture controller 1310. The RS-485 communication circuit 1324B may be configured to close the loop on the communication bus 1330, for example, when the switches 1326B are in an open position.

The fixture controller 1310 may be configured to determine an order of the plurality of master lighting modules 1320A, 1320B. For example, the fixture controller 1310 may determine the order of the master lighting modules 1320A, 1320B based on communications on the communication bus 1330 when the switches 1326A, 1326B are in open or closed positions. For example, the fixture controller 1310 may determine that the master lighting module 1320A is located closest to the fixture controller 1310, for example, due to the fixture controller 1310 transmitting a query message to the master lighting module 1320A and the master lighting module 1320A transmitting a response message to the fixture controller 1310 via the communication bus 1330 when all of the switches 1326A, 1326B are open. The fixture controller 1310 may determine that the master lighting module 1320B is located second closest to the fixture controller 1310, for example, due to the fixture controller 1310 transmitting a query message to the master lighting module 1320B and the master lighting module 1320B transmitting a response message to the fixture controller 1310 via the communication bus 1330 when the switches 1326A are closed and the switches 1326B are open. The fixture controller 1310 may be configured to command each master lighting module to close their switches in sequential order. The fixture controller 1310 may continue commanding additional switches closed until all of the master lighting modules have been uniquely addressed.

It should be appreciated that although the example linear lighting assembly 1300 is shown with two master lighting modules 1320A, 1320B, the linear lighting assembly 1300 may include more than two master lighting modules connected to the fixture controller 1310.

Figure 14:
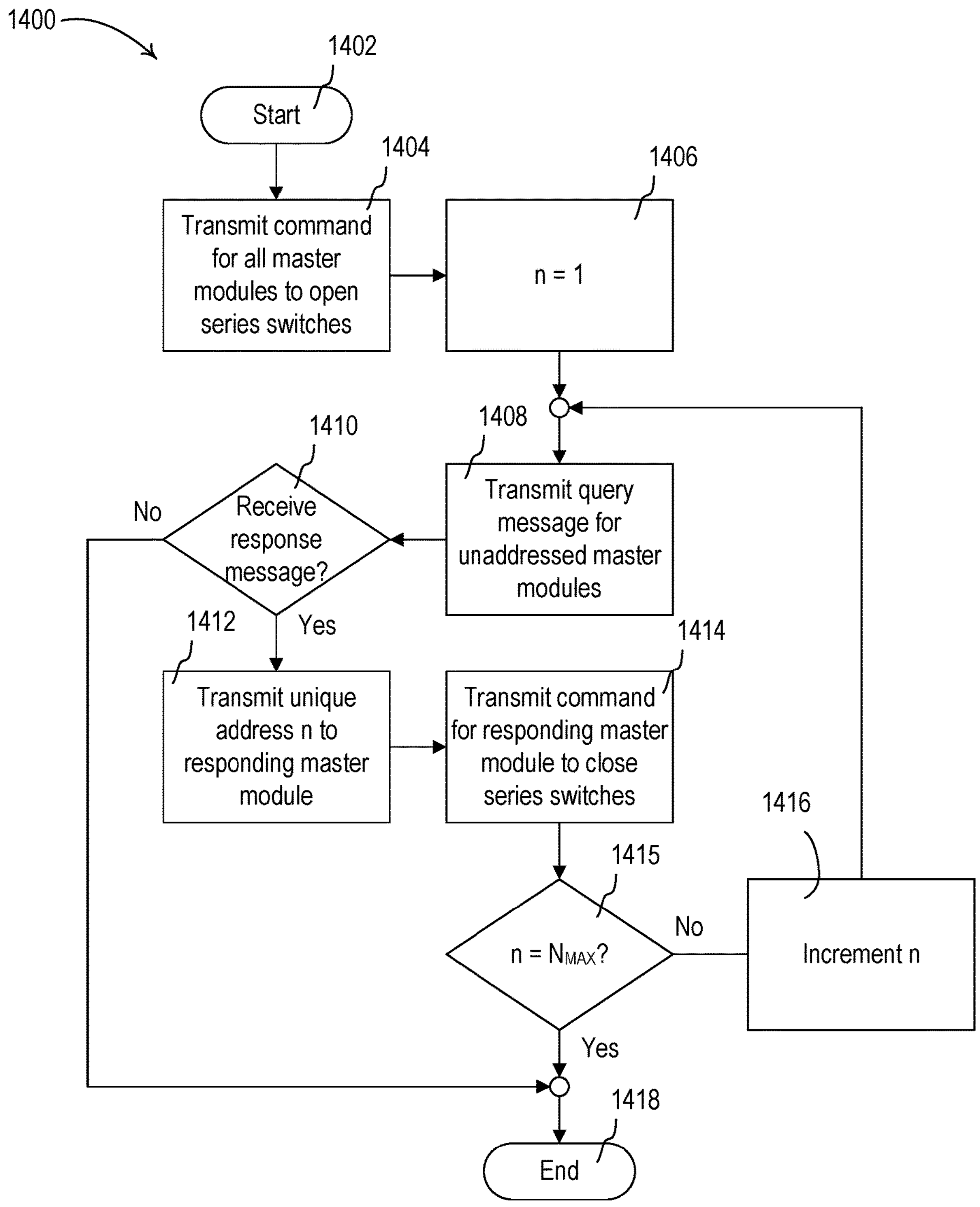
FIG. 14 is a flowchart depicting an example procedure for determining a master lighting module order for a linear lighting assembly.

FIG. 14 is a flowchart depicting an example procedure 1400 for determining an order of master lighting modules of a linear lighting assembly (e.g., the lighting system 500 and/or the linear lighting assembly 1300). The procedure 1400 may be executed as part of a configuration procedure (e.g., an association procedure or a commissioning procedure) for the linear lighting assembly. The procedure 1400 may be executed by a control circuit of a fixture controller (e.g., the fixture control circuit 1312 of the fixture controller 1310 shown in FIG. 13). For example, the procedure 1400 may be executed by the control circuit of the fixture controller to determine an order of a plurality of master lighting modules (e.g., the master module 150A, 200A, 512, and/or the master lighting module 800) connected to the fixture controller. The order of the plurality of master lighting modules may represent a physical arrangement of the plurality of master lighting modules with respect to the fixture controller. For example, the order of the plurality of master lighting modules may represent a relative location of each of the plurality of master lighting modules with respect to the fixture controller.

The procedure 1400 may be executed at 1402 in response to the linear lighting device being powered up and/or in response to one or more of the fixture controller and master lighting modules receiving a message including a command to execute the configuration procedure. The linear lighting device may be assembled using interchangeable parts that can be installed in various locations of the linear lighting assembly and the configuration may not be performed during assembly (e.g., at the factory). That is, the procedure 1400 may enable the fixture controller to determine which master lighting module was installed closest to the fixture controller, which master lighting module was installed next closest, and so on.

At 1404, the fixture controller (e.g., the control circuit) may send a message to each of the plurality of master lighting modules. The message may be sent via a communication bus (e.g., the communication bus 1330 shown in FIG. 13). The message may include a command controlling the plurality of master lighting modules to open series switches that may be in series with the positive and negative lines of the communication bus in each of the master lighting modules (e.g., switches 1326A, 1326B). When all of the switches are open, only the closest master lighting module of the plurality of lighting modules may be coupled to the fixture controller via the communication bus. At 1406, the fixture controller may initialize a variable n to one.

At 1408, the fixture controller may transmit (e.g., via the communication bus) a query message for unaddressed master lighting modules. For example, the query message may request a response message to be transmitted from any unaddressed master lighting modules on the communication bus.

At 1410, the fixture controller may determine whether a response message was received in response to the transmission of the query message. For example, the fixture controller may receive a response message from an unaddressed master lighting module. The response message from the unaddressed master lighting module may include a unique identifier of the unaddressed master lighting module. The unique identifier may include a serial number and/or another identifier of the responding master lighting module. The fixture controller may determine a unique address for the responding master lighting module. The unique address may be a link address (e.g., 0, 1, 2, 3 . . . n) used by the fixture controller and/or other master lighting modules of the linear lighting assembly to communicate with the responding master lighting module (e.g., on the RS-485 communication link).

At 1412, the fixture controller may transmit a message including the unique address to the responding master lighting module. The responding master lighting module may store the unique address in memory. At 1414, the fixture controller may transmit a message to the responding master lighting module, for example, including a command for controlling the responding master lighting module to close the series switches (e.g., switches 1326A) in series with the communication bus. At 1415, the fixture controller may determine whether the variable n is equal to a maximum number $N_{MAX}$ (e.g., 20) of master lighting modules that may be connected to the fixture controller. When the fixture controller determines that the variable n is equal to the maximum number $N_{MAX}$, the procedure 1400 may end at 1418. When the variable n is not equal to the maximum number $N_{MAX}$, the fixture controller may transmit, at 1404, another query message for unaddressed master lighting modules.

Steps 1408, 1410, 1412, 1414, 1415, and 1416 may be performed iteratively for each master lighting module in the linear lighting assembly until all have been uniquely addressed. For example, the fixture control module may determine that the master lighting modules of the linear lighting assembly have all been uniquely addressed when a response message to the query message is not received at 1410 and/or when the variable n is equal to the maximum number $N_{MAX}$ at 1415. The fixture controller may determine an order of the master lighting modules, for example, based on receipt of the response messages from the respective master lighting modules. For example, the fixture controller may determine that a first master lighting module is located closest to the fixture controller when the first master lighting module has transmitted the response message to the fixture controller when all of the series switches are open. The fixture controller may determine that a second master lighting module is located second closest to the fixture controller when the second master lighting module has transmitted the response message to the fixture controller when the series switch on the first master lighting module are closed and the other series switches are open. The procedure 1400 may continue until all of the master lighting modules have been uniquely addressed.

Figure 15:
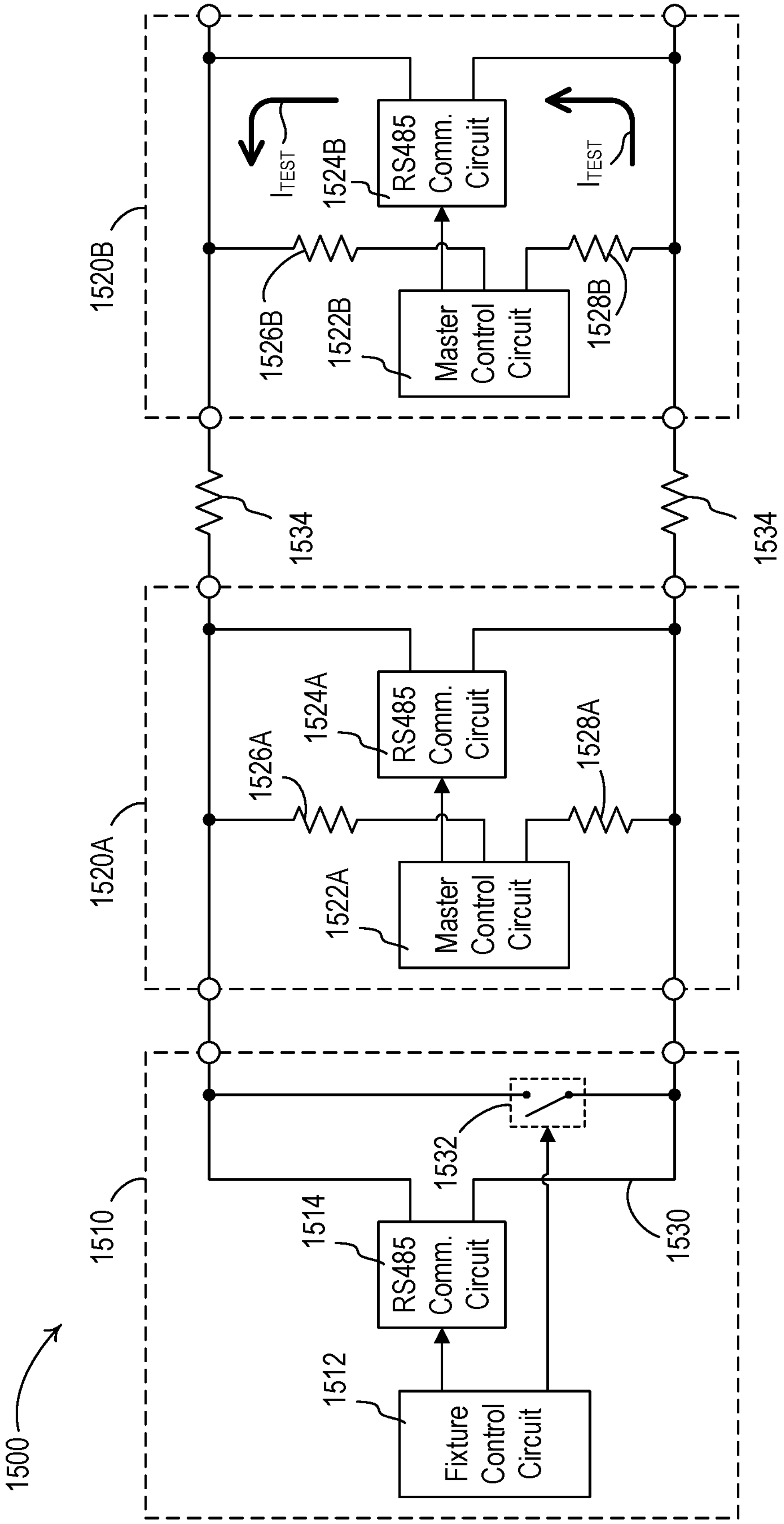
FIG. 15 is a simplified block diagram of another example linear lighting assembly.

FIG. 15 is a simplified block diagram of an example linear lighting assembly 1500 (e.g., the lighting system 500 and/or the linear lighting assembly 1300). The linear lighting assembly 1500 may include a fixture controller 1510 (e.g., the fixture controller 520 and/or the fixture controller 700) and a plurality of master lighting modules 1520A, 1520B (e.g., the master module 150A, 200A, 512, and/or the master lighting module 800). Resistors 1534 shown in FIG. 15 may represent resistance in the communication bus 1530 (e.g., in wires and/or printed circuit board traces) between the master lighting modules 1520A, 1520B. The fixture controller 1510 may be configured to determine an order of the plurality of master lighting modules 1520A, 1520B. For example, the fixture controller 1510 may be connected to the plurality of master lighting modules 1520A, 1520B at an installation site; so, the fixture controller 1510 may not know the arrangement or address of the plurality of master lighting modules 1520A, 1520B at the time of installation.

The fixture controller 1510 may include a fixture control circuit 1512 (e.g., such as the fixture control circuit 736 shown in FIG. 7) and an RS-485 communication circuit 1514 (e.g., such as the serial communication circuit 738 shown in FIG. 7). The RS-485 communication circuit 1514 may generate the communication bus 1530 between the fixture controller 1510 (e.g., the fixture control circuit 1512) and the plurality of master lighting modules 1520A, 1520B. The fixture controller 1510 may include a controllable switch 1532 across the communication bus 1530. The fixture control circuit 1512 may be configured to close the controllable switch 1532, for example, to short the communication bus 1530 at the fixture controller 1510.

The master lighting module 1520A may include a master control circuit 1522A (e.g., such as the master control circuit 850 shown in FIG. 8) and an RS-485 communication circuit 1524A (e.g., such as the serial communication circuit 854 shown in FIG. 8). The RS-485 communication circuit 1524A may be coupled to the communication bus 1530. The master control circuit 1522A may be configured to control the RS-485 communication circuit 1524A. The master control circuit 1522A may comprise an analog-to-digital converter that may be coupled to the positive and negative lines of the communication bus 1530 via respective resistors 1526A, 1528A.

The master lighting module 1520B may include a master control circuit 1522B (e.g., such as the master control circuit 850 shown in FIG. 8) and an RS-485 communication circuit 1524B (e.g., such as the serial communication circuit 854 shown in FIG. 8). The RS-485 communication circuit 1524B may be coupled to the communication bus 1530. The master control circuit 1522B may be configured to control the RS-485 communication circuit 1524B. The master control circuit 1522B may comprise an analog-to-digital converter that may be coupled to the positive and negative lines of the communication bus 1530 via respective resistors 1526B, 1528B.

The fixture controller 1510 may be configured to determine an order of the plurality of master lighting modules 1520A, 1520B. For example, the fixture controller 1510 may determine the order based on voltage measurements received from the master lighting modules 1520A, 1520B. The fixture controller 1510 may command one of the master lighting modules 1520A, 1520B to control the respective RS-485 communication circuits 1524A, 1524B output a logic high bit on the communication bus 1530, which may cause a test current $I_{TEST}$ to be conducted through the communication bus 1530. Prior to the RS-485 communication circuit 1524A, 1524B outputting the logic high bit, the fixture controller 1510 may close the controllable switch 1532, for example to short the communication bus 1530 at the fixture controller 1510. The other master lighting modules 1520A, 1520B may measure the voltage on the communication bus 1530, for example, while the one of the master lighting modules 1520A, 1520B is outputting the logic high bit. For example, the analog-to-digital converters of the other master lighting modules 1520A, 1520B may measure the voltage on the communication bus 1530. The fixture controller 1510 may open the switch 1532 a predetermined period after the controllable switch 1532 was closed. The master lighting modules 1520A, 1520B may transmit the measured voltages to the fixture controller 1510 via the communication bus 1530 when the switch 1532 is open. The fixture controller 1510 may determine the order based on the relative magnitudes of the measured voltages.

It should be appreciated that although the example linear lighting assembly 1500 is shown with two master lighting modules 1520A, 1520B, the linear lighting assembly 1500 may include more than two master lighting modules connected to the fixture controller 1510.

Figure 16:
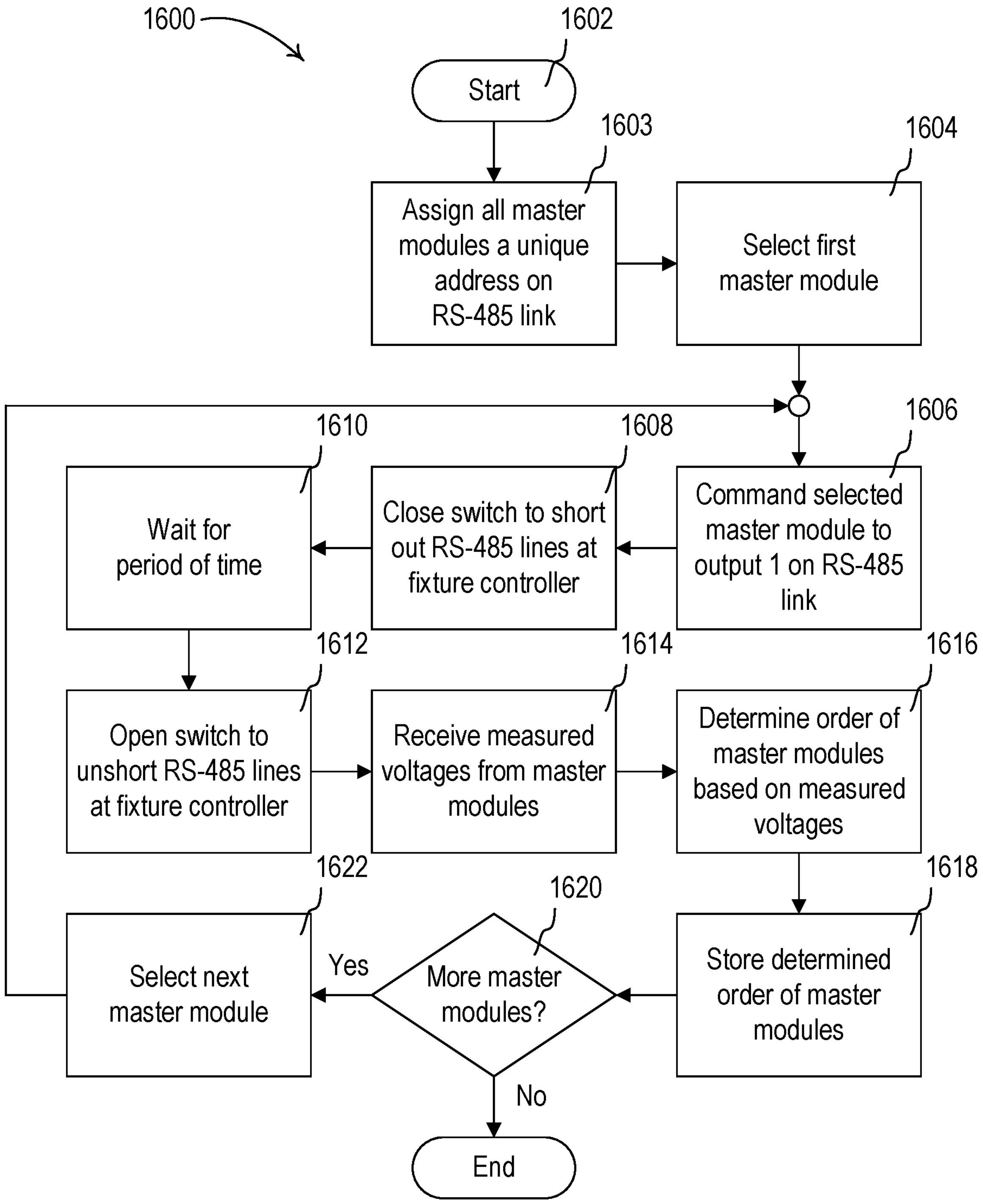
FIG. 16 is a flowchart depicting another example procedure for determining a master lighting module order for a linear lighting assembly.

FIG. 16 is a flowchart depicting an example procedure 1600 for determining an order of master lighting modules of a linear lighting assembly (e.g., the lighting system 500, the linear lighting assembly 1300, and/or the linear lighting assembly 1500). The procedure 1600 may be executed as part of a configuration procedure (e.g., an association procedure or a commissioning procedure) for the linear lighting assembly. The procedure 1600 may be executed by a control circuit of a fixture controller (e.g., the fixture control circuit 736 of the fixture controller 700 and/or the fixture control circuit 1512 of the fixture controller 1510). For example, the procedure 1600 may be executed by the control circuit of the fixture controller to determine an order of a plurality of master lighting modules (e.g., the master module 150A, 200A, 512, and/or the master lighting module 800) connected to the fixture controller. The order of the plurality of master lighting modules may represent a physical arrangement of the plurality of master lighting modules with respect to the fixture controller. For example, the order of the plurality of master lighting modules may represent a relative location of each of the plurality of master lighting modules with respect to the fixture controller.

The procedure 1600 may be executed at 1602 in response to the linear lighting device being powered up and/or in response to one or more of the fixture controller and master lighting modules receiving a message including a command to execute the configuration procedure. The linear lighting device may be assembled using available parts and the configuration may not be performed during assembly (e.g., at the factory). That is, the procedure 1600 may enable the fixture controller to determine which master lighting module was installed closest to the fixture controller, which master lighting module was installed next closest, and so on.

At 1603, the fixture controller (e.g., the control circuit) may assign a unique address to each of the plurality of master lighting modules (e.g., the plurality of emitter control circuits) in the linear lighting assembly. For example, the fixture controller may transmit, via a communication bus (e.g., such as the communication bus 1530 shown in FIG. 15), messages to each of the plurality of master lighting modules indicating the respective unique addresses of the master lighting modules. The communication bus may be an RS-485 communication bus. The fixture controller and the plurality of master lighting modules may be coupled to the communication bus. The communication bus may be configured to enable the fixture controller to transmit control messages to the plurality of master lighting modules, for example, using the unique addresses.

At 1604, the fixture controller may select a first master lighting module of the plurality of master lighting modules. For example, the fixture controller may randomly select the first master lighting module. At 1606, the fixture controller may send a command to the first master lighting module to cause its RS-485 communication circuit to output a logic high bit on the communication bus, such may cause a test current to be conducted through the communication bus. At 1608, the fixture controller may close a controllable switch across the communication bus at the fixture controller. Closing the switch may short the communication bus at the fixture controller. At 1610, the fixture controller may wait a predetermined period (e.g., to allow the first master lighting module to output the logic one bit on the communication bus and for the other master lighting modules to measure the voltages on the communication bus). At 1612, the fixture controller may open the switch to cease shorting the communication bus at the fixture controller. At 1614, the fixture controller may receive, from one or more of the plurality of master lighting modules, a plurality of messages including measured magnitudes of the voltages on the communication bus while the communication bus was shorted at the fixture controller. The plurality of master lighting modules may have measured the plurality of voltages while the first master lighting module output the logic high bit. Only the master lighting modules between the first master lighting module that outputted the logic high bit and the fixture controller may be configured to measure the magnitude of the voltage on the communication bus and transmit the measured magnitude to the fixture controller. The measured magnitude of the voltage on the communication bus at each of the master lighting modules may be dependent upon the resistance of the communication bus between the master lighting modules and the fixture controller (e.g., as represented by the resistors 1534 shown in FIG. 15).

At 1616, the fixture controller may determine an order of the master lighting modules based on the received measured voltages. For example, the order of the master lighting modules may be determined in ascending order of measured voltage. For example, the unique address associated with the lowest measured voltage may be determined to be the first master lighting module in the order (e.g., closest to the fixture controller). And, the unique address associated with the greatest measured voltage may be determined to be the last master lighting module in the order (e.g., furthest from the fixture controller of the master lighting modules that measured the voltage). At 1618, the fixture controller may store the order of master lighting modules. At 1620, the fixture controller may determine whether there are master lighting modules from which the fixture controller has not received a measured magnitude of the voltage on the communication bus. Since only the master lighting modules between the first master lighting module that outputted the logic high bit and the fixture controller may be configured to measure the magnitude of the voltage on the communication bus and transmit the measured magnitude to the fixture controller, the fixture controller may still need to determine the order of the remaining master lighting modules. The fixture controller may select, at 1622, another master lighting module to output a logic high bit. The fixture controller may select one of the master lighting modules that has not previously transmitted a measured magnitude to the fixture controller. The fixture controller may then repeat 1606, 1608, 1610, 1612, 1614, 1616, 1618, and 1620 until the fixture controller has received measure magnitudes from all of the master lighting modules of the linear lighting assembly except one. The remaining master lighting module may be the last master lighting module to have outputted a logic high bit and may be the farthest master lighting module from the fixture controller. The fixture controller may update the order of master lighting modules based on the received measured voltages from each iteration. Additionally or alternatively, the master lighting module (e.g., the control circuit) may determine the order of the master lighting modules when the measured voltages have been measured and received while each of the plurality of master lighting modules outputs a current on the communication bus.

Figure 17:
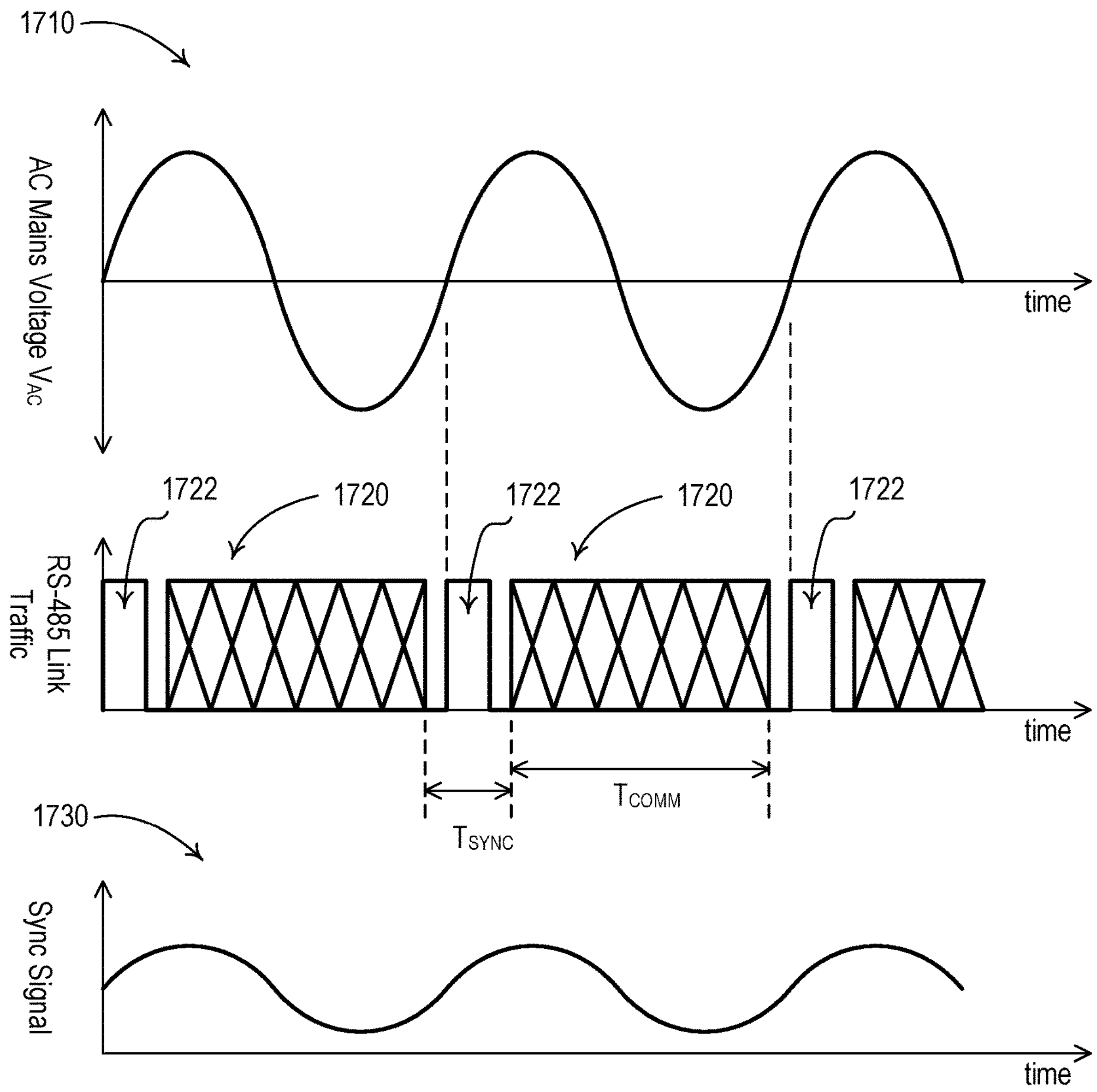
FIG. 17 depicts example waveforms associated with generation of a timing signal.

FIG. 17 depicts example waveforms associated with the generation of a timing signal 1730 on a synchronization line (e.g., the synchronization lines 844) that is coupled between one or more master and drone lighting modules. For example, a master lighting module (e.g., the master module 150A, 200A, 512, and/or the master lighting module 800) of a linear lighting assembly (e.g., the lighting system 500, the linear lighting assembly 1300, and/or the linear lighting assembly 1500) may be configured to generate the timing signal 1730. The linear lighting assembly may include a fixture controller (e.g., the fixture controller 520, the fixture controller 700, and/or the fixture controller 1510), one or more master lighting modules, and a plurality of drone lighting modules (e.g., the drone lighting module 900, the drone lighting module 1000, the drone lighting module 1120, and/or the drone lighting module 1130).

The fixture controller may receive an AC mains voltage 1710. The fixture controller may be configured to transmit messages (e.g., as represented by communication waveforms 1720) to the master lighting control modules via a communication bus (e.g., the communication bus 540, 840) during a communication period $T_{COMM}$. In addition, the fixture controller may be configured to generate a synchronization pulse 1722 on the communication bus. The fixture controller may be configured to determine the zero-crossings of the AC mains voltage 1710 and begin generating the synchronization pulse 1722 at the zero-crossings (e.g., once per line cycle of the AC mains voltage). The fixture controller may be configured to pause communications on the communication bus during a synchronization period $T_{SYNC}$ during which the fixture controller may generate the synchronization pulse 1722. In some examples, the fixture controller may poll (e.g., query) each of the master lighting modules in a looping manner on the communication bus. If a master lighting module has a message to transmit, the master lighting module will only communication on the communication bus in response to being polled by the fixture controller. In such examples, the fixture controller may pause communication on the communication bus by ceasing to poll the master lighting modules on the communication bus. In other examples, the fixture controller may transmit a communicate message to the master lighting modules on the communication bus to indicate that the master lighting modules may communicate on the communication bus, and may pause the communication on the communication bus by sending a pause message on the communication bus.

The fixture controller may determine the length of the synchronization period $T_{SYNC}$ based on the time of the zero-crossing event. For example, the fixture controller may determine when to end the synchronization period $T_{SYNC}$ based on the time of the zero-crossing event, which means that the length of the synchronization period $T_{SYNC}$ may vary from on half-cycle to the next. Further, the time between the zero-crossing and the end of the synchronization period $T_{SYNC}$ might be a fixed or predetermined time. Accordingly, in some examples, the time between the end of the communication period $T_{COMM}$ and the next zero-crossing might vary.

Each of the master lighting modules may generate a timing signal 1730 in response to receiving the synchronization pulse 1722 on the communication bus, and for example, based on the frequency of the synchronization pulse 1722 (e.g., based on the frequency of a plurality of synchronization pulses 1722). The timing signal 1730 may be a sinusoidal wave (e.g., as shown), or alternatively, may be a square wave or other suitable timing signal. For instance, the timing signal 1730 may be a sinusoidal waveform having the same frequency and period as the synchronization pulses 1722. For example, the master lighting modules may be configured to determine a frequency of synchronization pulses 1722 on the communication bus (e.g., which may be indicative of the frequency and/or zero-crossing events of the AC mains voltage 1710). In some examples, the master lighting modules may be configured to measure a period between the beginnings (e.g., or ends) of the synchronization pulses 1722 to determine the frequency of the synchronization pulses 1722. The plurality of master and drone lighting modules may be configured to use the timing signal 1730 to determine the timing of a respective measurement interval during which the master and drone lighting modules may execute a measurement procedure (e.g., as described above), since, for example, the timing signal 1730 may be indicative of the frequency and/or zero-crossing events of the AC mains voltage 1710. Accordingly, the master and drone lighting modules may coordinate a measurement procedure with respect to the AC mains line voltage $V_{AC}$ (e.g., the zero-crossing event of the AC mains line voltage $V_{AC}$), even though the master and drone lighting modules do not receive the AC mains line voltage $V_{AC}$.

Figure 18:
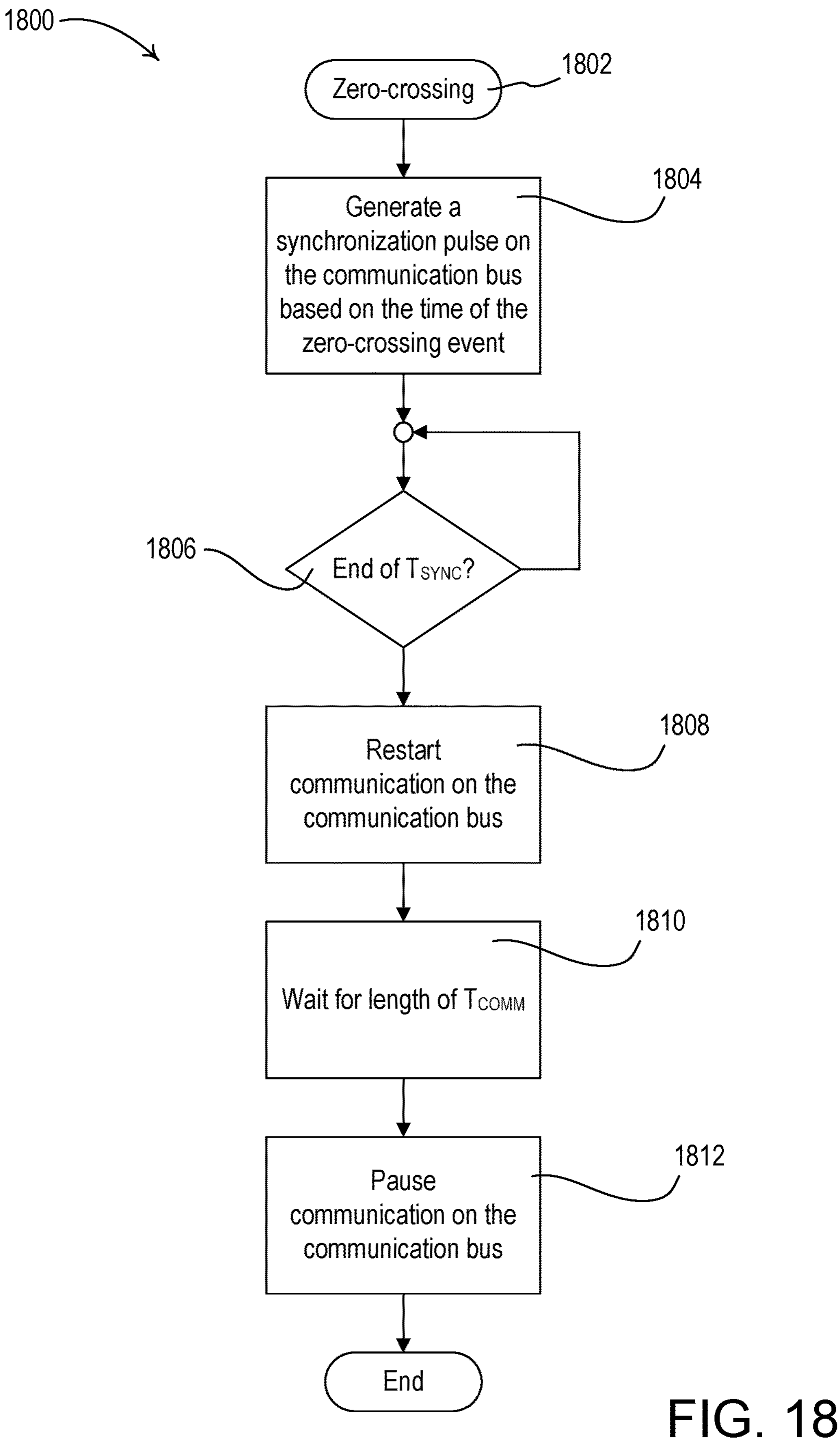
FIG. 18 is a flowchart depicting an example procedure for generating a synchronization pulse across a communication bus for receipt by one or more master lighting modules of a linear lighting assembly.

FIG. 18 is a flowchart depicting an example procedure 1800 for generating a synchronization pulse across a communication bus for receipt by one or more master lighting modules of a linear lighting assembly (e.g., the lighting system 500, the linear lighting assembly 1300, and/or the linear lighting assembly 1500). The procedure 1800 may be executed by a control circuit of a fixture controller (e.g., the fixture control circuit 736 of the fixture controller 700 and/or the fixture control circuit 1512 of the fixture controller 1510). The control circuit may execute the procedure 1800 periodically. The control circuit may execute the procedure 1800 to synchronize the fixture controller and/or devices controlled by the fixture controller (e.g., one or more master and/or drone lighting modules) in accordance with the frequency of the AC mains line voltage $V_{AC}$ (e.g., utilizing the timing of the zero crossings of the AC mains line voltage $V_{AC}$).

The control circuit may execute the procedure 1800 in response to a signal from a zero-cross detect circuit indicating a zero-crossing of the AC mains line voltage $V_{AC}$ (e.g., the zero-cross signal $V_{ZC}$) at 1802. For example, a rising or falling edge of the zero-cross signal $V_{ZC}$ may trigger an interrupt in the control circuit that may cause the execution of the procedure 1800 at 1802. The control circuit may execute the procedure 1800 in response to the zero-cross signal $V_{ZC}$ at approximately the times of zero-crossings of the AC mains lines voltage $V_{AC}$. For example, the control circuit may execute the procedure 1800 once per line cycle, for example, at the positive-going zero-crossings (e.g., or the negative-going zero-crossings).

At 1804, the control circuit may generate a synchronization pulse (e.g., a synchronization frame and/or the synchronization pulse 1722) on a communication bus (e.g., the serial communication bus 740) based on the time of the zero-crossing event. For example, the control circuit may generate the synchronization pulse such that the synchronization pulse begins at begins at the zero-crossing event.

At 1806, the control circuit may determine whether a synchronization period $T_{SYNC}$ is has ended. If the control circuit determines that the synchronization period $T_{SYNC}$ has not ended at 1806, the control circuit may continue to generate the synchronization pulse. During the synchronization period $T_{SYNC}$, the control circuit may be configured to pause communications on the communication bus to allow the control circuit to generate the synchronization pulse. For instance, the control circuit may be configured to halt transmitting messages on the communication bus in order to generate the synchronization pulse on the communication bus.

The control circuit may determine the length of the synchronization period $T_{SYNC}$ based on the time of the zero-crossing event. For example, the control circuit may determine when to end the synchronization period $T_{SYNC}$ based on the time of the zero-crossing event, which means that the length of the synchronization period $T_{SYNC}$ may vary from on half-cycle to the next. For example, the control circuit may start a timer in response to detecting a zero-crossing at 1802, and may determine the end of the synchronization period $T_{SYNC}$ at 1806 after a predetermined amount of time has expired from the detected zero-crossing. Alternatively, the control circuit may determine the length of the synchronization period $T_{SYNC}$ based on the time that a previous communication period $T_{COMM}$ ended.

When the control circuit determines that the synchronization period $T_{SYNC}$ has ended at 1806, the control circuit may restart communication on the communication bus during a communication period $T_{COMM}$. During the communication period $T_{COMM}$, the control circuit of the fixture controller may be configured to transmit messages to the master lighting control modules via the communication bus. The control circuit may wait for the length of the communication period $T_{COMM}$ at 1810, and during the length of the communication period $T_{COMM}$ the fixture controller and the one or more master lighting control modules may communication over the communication bus. The control circuit may pause communication on the communication bus at the end of the communication period $T_{COMM}$ at 1812, before exiting the procedure 1800. The control circuit may set the length of the communication period $T_{COMM}$ such that the communication period $T_{COMM}$ ends before the next zero-crossing event of the AC mains line voltage $V_{AC}$. For example, the control circuit may enable communication across the communication bus during the communication period $T_{COMM}$, and then pause the communication on the communication period $T_{COMM}$ prior to the next zero-crossing event so that the control circuit can wait for and receive the signal from the zero-cross detect circuit indicating the next zero-crossing and execute the procedure 1800 again. For example, the control circuit may start a timer in response to detecting a zero-crossing at 1802, and may determine the end of the communication period $T_{COMM}$ at 1812 after a predetermined amount of time has expired from the detected zero-crossing.

Figure 19:
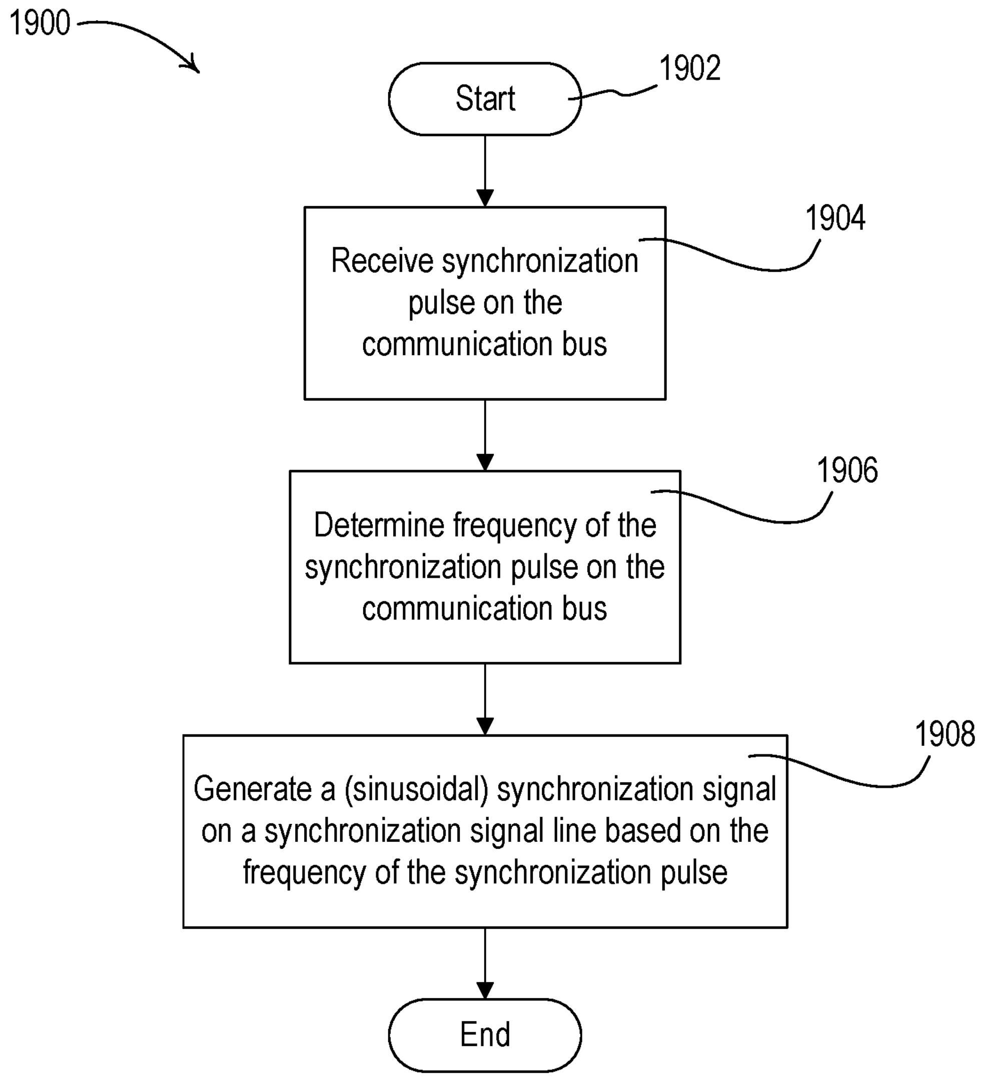
FIG. 19 is a flowchart depicting an example procedure for generating a timing signal that may be used by the master lighting module and the drone lighting modules of a linear lighting assembly.

FIG. 19 is a flowchart depicting an example procedure 1900 for generating a timing signal that may be used by the master lighting modules and the drone lighting modules of a linear lighting assembly (e.g., the lighting system 500, the linear lighting assembly 1300, and/or the linear lighting assembly 1500). The procedure 1900 may be executed by one or more control circuits (e.g., the master control circuit 850) of a master lighting module (e.g., the master module 150A, 200A, 512, and/or the master lighting module 800). The control circuit may perform the procedure 1900 to coordinate the timing at which the master lighting module and the drone lighting modules (e.g., the emitter control circuits 836, 936, 1036) can perform a measurement procedure modules. The control circuit may execute the procedure 1900 periodically. The control circuit may execute the procedure 1900 to coordinate the timing of a respective measurement intervals during which the master and drone lighting modules may execute a measurement procedure (e.g., as described above).

The control circuit may start the procedure 1900 at 1902. At 1904, the control circuit may receive one or more synchronization pulses (e.g., synchronization frames and/or the synchronization pulses 1722) on a communication bus (e.g., the serial communication bus 740), for example, from a fixture controller (e.g., the fixture control circuit 736 of the fixture controller 700 and/or the fixture control circuit 1512 of the fixture controller 1510) of the linear lighting assembly. For instance, the control circuit may receive the synchronization pulse from a fixture controller that executes the procedure 1800. In some examples, a pulse detector of the master lighting module (e.g., of a master control circuit of the master lighting module) may receive (e.g., detect) the synchronization pulse on the communication bus. For instance, the pulse detector may be implemented using microprocessor hardware peripherals (e.g., timer input capture) of the master lighting module.

At 1906, the control circuit may determine a frequency of the synchronization pulse. For example, the control circuit may be configured to measure a period between the beginning of a first synchronization pulse and a second subsequent synchronization pulse (e.g., the next synchronization pulse after the first synchronization pulse) to determine the frequency of the synchronization pulses on the communication bus. The control circuit may be configured to measure the periods between the beginnings of a plurality of the synchronization pulses (e.g., a plurality of first and second synchronization pulses) to determine the frequency of the synchronization pulses on the communication bus. In some instances, the control circuit may update the frequency after each synchronization pulse (e.g., based on a sliding window of samples of synchronization pulses). Further, in some examples, the control circuit may filter and/or average the determined frequency over time.

At 1908, the control circuit may generate a timing signal (e.g., the timing signal 1730) on a timing signal line (e.g., the timing signal lines 560 and/or the timing signal lines 844) based on the frequency of the synchronization pulse. The timing signal may be a sinusoidal wave, a square wave, or other suitable timing signal. In some examples, the timing signal may be a sinusoidal waveform having the same frequency and period as the synchronization pulses. Further, and for example, the control circuit may generate the timing signal using a digital-to-analog converter (DAC), where the control of the DAC is updated based on the frequency of the synchronization pulses across the communication bus.

The plurality of master and drone lighting modules (e.g., the emitter control circuits 836, 936, 1036) may be configured to use the timing signal to perform a measurement procedure. As such, the plurality of master and drone lighting modules may coordinate a measurement procedure with respect to zero-crossings of the AC mains line voltage $V_{AC}$ (e.g., the zero-crossing event of the AC mains line voltage $V_{AC}$), even though the master and drone lighting modules do not receive the AC mains line voltage $V_{AC}$. For example, the plurality of master and drone lighting modules may determine a frequency of periodic measurement intervals based on the frequency of the timing signal received on the synchronization line (e.g., determine the timing of a respective measurement interval during which the master and drone lighting modules may execute a measurement procedure). Accordingly, in some examples, the plurality of master and drone lighting modules may determine a time to measure optical feedback information of the lighting loads of their respective modules based on the frequency of the timing signal to, for example, perform color and/or intensity control refinement. Finally, in some examples, the control circuit may compensate for any phase delay between detection of the synchronization pulse and the AC mains line voltage $V_{AC}$ (e.g., the zero-crossing events of the AC mains line voltage $V_{AC}$), and may generate the timing signal at the actual times of the zero crossings events of the AC mains line voltage $V_{AC}$ (e.g., using a phase delay compensation procedure).

Figure 20:
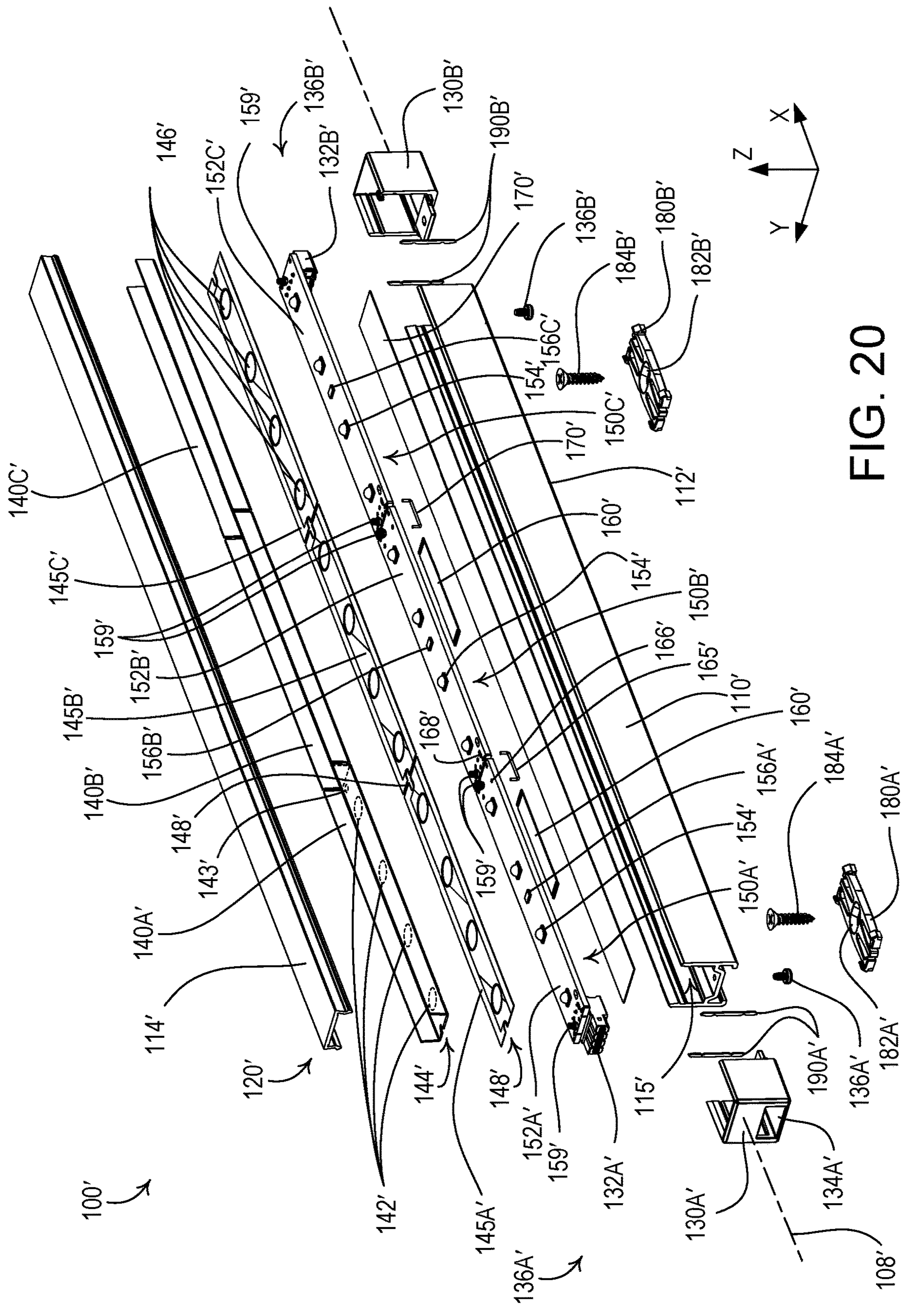
FIG. 20 is a partially exploded view of another linear lighting device.

FIG. 20 is an exploded view of another example linear lighting device 100'. The linear lighting device 100' may include a housing 110', a cover lens 120', and end caps 130A', 130B'. The housing 110' may be elongate (e.g., in the x-direction). The housing 110' may be configured to be mounted to a structure (e.g., a horizontal structure) such that the linear lighting device 100' is attached to the structure. For example, the linear lighting device 100' may be configured to be mounted underneath a cabinet, a shelf, a door, a step, and/or some other structure. The housing 110' may define an upper surface 112' and a lower surface 114'. The upper surface 112' may be configured to be proximate to the structure and the lower surface 114' may be distal to the structure when the housing 110' is mounted to the structure.

The linear lighting device 100' may define a first end 106A' (e.g., an input end) and an opposed second end 106B' (e.g., an output end). The end cap 130A' may be an input end cap located at the first end 106A' and the end cap 130B' may be an output end cap located at the second end 106B'. The linear lighting device 100' may define connectors 132A', 132B' that are accessible via the respective end caps 130A', 130B'. The connectors 132A', 132B' may be configured to connect the linear lighting device 100' to a fixture controller (e.g., a controller, a lighting controller and/or a fixture controller such as the fixture controller 520 shown in FIG. 6) and/or other linear lighting devices. For example, the connector 132A may be configured to connect the linear lighting device 100' to the controller or another linear lighting device and the connector 132B' may be configured to connect the linear lighting device 100' to another linear lighting device.

The housing 110' may define a cavity 115' extending along a longitudinal axis 108' (e.g., in the x-direction) of the linear lighting device 100' (e.g., the housing 110'). The linear lighting device 100' may comprise one or more lighting modules (e.g., light-generation modules) 150A', 150B', 150C' that may be received within the cavity 115'. Each of the lighting modules 150A', 150B', 150C' may comprise a respective printed circuit board (PCB) 152A', 152B', 152C'. The lighting modules may each comprise one or more emitter modules 154' (e.g., in the example shown in FIG. 20, each lighting module 150A', 150B', 150C' includes four respective emitter modules 154'), which may each include one or more emitters, such as light-emitting diodes (LEDs). The emitter modules 154' may be mounted to the respective PCBs 152A', 152B', 152C'. Each of the PCBs 152A', 152B', 152C' may include an emitter processor 156A', 156B', 156C' configured to control the emitter modules 154' of the respective lighting module 150A', 150B', 150C'. When the lighting modules 150A', 150B', 150C' include a plurality of emitter modules 154', each of the plurality of emitter modules 154' of a respective lighting module (e.g., lighting module 150A') may be controlled by one emitter processor (e.g., emitter processor 156A'). Controlling multiple emitter modules 154' with one emitter processor may reduce the power consumption of the lighting module, reduce a size of the PCB, and/or reduce a number of messages sent.

The lighting modules 150A', 150B', 150C' (e.g., the PCBs 152A', 152B', 152C') may be secured within the cavity 115', for example, using thermal tape 170'. The thermal tape 170' may be an adhesive that enables heat dissipation from the emitters 154' of the PCBs 152A', 152B', 152C' to the housing 110', for example, while also affixing the PCBs 152A', 152B', 152C' to the housing 110'. The thermal tape 170' may be continuous along the length (e.g., in the x-direction) of the linear lighting device 100'. Alternatively, it should be appreciated that the thermal tape 170' may be separated into segments (e.g., two or more), for example, for each of the PCBs 152A', 152B', 152C'.

The PCBs 152A', 152B', 152C' of the lighting modules 150A', 150B', 150C' may be connected together using cables 160' (e.g., ribbon cables). The cables 160' may mechanically, electrically, and/or communicatively connect adjacent PCBs of the PCBs 152A', 152B', 152C'. For example, the PCB 152A' may be connected to the PCB 152B' via one of the cables 160' and the PCB 152B' may be connected to the PCB 152C' via another one of the cables 160'. For example, the ends of the cables 160' may be inserted into sockets, such as zero-insertion force (ZIF) connectors, on PCBs of the adjacent lighting modules. The sockets may be mounted to a bottom surface of the PCBs. The cables 160' may be flat flexible cable jumpers, as shown. Alternatively, the cables 160' may be round flexible jumpers, rigid jumpers, and/or the like. The cables 160' may be configured to transmit signals between the PCBs 152A', 152B', 152C'.

The linear lighting device 100' may include power jumpers 172' that are configured to relay a power bus (e.g., such as the power bus 530 shown in FIG. 6) between the PCBs 152A', 152B', 152C' of the lighting modules 150A', 150B', 150C'. For example, adjacent PCBs of the PCBs 152A', 152B', 152C' may be connected using two power jumpers 172'. Stated differently, two power jumpers 172' may be used at the intersection between adjacent PCBs of the PCBs 152A', 152B', 152C'. Each of the PCBs 152A', 152B', 152C' may define one or more apertures 166' and one or more slots 168' on opposed ends (e.g., in the x-direction) thereof. The apertures 166' and the slots 168' may be configured to receive the power jumpers 172' such that the power jumpers 172' may be attached to the PCBs 152A', 152B', 152C'. The power jumpers 172 may be configured to transmit power (e.g., the power bus) between the lighting modules 150A', 150B', 150C' of the linear lighting device 100'.

The lighting module 150A' may be a master module (e.g., a starter module). For example, the master module may be a first module of the linear lighting device 100' that is located proximate to the first end 106A'. For example, each linear lighting device 100' may start with a master module (e.g., such as the lighting module 150A'). A master module may receive messages (e.g., including control data and/or commands) and may be configured to control one or more other lighting modules, for example, drone lighting modules, based on receipt of the messages. For example, each master module may include an additional processor (e.g., a master processor). The lighting modules 150B', 150C' may be drone lighting modules. Each drone lighting module may be controlled by a master module. For example, the lighting modules 150B', 150C' may be controlled by the lighting module 150A'. The master processor of the lighting module 150A' may control the emitter processors 156A', 156B', 156C' to control the emitter modules 154' of each of the lighting modules 150A', 150B', 150C'. Drone lighting modules may be either a middle drone lighting module or an end drone module. Middle drone lighting modules (e.g., such as the emitter module 150B') may be connected between a master module and another drone lighting module. Middle drone lighting modules may be connected between other drone lighting modules. End drone lighting modules (e.g., such as the lighting module 150C') may be connected between a master module or another drone lighting module of its respective linear lighting device and another linear lighting device. End drone lighting modules may be connected between another drone lighting module and another master module (e.g., when the linear lighting device 100' includes multiple master modules). Although the linear lighting device 100' is shown having three lighting modules, for example, a master module 150A', a middle drone lighting module 150B', and an end drone lighting module 150C', it should be appreciated that a linear lighting device may include a plurality of master modules. Each master module may control a plurality (e.g., one or more) of drone lighting modules (e.g., up to five drone lighting modules).

Each master module (e.g., the lighting module 150A') of the linear lighting device 100' may include a connector 132A' (e.g., an input connector) attached thereto. For example, the connector 132A' may be a female connector. The connector 132A' may be configured to enable connection of the linear lighting device 100' to a fixture controller (e.g., a controller and/or a fixture controller, such as fixture controller 520 shown in FIG. 6). The connector 132A' may be configured to enable connection of the linear lighting device 100' to another linear lighting device. The connector 132A' may be configured to enable connection of the master module (e.g., the lighting module 150A') of the linear lighting device 100' to a drone lighting module (e.g., an end drone lighting module) of another linear lighting device. Each end drone lighting module (e.g., the lighting module 150C') of the linear lighting device 100' may include a connector 132B' (e.g., an input connector) attached thereto. For example, the connector 132B' may be a male connector. The connector 132B' may be configured to enable connection of the linear lighting device 100' to another linear lighting device. The connector 132B' may be configured to enable connection of the end drone lighting module (e.g., the lighting module 150C') of the linear lighting device 100' to a master module of another linear lighting device.

The end caps 130A', 130B' may define apertures 134A', 134B' that are configured to receive the connector 132A' and/or the connector 132B'. The end caps 130A', 130B' may be secured to the housing 110', for example, using fasteners 136A', 136B'. Light gaskets 190A', 190B' may be configured to prevent light emitted by the emitter PCBs 150A', 150B', 150C' from escaping between the end caps 130A', 130B' and the housing 110'. The light gasket 190A' may be configured to be located between the end cap 130A' and the housing 110'. The light gasket 190B' may be configured to be located between the end cap 130B' and the housing 110'.

Each PCB of the PCBs 152A', 152B', 152C' may include mounting studs 159 at opposed ends. The mounting studs 159 on a PCB of the PCBs 152A', 152B', 152C' may be configured to secure one or more components of the linear lighting device 100' to the respective PCB of the PCBs 152A', 152B', 152C'. The mounting studs 159 may be electrically connected to ground (e.g., earth ground and/or circuit common).

The linear lighting device 100' may comprise one or more electromagnetic interference (EMI) shields 145A', 145B', 145C'. The EMI shields 145A', 145B', 145C' may be configured to abut inner sides of the housing 110' such that the EMI shields 145A', 145B', 145C' are tied to ground. One of the EMI shields 145A', 145B', 145C' may be aligned with a corresponding one of the PCBs 152A', 152B', 152C'. For example, EMI shield 145A' may be mounted above and aligned with PCB 152A', EMI shield 145B' may be mounted above and aligned with PCB 152B', and EMI shield 145C' may be mounted above and aligned with PCB 152C'. Each of the EMI shields 145A', 145B', 145C' may define a plurality of openings 146'. Each of the openings 146' may be configured to align with a corresponding one of the emitter modules 154' such that the light generated by the emitter modules 154' passes through the openings 146'. Each of the EMI shields 145A', 145B', 145C' may define slots 148' at opposed ends. The slots 148' may be configured to receive the mounting studs 159 on each of the PCBs 152A', 152B', 152C', for example, to secure the EMI shields 145A', 145B', 145C' to respective ones of the PCBs 152A', 152B', 152C'.

The linear lighting device 100' may comprise one or more reflectors 140A', 140B', 140C'. The reflectors 140A', 140B', 140C' may be configured to reflect (e.g., direct) the light generated by the emitter modules 154' toward the lens 120'. For example, the reflectors 140A', 140B', 140C' may define a reflective upper surface. One of the reflectors 140A', 140B', 140C' may be aligned with a corresponding one of the PCBs 152A', 152B', 152C'. For example, reflector 140A' may be mounted above and aligned with PCB 152A', reflector 140B' may be mounted above and aligned with PCB 152B', and reflector 140C' may be mounted above and aligned with PCB 152C'. Each of the reflectors 140A', 140B', 140C' may define a plurality of openings 142'. Each of the openings 142' may be configured to align with a corresponding one of the emitter modules 154' such that the light generated by the emitter modules 154' passes through the openings 142'. Each of the reflectors 140A', 140B', 140C' may define slots 144' at opposed ends. The slots 144' may be configured to receive the mounting studs 159' on each of the PCBs 152A', 152B', 152C'. The mounting studs 159' may be configured to be soldered to the reflectors 140A', 140B', 140C', for example, to secure the reflectors 140A', 140B', 140C' to the PCBs 152A', 152B', 152C' and to electrically connect the reflectors 140A', 140B', 140C' to ground (e.g., which may aide in preventing electrostatic discharges from reaching and damaging the electrical components on the respective PCBs 152A', 152B', 152C'.

The linear lighting device 100' may also comprise mounting brackets 180A', 180B'. The mounting brackets 180A', 180B' may be configured to attach the linear lighting device 100' to the structure. For example, the mounting brackets 180A', 180B' may engage the upper surface 112' of the housing 110'. The mounting brackets 180A', 180B' may define respective holes 182A', 182B' that are configured to receive respective fasteners 184A', 184B' configured to attach the mounting brackets 180A', 180B' to the structure.

Although the figures depict the linear lighting device 100' without TIR lenses, it should be appreciated that the linear lighting device 100' may include TIR lenses (e.g., such as the TIR lenses 140A, 140B, 140C). In this case, a height of the housing 110' may be increased in the z-direction which would enable the TIR lenses to fit within the linear lighting device 100'.

What is claimed is:

1. A linear lighting device comprising:

an elongated housing defining a cavity extending along a longitudinal axis of the housing;

a plurality of emitter printed circuit boards configured to be received within the cavity of the housing; and a plurality of emitter modules mounted to each of the plurality of emitter printed circuit boards;

wherein each of the plurality of emitter printed circuit boards has a control circuit mounted thereto, the control circuit configured to control the plurality of emitter modules mounted to the respective emitter printed circuit board based on receipt of one or more messages, and wherein at least one of the plurality of emitter printed circuit boards has a serial communication circuit mounted thereto, the serial communication circuit configured to communicate the one or more messages via a serial communication bus, and wherein each of the plurality of emitter printed circuit boards has a drive circuit mounted thereto, the drive circuit configured to:

receive a DC bus voltage on a DC power bus for powering the plurality of emitter printed circuit boards; and conduct drive currents through the plurality of emitter modules mounted to the respective emitter printed circuit board.

2. The linear lighting device of claim 1, further comprising a total internal reflection lens for each of the plurality of emitter printed circuit boards, wherein the total internal reflection lens is configured to diffuse light emitted by the emitters of the plurality of emitter printed circuit boards.

3. The linear lighting device of claim 2, wherein a lower surface of the total internal reflection lens comprises a plurality of parallel ridges.

4. The linear lighting device of claim 3, wherein the plurality of parallel ridges is perpendicular to a length of the housing along the longitudinal axis.

5. The linear lighting device of claim 1, wherein a first emitter printed circuit board of the plurality of emitter printed circuit boards has a length of 3 inches and a second emitter printed circuit board of the plurality of emitter printed circuit boards has a length of 4 inches.

6. The linear lighting device of claim 1, wherein each of the plurality of emitter printed circuit boards has a length of 3 inches or 4 inches such that the overall length of the linear lighting device is configurable.

7. The linear lighting device of claim 1, wherein each of the plurality of emitter printed circuit boards has a length of 3 centimeters or 4 centimeters such that the overall length of the linear lighting device is configurable.

8. The linear lighting device of claim 1, wherein the at least one emitter printed circuit board of the plurality of emitter printed circuit boards receives the one or more messages from a controller, and wherein the at least one emitter printed circuit board relays the messages to one or more other emitter printed circuit boards of the plurality of emitter printed circuit boards.

9. The linear lighting device of claim 8, wherein the control circuit is an emitter control circuit, and wherein the at least one emitter printed circuit board has a master control circuit mounted thereto, the master control circuit coupled to the serial communication circuit and configured to communicate with the respective emitter control circuit mounted to the one or more other emitter printed circuit boards.

10. The linear lighting device of claim 1, wherein each of the plurality of emitter modules comprises a plurality of emitters and a plurality of detectors mounted to a substrate and encapsulated by a dome.

11. The linear lighting device of claim 1, wherein each of the plurality of emitter printed circuit boards has a socket mounted thereto, the socket configured to connect adjacent emitter printed circuit boards of the plurality of emitter printed circuit boards.

12. The linear lighting device of claim 11, further comprising a cable that is configured to connect a first emitter printed circuit board of the plurality of emitter printed circuit boards to a second emitter printed circuit board of the plurality of emitter printed circuit boards via the socket.

13. The linear lighting device of claim 12, wherein the cable is a flat flexible cable jumper.

14. The linear lighting device of claim 1, wherein the plurality of emitter printed circuit boards are attached within the cavity defined by the housing using an adhesive.

15. The linear lighting device of claim 14, wherein the adhesive is thermal tape.

16. The linear lighting device of claim 1, further comprising a plurality of mounting brackets configured to attach the linear lighting device to a horizontal structure.

17. The linear lighting device of claim 1, further comprising a cover lens.

18. The linear lighting device of claim 1, further comprising:

an input end cap configured to cover a first end of the cavity of the housing; and an output end cap configured to cover a second end of the cavity of the housing.

19. The linear lighting device of claim 1, wherein the control circuit of each of the emitter printed circuit boards is an emitter control circuit, and wherein the linear lighting device comprises a master lighting module and a plurality of drone lighting modules, wherein each of the plurality of drone lighting modules has one of the emitter printed circuit boards having one of the emitter control circuits and one or more emitter modules mounted thereto, the master lighting module comprising one of the emitter printed circuit boards having a master control circuit, the serial communication circuit, one of the emitter control circuits, and one or more emitter modules mounted thereto, the master control circuit configured to control a plurality of emitter control circuits of the plurality of emitter printed circuit boards, the master control circuit configured to:

transmit a first control message to a first emitter control circuit of the plurality of emitter control circuits;

measure, after sending the first control message, a first voltage on a communication line;

transmit a second control message to a second emitter control circuit of the plurality of emitter control circuits;

measure, after sending the second control message, a second voltage on the communication line; and determine an order of the drone lighting modules that are communicatively coupled to the master lighting module based on the first voltage and the second voltage.

20. The linear lighting device of claim 19, wherein the communication line is an interrupt request (IRQ) line.

21. The linear lighting device of claim 19, wherein the first control message indicates a first command instructing the first emitter control circuit to pull an output port connected to the communication line low.

22. The linear lighting device of claim 19, wherein the second control message indicates a second command instructing the second emitter control circuit to pull an output port connected to the communication line low.

23. The linear lighting device of claim 19, wherein the master control circuit is further configured to determine whether a voltage has been measured on the communication line for each of the plurality of emitter control circuits.

24. The linear lighting device of claim 23, wherein the master control circuit determines the order of the drone lighting modules when the communication line voltage has been measured for each of the plurality of emitter control circuits.

25. The linear lighting device of claim 19, wherein the order of the drone lighting modules is determined in ascending order of measured voltage.

26. The linear lighting device of claim 18, wherein the master control circuit is configured to:

receive, from a power supply via the serial communication circuit, a synchronization pulse that indicates a length of a synchronization frame;

generating, based on the synchronization pulse, a timing signal that indicates a synchronization period during which a first plurality of emitters of each of the plurality of drone lighting modules are able to synchronize; and sending, to the plurality of drone lighting modules via a synchronization line, the generated timing signal.

27. The linear lighting device of claim 26, wherein the synchronization pulse indicates a communication period between successive synchronization pulses.

28. The linear lighting device of claim 27, wherein the communication period indicates when the master lighting module can send feedback to a control device.

29. The linear lighting device of claim 27, wherein the master control circuit is configured to send, via the serial communication circuit, feedback to a control device.

30. The linear lighting device of claim 26, wherein the synchronization frame corresponds with a zero crossing of an AC mains voltage received by a control device.

31. The linear lighting device of claim 26, further comprising:

a second plurality of emitters; and an emitter control circuit configured to control the second plurality of emitters, wherein the second plurality of emitters are configured to synchronize according to the generated timing signal.

32. The linear lighting device of claim 1, wherein the linear lighting device comprises an electromagnetic interference (EMI) shield between the plurality of emitter printed circuit boards and a lens.

33. The linear lighting device of claim 1, wherein the linear lighting device comprises a reflector configured to direct the light generated by the emitter modules toward a lens.

34. The linear lighting device of claim 33, wherein each of the plurality of emitter printed circuit boards comprises mounting studs that are configured to secure the reflector within the linear lighting device.

35. The linear lighting device of claim 34, wherein the reflector is soldered to a pair of mounting studs on one of the plurality of emitter printed circuit boards.

36. The linear lighting device of claim 34, wherein the reflector comprises slots at opposed ends that are configured to receive the mounting studs of one of the plurality of emitter printed circuit boards.

* * * * *